(12) United States Patent
Sawada

(10) Patent No.: US 10,634,180 B2
(45) Date of Patent: Apr. 28, 2020

(54) CLIP

(71) Applicant: DAIWA KASEI KOGYO KABUSHIKI KAISHA, Okazaki-shi, Aichi-ken (JP)

(72) Inventor: Naohiro Sawada, Toyohashi (JP)

(73) Assignee: DAIWA KASEI KOGYO KABUSHIKI KAISHA, Aichi-ken (JP)

( * ) Notice: Subject to any disclaimer, the term of this patent is extended or adjusted under 35 U.S.C. 154(b) by 158 days.

(21) Appl. No.: 15/801,181

(22) Filed: Nov. 1, 2017

(65) Prior Publication Data
US 2018/0119719 A1 May 3, 2018

(30) Foreign Application Priority Data
Nov. 2, 2016 (JP) .................. 2016-215188

(51) Int. Cl.
| | |
|---|---|
| *F16B 21/08* | (2006.01) |
| *B60R 11/00* | (2006.01) |
| *F16B 5/06* | (2006.01) |
| *F16B 19/00* | (2006.01) |

(52) U.S. Cl.
CPC .......... *F16B 21/084* (2013.01); *F16B 21/088* (2013.01); *B60R 2011/0059* (2013.01); *F16B 5/0685* (2013.01); *F16B 19/004* (2013.01); *F16B 21/08* (2013.01)

(58) Field of Classification Search
CPC .... F16B 5/0685; F16B 19/004; F16B 21/084; F16B 21/086; F16B 21/088; F16B 21/08
USPC .......................................... 411/508, 509, 510
See application file for complete search history.

(56) References Cited

U.S. PATENT DOCUMENTS

| | | | | |
|---|---|---|---|---|
| 3,810,279 | A * | 5/1974 | Swick | F16B 19/004 411/509 |
| 4,396,329 | A * | 8/1983 | Wollar | F16B 21/084 24/614 |
| 4,422,276 | A * | 12/1983 | Paravano | B60R 13/0206 411/104 |
| 4,427,328 | A * | 1/1984 | Kojima | F16B 21/084 24/625 |
| 5,039,267 | A * | 8/1991 | Wollar | F16B 21/08 411/508 |
| 5,306,098 | A * | 4/1994 | Lewis | F16B 19/004 411/510 |

(Continued)

FOREIGN PATENT DOCUMENTS

JP 2015-215077 A 12/2015

*Primary Examiner* — Roberta S Delisle
(74) *Attorney, Agent, or Firm* — Christensen, Fonder, Dardi & Herbert PLLC

(57) ABSTRACT

A clip may include a base to which an attaching member is connected, and an anchor configured to be attached to a plate-shaped subject member and having a pillar, at least one pair of flexible engagement strips and at least one pair of blocks. The pillar is configured to be inserted into an attaching hole formed in the subject member. Each of the at least one pair of engagement strips is configured to engage a periphery of the attaching hole when the pillar is inserted into the attaching hole. Each of the at least one pair of blocks has a stopper surface that is configured to prevent each of the at least one pair of engagement strips from being folded back when an extraction load is applied to the anchor in a condition in which the anchor is attached to the subject member.

16 Claims, 46 Drawing Sheets

(56) References Cited

U.S. PATENT DOCUMENTS

| | | | | |
|---|---|---|---|---|
| 6,719,513 | B1* | 4/2004 | Moutousis | F16B 21/084 411/510 |
| 7,614,836 | B2* | 11/2009 | Mohiuddin | B60R 13/0206 411/508 |
| 7,753,320 | B2* | 7/2010 | Geiger | F16B 21/084 248/68.1 |
| 8,028,962 | B2* | 10/2011 | Geiger | F16L 3/2332 174/656 |
| 2007/0134073 | A1* | 6/2007 | Shereyk | F16B 21/084 411/510 |

* cited by examiner

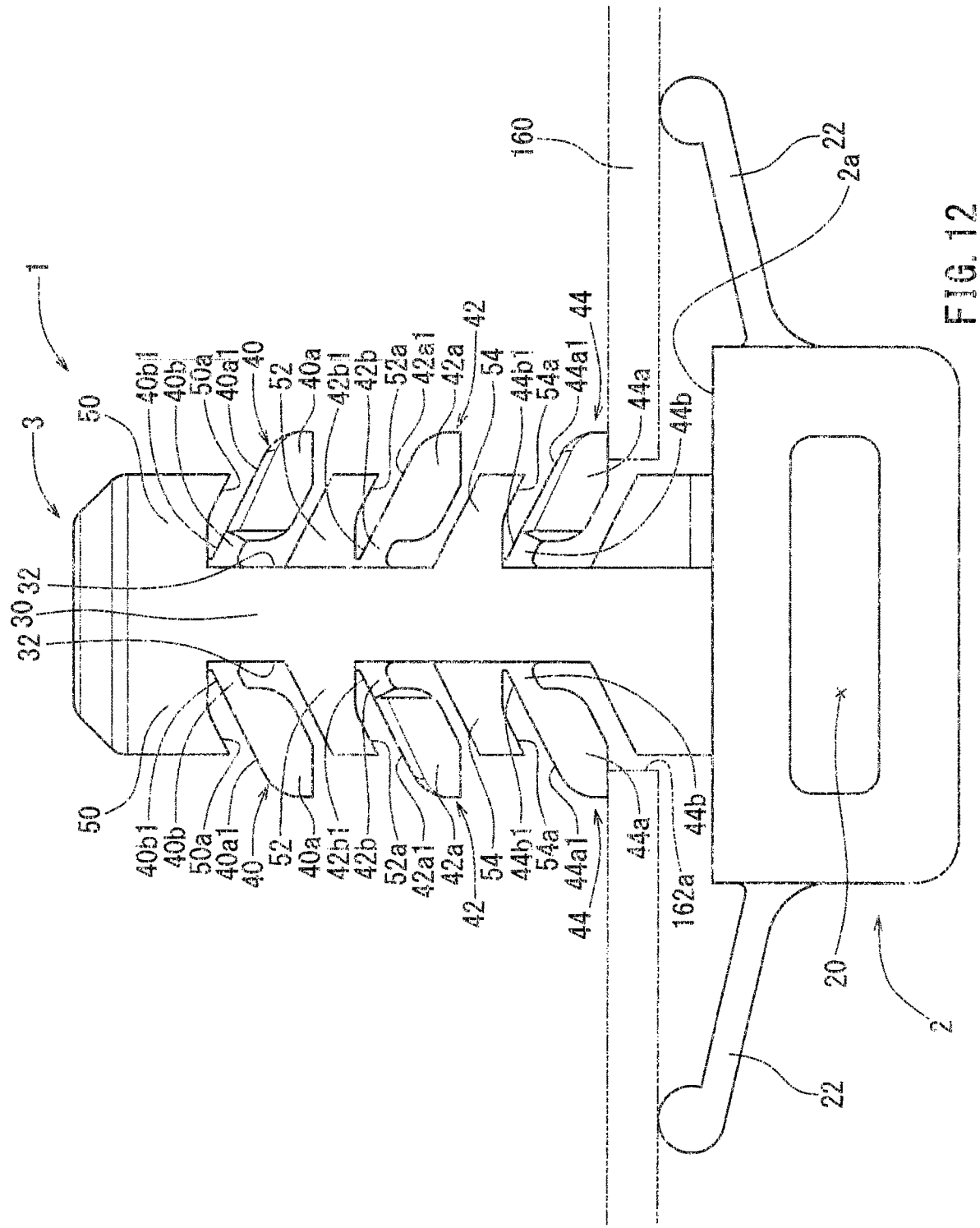
F I G. 12

US 10,634,180 B2

CLIP

PRIORITY CLAIM

The present application claims priority to Japanese Patent Application No. 2016-215188 filed on Nov. 2, 2016, which said application is incorporated by reference in its entirety herein.

BACKGROUND

The disclosure relates generally to a clip. More specifically, the disclosure relates to a clip having a base to which an attaching member (e.g., an electric component) is attached and an anchor that is configured to be connected to a plate-shaped subject member (e.g., a body panel).

This type of clip that is used to attach an attaching member (e.g., a automotive electric component) to a plate-shaped subject member (e.g., an automotive body panel) is already known. Such a clip is taught by, for example, Japanese Laid-Open Patent Publication No. 2015-215077. The clip is composed of a base to which the attaching member is attached and an anchor that is configured to be connected to the subject member. The anchor is composed of a pillar and multiple pairs of engagement strips formed in the pillar. The clip thus constructed may generally be referred to as a tree-shaped clip.

In order to attach the attaching member to the subject member, the base of the clip is first connected to the attaching member. Thereafter, the pillar of the anchor of the clip is pressed against an insertion (attaching) hole formed in the subject member by applying a desired insertion force (load). At this time, the engagement strips formed in the pillar are pressed by an inner surface of the insertion hole. As a result, the anchor can be inserted into the insertion hole while the engagement strips are folded inward. When the engagement strips pass through the insertion hole, the engagement strips may be restored, so as to engage a periphery of the insertion hole. Thus, the anchor can be retained in the insertion hole with a desired retention force, so that the clip can be attached to the subject member. As a result, the attaching member connected to the base of the clip can be attached to the subject member via the clip.

According to the clip, the anchor (the clip) can be attached to the subject member with a reduced insertion load (i.e., a small operation load) because the anchor is inserted into the insertion hole while the engagement strips are folded. Further, due to the multiple pairs of engagement strips formed in the pillar, the clip can be reliably attached to the subject member even when the subject member is changed in thickness. Therefore, the clip may have increased versatility.

However, according to the clip taught by Japanese Laid-Open Patent Publication No. 2015-215077, when an extraction load (a large pullout load) is applied to the clip attached to the subject member (i.e., the clip in an attached condition) via the base, the engagement strips engaging the periphery of the insertion hole may be folded outward. When the engagement strips are excessively folded outward, the engagement strips may be disengaged from the periphery of the insertion hole, so that the clip attached to the subject member may be removed from the subject member. As a result, the attaching member attached to the subject member via the clip may be unexpectedly removed from the subject member.

Thus, there is a need in the art for improved clips.

SUMMARY

For example, in one aspect of the present disclosure, a clip may include a base to which an attaching member is connected, and an anchor configured to be attached to a plate-shaped subject member and having a pillar, at least one pair of flexible engagement strips and at least one pair of blocks. The pillar is configured to be inserted into an attaching hole formed in the subject member. Each of the at least one pair of engagement strips is configured to engage a periphery of the attaching hole when the pillar is inserted into the attaching hole. Each of the at least one pair of blocks has a stopper surface that is configured to prevent each of the at least one pair of engagement strips from being folded back when an extraction load is applied to the anchor in a condition in which the anchor is attached to the subject member.

According to this aspect, in a condition in which the anchor is attached to the subject member, when an extraction load is applied to the anchor via the base, each of the at least one pair of flexible engagement strips engaging the periphery of the attaching hole may contact the stopper surface of each of the at least one pair of blocks. Therefore, the at least one pair of flexible engagement strips can be prevented from being disengaged from the periphery of the attaching hole, so that the anchor can be prevented from being removed from the attaching hole. Further, when each of the at least one pair of flexible engagement strips contacts the stopper surface of each of the at least one pair of blocks, each of the at least one pair of flexible engagement strips may be subjected to a shearing force. Therefore, the anchor can be retained in the attaching hole with a desired retention force that is capable of resisting the extraction load applied thereto.

In another aspect of the present disclosure, the pillar includes a top portion and a bottom portion connected to the base, wherein the at least one pair of engagement strips are a plurality of pairs of engagement strips. The at least one pair of blocks are a single pair of blocks. The plurality of pairs of engagement strips are configured to be folded back in the order from a bottom-side pair of engagement strips engaging the periphery of the attaching hole to a top-side pair of engagement strips when the extraction load is applied to the anchor in the condition in which the anchor is attached to the subject member.

In another aspect of the present disclosure, the pillar includes a top portion and a bottom portion connected to the base. The at least one pair of engagement strips are a plurality of pairs of engagement strips. The at least one pair of blocks are a single pair of blocks. A top-side pair of engagement strips engaging the periphery of the attaching hole are configured to be folded back when the extraction load is applied to the anchor in the condition in which the anchor is attached to the subject member. The stopper surface of each of the at least one pair of blocks extends in parallel to each of the at least one pair of engagement strips.

Other objects, features and advantages of the disclosure will be readily understood after reading the following detailed description together with the accompanying drawings and the claims.

BRIEF DESCRIPTION OF THE DRAWINGS

FIG. 12 is an elevational view of the clip, which view illustrates a condition in which the anchor of the clip is completely inserted into the insertion hole of the second panel member, so that the clip is attached to the second panel member;

DETAILED DESCRIPTION

Detailed representative embodiments are shown in FIGS. 1 to 46.

First Embodiment

A first detailed representative embodiment will be described with reference to FIGS. 1 to 13. Further, a representative clip 1 may be used in order to attach an attaching member (not shown), e.g., an electric component or other such components, to a subject member, e.g., a panel member. As shown in FIGS. 1 to 5, the clip 1 may preferably include a base 2 and an anchor 3 that is configured to be connected to the subject member. Further, the clip 1 may preferably be a one piece rigid plastic molded article that is integrally formed.

Figure 1:
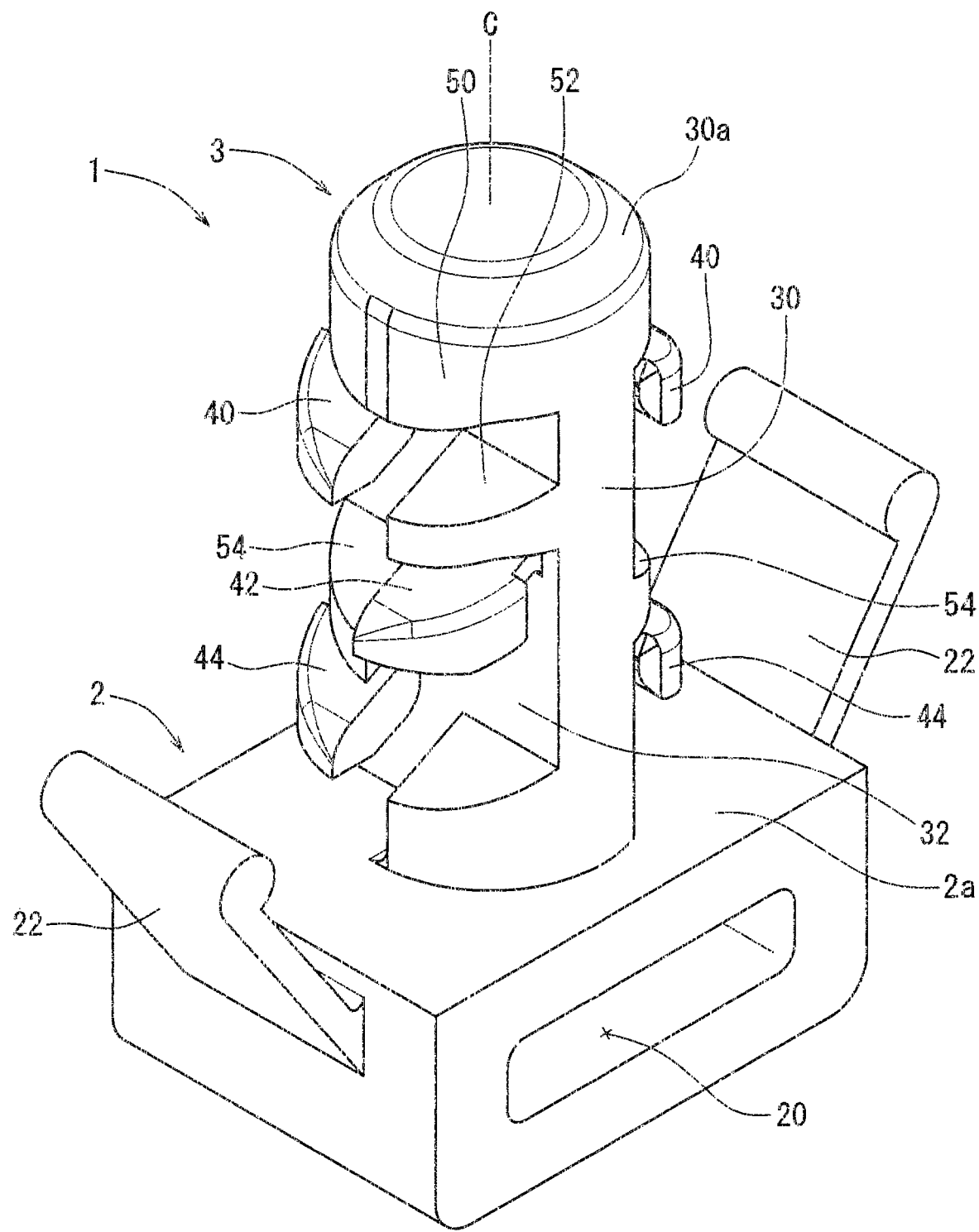
FIG. 1 is a perspective view of a clip according to a first embodiment.
Figure 2:
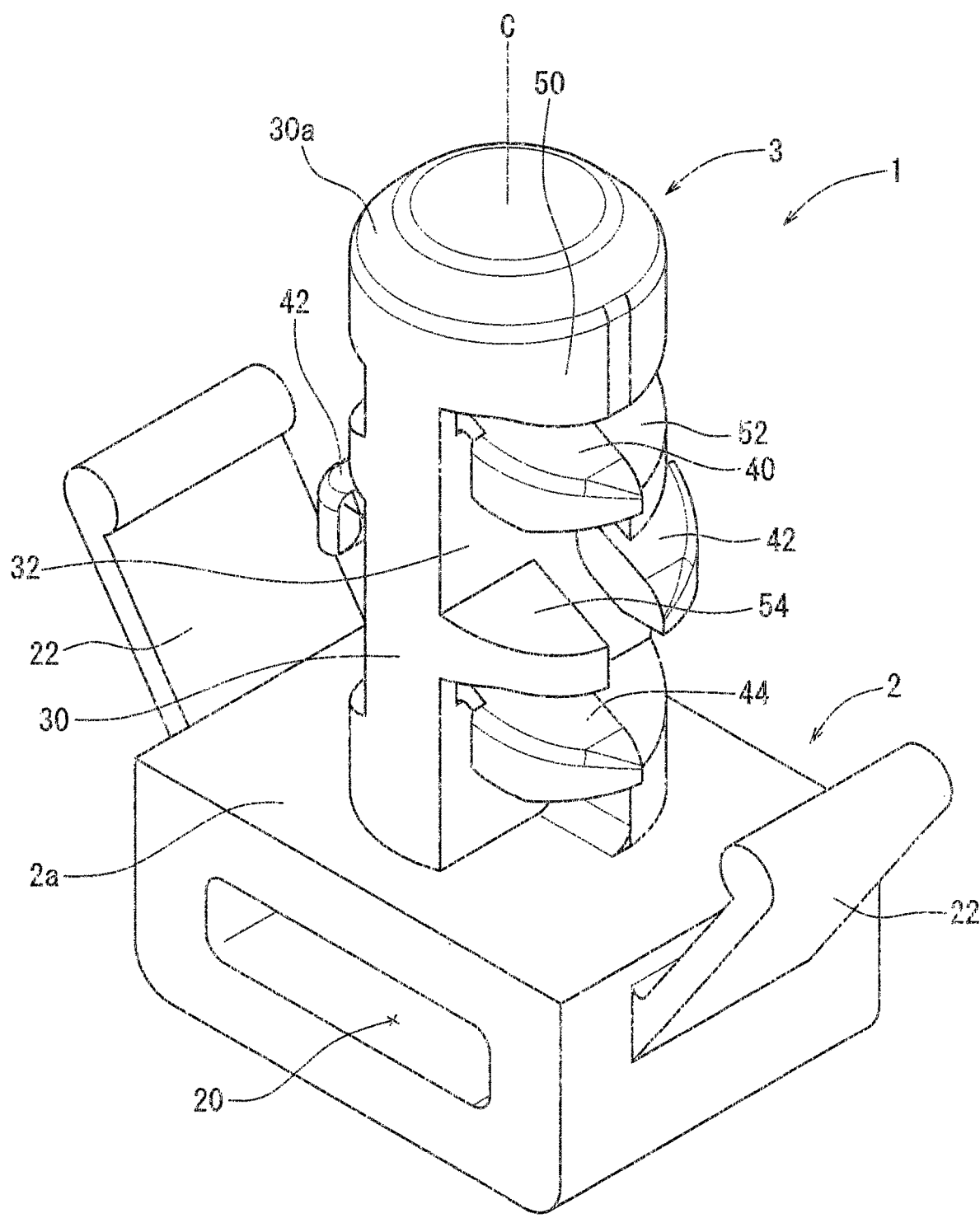
FIG. 2 is a perspective view of the clip, which is viewed from a direction different from FIG. 1.
Figure 3:
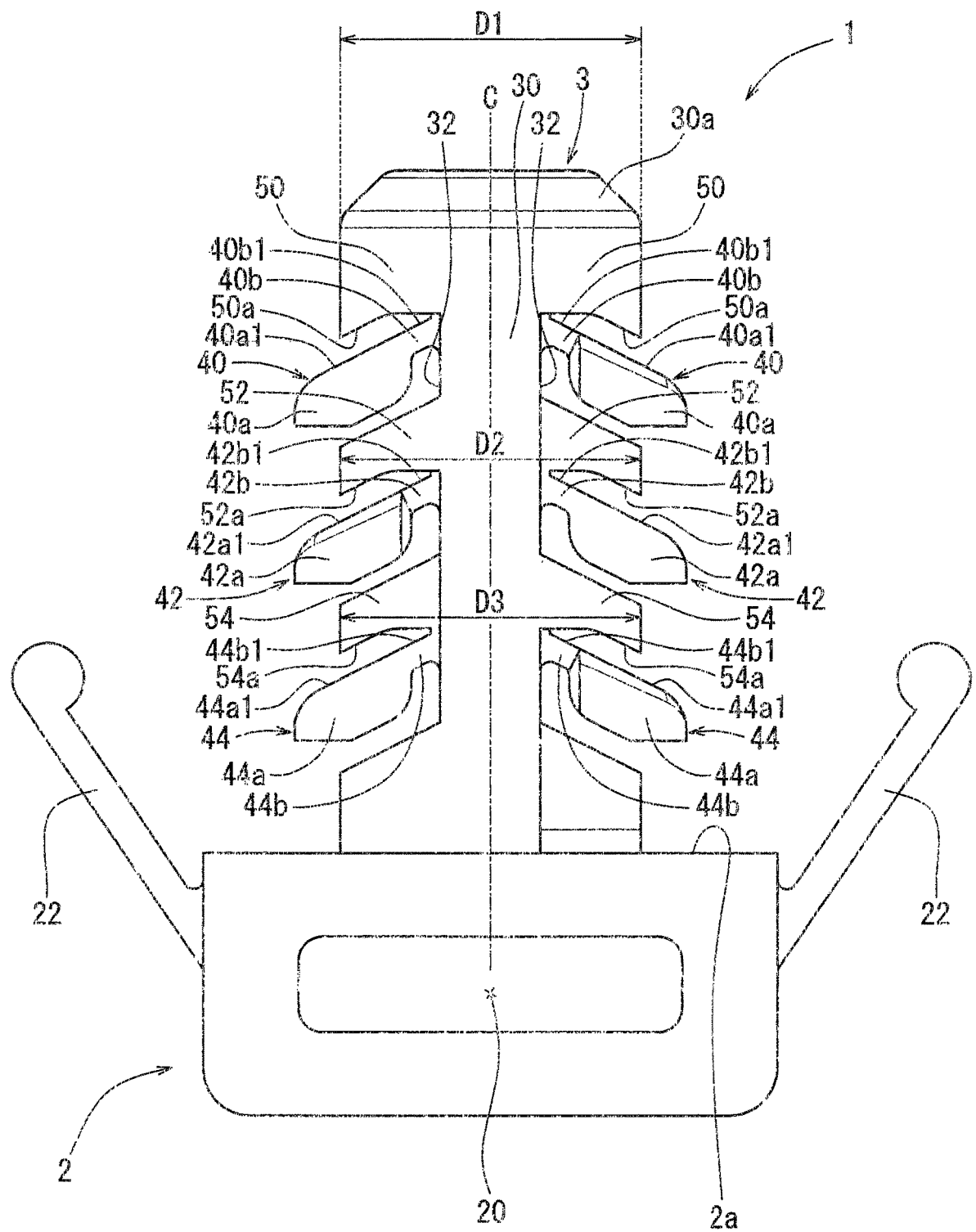
FIG. 3 is an elevational view of the clip.

As shown in FIGS. 1 to 3, the base 2 may have a rectangular parallelepiped shape and have a coupling hole 20 to which the attaching member is connected. The base 2 may have a pair of cantilevered elastically deformable strips or stabilizers 22 that are oppositely formed in side surfaces thereof. The stabilizers 22 may be projected obliquely upward from the side surfaces of the base 2. The stabilizers 22 may function to stabilize the clip 1 due to an elastic force thereof when the anchor 3 is connected to the subject member.

As shown in FIGS. 1 to 3, the anchor 3 may have a headed plate-shaped pillar 30 that is projected (upwardly) from a (upper) surface 2a of the base 2. The pillar 30 may have a tapered circular disk-shaped top (head) portion 30a and a bottom portion (not labeled) connected to the base 2. Further, the pillar 30 may have opposite surfaces 32 substantially extending from the top portion 30a to the bottom portion thereof. The pillar 30 may be configured to be inserted into an attaching hole 62 and an attaching hole 162 that are respectively formed in a first panel member 60 and a second panel member 160 (which will be hereinafter described). Further, the anchor 3 may have three (first to third) pairs of cantilevered flexible engagement strips 40, 42 and 44 and three (first to third) pairs of rigid blocks 50, 52 and 54 that are formed in the opposite surfaces 32 of the pillar 30.

Figure 4:
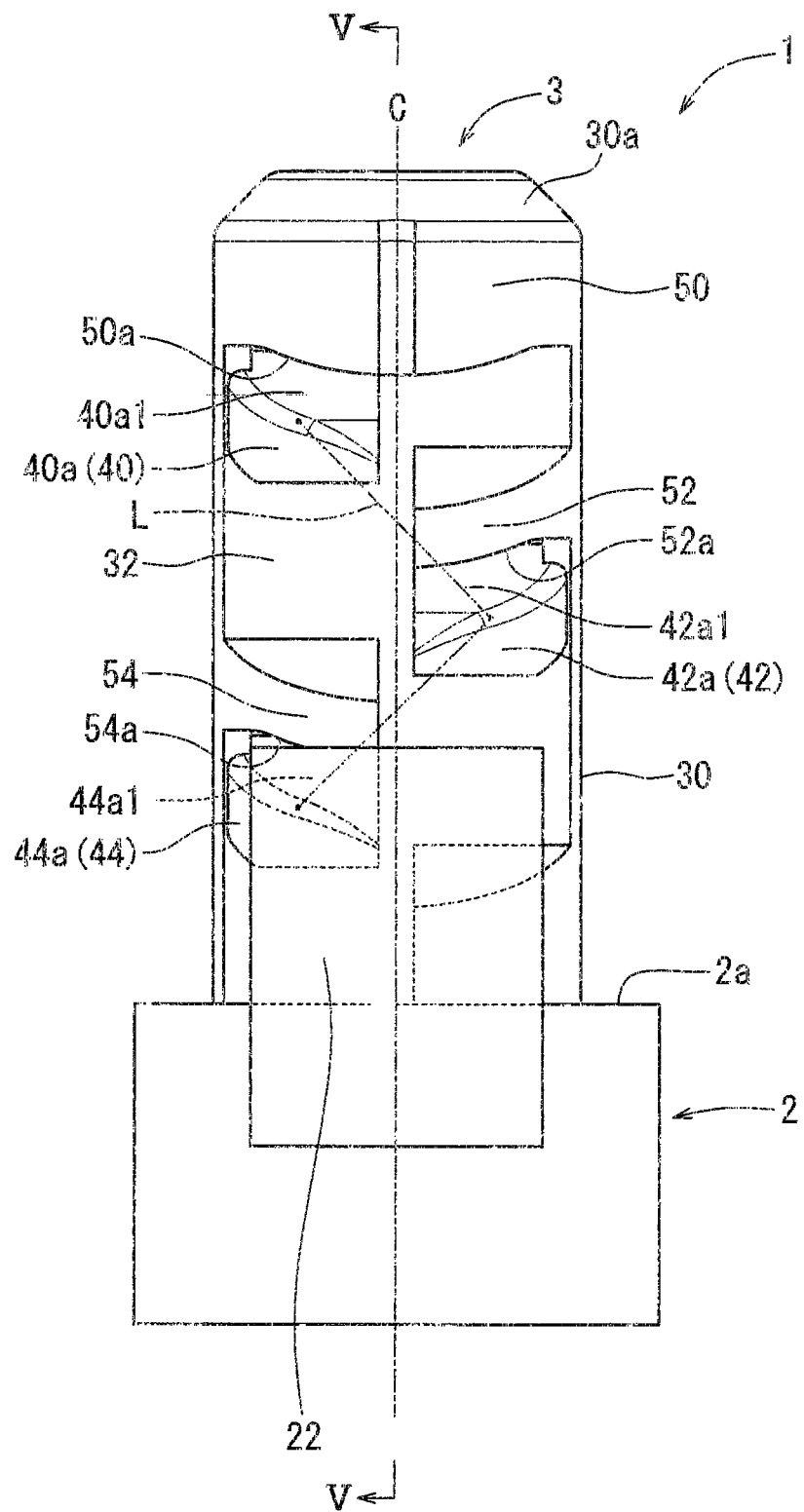
FIG. 4 is a side view of the clip.

As best shown in FIG. 3, the each pair of engagement strips 40, 42 and 44 may preferably be arranged in a 2-fold (180 degrees) rotationally symmetrical fashion about a central axis C of the pillar 30. Further, the engagement strips 40, 42 and 44 formed in each of the opposite surfaces 32 of the pillar 30 may respectively be referred to as first to third engagement strips. As shown in FIG. 4, the first to third engagement strips 40, 42 and 44 may be arranged in a zig-zag manner shown by line L along the central axis C of the pillar 30. Further, in this embodiment, the first to third engagement strips 40, 42 and 44 may respectively be positioned on an upper left side, a middle right side and a lower left side of each of the opposite surfaces 32 of the pillar 30.

As best shown in FIG. 3, the first (upper) engagement strips 40 may respectively be connected to the opposite surfaces 32 of the pillar 30 so as to be inclined downward (i.e., toward the base 2) relative to the central axis C of the pillar 30. Each of the first engagement strips 40 may be composed of a strip body 40a and a flexible portion 40b connected to each of the opposite surfaces 32 of the pillar 30. The strip body 40a may be configured to contact or engage a periphery of the attaching hole 62 of the first panel member 60 or the attaching hole 162 of the second panel member 160 when the pillar 30 is pressed into the attaching hole 62 or the attaching hole 162. Further, a (upper) surface 40a1 of the strip body 40a and a (upper) surface 40b1 of the flexible portion 40b may respectively be flattened and flush with each other. In particular, the surface 40a1 of the strip body 40a and the surface 40b1 of the flexible portion 40b may respectively be inclined downward with respect to the central axis C of the pillar 30 at the same angle.

As best shown in FIG. 3, similar to the first engagement strips 40, the second (middle) engagement strips 42 may respectively be connected to the opposite surfaces 32 of the pillar 30 so as to be inclined downward (i.e., toward the base 2) relative to the central axis C of the pillar 30. Each of the second engagement strips 42 may be composed of a strip body 42a and a flexible portion 42b connected to each of the opposite surfaces 32 of the pillar 30. The strip body 42a may be configured to contact or engage the periphery of the attaching hole 62 of the first panel member 60 or the attaching hole 162 of the second panel member 160 when the pillar 30 is pressed into the attaching hole 62 or the attaching hole 162. Further, a (upper) surface 42a1 of the strip body 42a and a (upper) surface 42b1 of the flexible portion 42b may respectively be flattened and shaped to be flush with each other. In particular, the surface 42a1 of the strip body 42a and the surface 42b1 of the flexible portion 42b may respectively be inclined downward with respect to the central axis C of the pillar 30 at the same angle.

As best shown in FIG. 3, similar to the first and second engagement strips 40 and 42, the third (lower) engagement strips 44 may respectively be connected to the opposite surfaces 32 of the pillar 30 so as to be inclined downward (i.e., toward the base 2) relative to the central axis C of the pillar 30. Each of the third engagement strips 44 may be composed of a strip body 44a and a flexible portion 44b connected to each of the opposite surfaces 32 of the pillar 30. The strip body 44a may be configured to contact or engage the periphery of the attaching hole 62 of the first panel member 60 or the attaching hole 162 of the second panel member 160 when the pillar 30 is pressed into the attaching hole 62 or the attaching hole 162. Further, a (upper) surface 44a1 of the strip body 44a and a (upper) surface 44b1 of the flexible portion 44b may respectively be flattened and shaped to be flush with each other. In particular, the surface 44a1 of the strip body 44a and the surface 44b1 of the flexible portion 44b may respectively be inclined downward with respect to the central axis C of the pillar 30 at the same angle.

Figure 5:
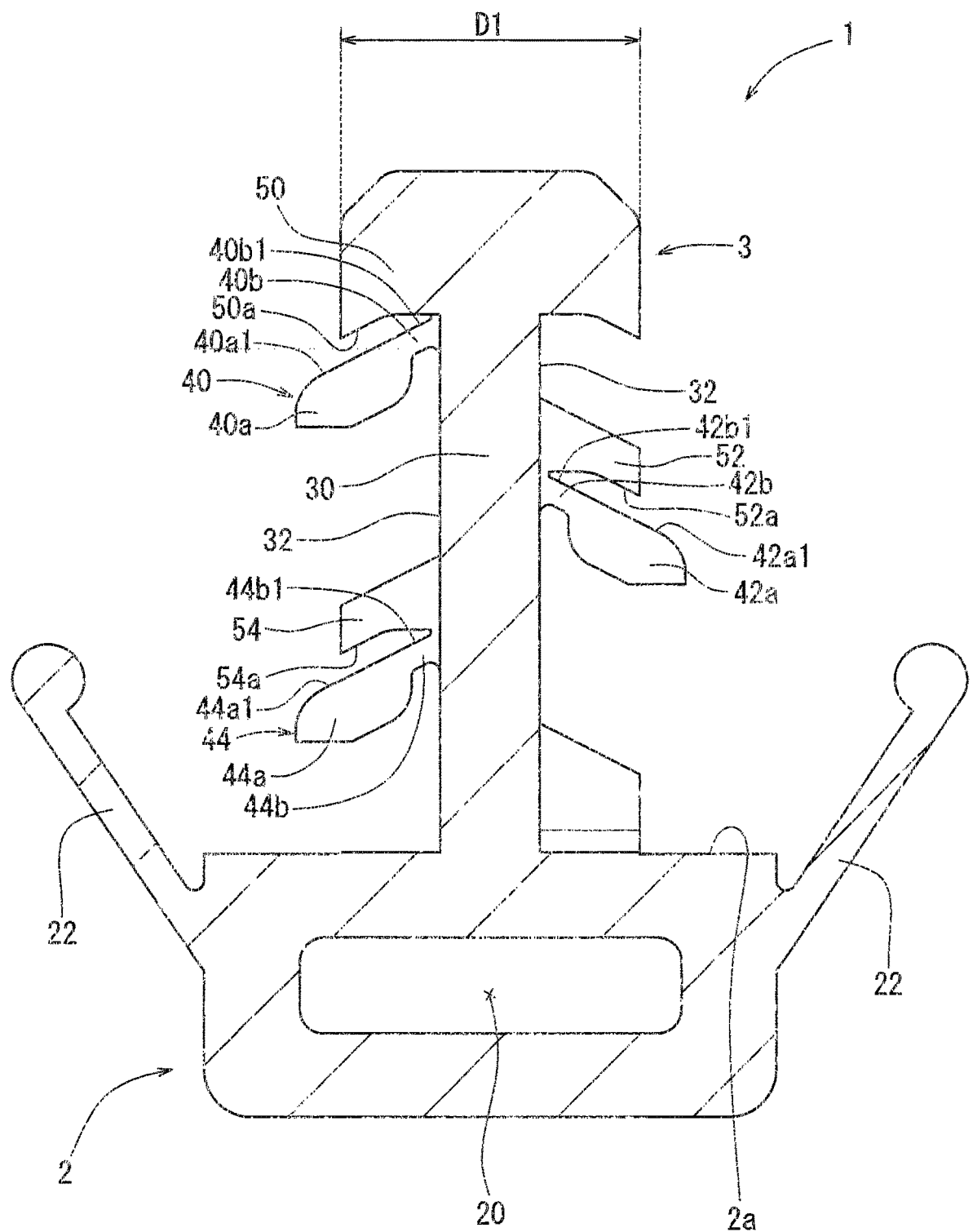
FIG. 5 is a cross-sectional view taken along line V-V of FIG. 4.

As best shown in FIG. 3, similar to the engagement strips 40, 42 and 44, the each pair of blocks 50, 52 and 54 may preferably be arranged in a 2-fold (180 degrees) rotationally symmetrical fashion about the central axis C of the pillar 30. Further, the blocks 50, 52 and 54 formed in each of the opposite surfaces 32 of the pillar 30 may respectively be referred to as first to third blocks. As best shown in FIGS. 4 and 5, the first to third blocks 50, 52 and 54 may respectively be positioned over and adjacent to the first to third engagement strips 40, 42 and 44 in a longitudinal direction of the pillar 30. That is, the first to third blocks 50, 52 and 54 may respectively be positioned on upper portions, middle portions and lower portions of the opposite surfaces 32 of the pillar 30 in combination with the first to third engagement strips 40, 42 and 44. This means that the first to third blocks 50, 52 and 54 may be arranged in a zig-zag manner along the central axis C of the pillar 30.

As best shown in FIGS. 3 and 5, the first (upper) blocks 50 may respectively be formed in the opposite surfaces 32 of the pillar 30 so as to be integrated with the top portion 30a of the pillar 30. Each of the first blocks 50 may have a downwardly inclined detent or stopper surface 50a. The stopper surface 50a may be appropriately shaped so as to face the surface 40a1 of the strip body 40a of each of the first engagement strips 40. The stopper surface 50a may preferably be directed parallel to the surface 40a1 of the strip body 40a. Further, as shown in FIGS. 1 and 2, each of the first blocks 50 may have a substantially semicircular shape corresponding to the top portion 30a of the pillar 30. That is, as shown in FIGS. 4 and 5, each of the first blocks 50 may be arranged and constructed to straddle upper both (right and left) sides of each of the opposite surfaces 32 of the pillar 30.

As shown in FIGS. 3 and 5, a distance D1 between outer circumferences of the first blocks 50 may be determined so as to be slightly smaller than an inner diameter R (FIGS. 6 and 10) of the attaching hole 62 of the first panel member 60 and the attaching hole 162 of the second panel member 160. Conversely, the strip body 40a of each of the first engagement strips 40 may be protruded beyond a circumferential periphery of each of the first blocks 50, so as to have a protrusion region having a desired length. That is, a distance between outer circumferences of the first engagement strips 40 may be determined so as to be greater than the inner diameter R (FIGS. 6 and 10) of the attaching hole 62 of the first panel member 60 and the attaching hole 162 of the second panel member 160. Therefore, the strip body 40a of each of the first engagement strips 40 can contact or engage a periphery of the attaching hole 62 of the first panel member 60 or the attaching hole 162 of the second panel member 160 when the pillar 30 is pressed or inserted into the attaching hole 62 or the attaching hole 162.

As best shown in FIGS. 3 and 5, the second (middle) blocks 52 may respectively be formed in the opposite surfaces 32 of the pillar 30. Each of the second blocks 52 may have a downwardly inclined detent or stopper surface 52a. The stopper surface 52a may be appropriately shaped so as to face the surface 42a1 of the strip body 42a of each of the second engagement strips 42. The stopper surface 52a may preferably be directed parallel to the surface 42a1 of the strip body 42a. Further, as shown in FIGS. 1 and 2, each of the second blocks 52 may have a substantially quarter-circular shape. That is, as shown in FIGS. 4 and 5, each of the second blocks 52 may be positioned on only the middle right side of each of the opposite sides 32 of the pillar 30. Therefore, when the pillar 30 is inserted into the attaching hole 62 of the first panel member 60 (or the attaching hole 162 of the second panel member 160), the strip body 40a of each of the first engagement strips 40 folded downward toward the base 2 (i.e., toward the bottom portion of the pillar 30) by contacting the periphery of the attaching hole 62 (or the attaching hole 162) may be prevented from interfering with the each of the second blocks 52.

As shown in FIG. 3, a distance D2 between outer circumferences of the second blocks 52 may be determined so as to be slightly smaller than the inner diameter R of the attaching hole 62 of the first panel member 60 and the attaching hole 162 of the second panel member 160. Conversely, the strip body 42a of each of the second engagement strips 42 may be projected beyond a circumferential periphery of each of the second blocks 52, so as to have a protrusion region having a desired length. That is, a distance between outer circumferences of the second engagement strips 42 may be determined so as to be greater than the inner diameter R (FIGS. 6 and 10) of the attaching hole 62 of the first panel member 60 and the attaching hole 162 of the second panel member 160.

As best shown in FIGS. 3 and 5, the third (lower) blocks 54 may respectively be formed in the opposite surfaces 32 of the pillar 30. Each of the third blocks 54 may have a downwardly inclined detent or stopper surface 54a. The stopper surface 54a may be appropriately shaped so as to face the surface 44a1 of the strip body 44a of each of the third engagement strips 44. The stopper surface 54a may preferably be directed parallel to the surface 44a1 of the strip body 44a. Further, as shown in FIGS. 1 and 2, each of the second blocks 54 may have a substantially quarter-circular shape. That is, as shown in FIGS. 4 and 5, each of the second blocks 54 may be positioned on only the lower left side of each of the opposite sides 32 of the pillar 30. Therefore, when the pillar 30 is inserted into the attaching hole 62 of the first panel member 60 (or the attaching hole 162 of the second panel member 160), the strip body 42a of each of the second engagement strips 42 folded downward toward the base 2 by contacting the periphery of the attaching hole 62 (or the attaching hole 162) may be prevented from interfering with the each of the third blocks 54.

As shown in FIG. 3, a distance D3 between outer circumferences of the third blocks 54 may be determined so as to be slightly smaller than the inner diameter R of the attaching hole 62 of the first panel member 60 and the attaching hole 162 of the second panel member 160. Conversely, the strip body 44a of each of the third engagement strips 44 may be projected beyond a circumferential periphery of each of the second blocks 54, so as to have a protrusion region having a desired length. That is, a distance between outer circumferences of the third engagement strips 44 may be determined so as to be greater than the inner diameter R (FIGS. 6 and 10) of the attaching hole 62 of the first panel member 60 and the attaching hole 162 of the second panel member 160.

Figure 6:
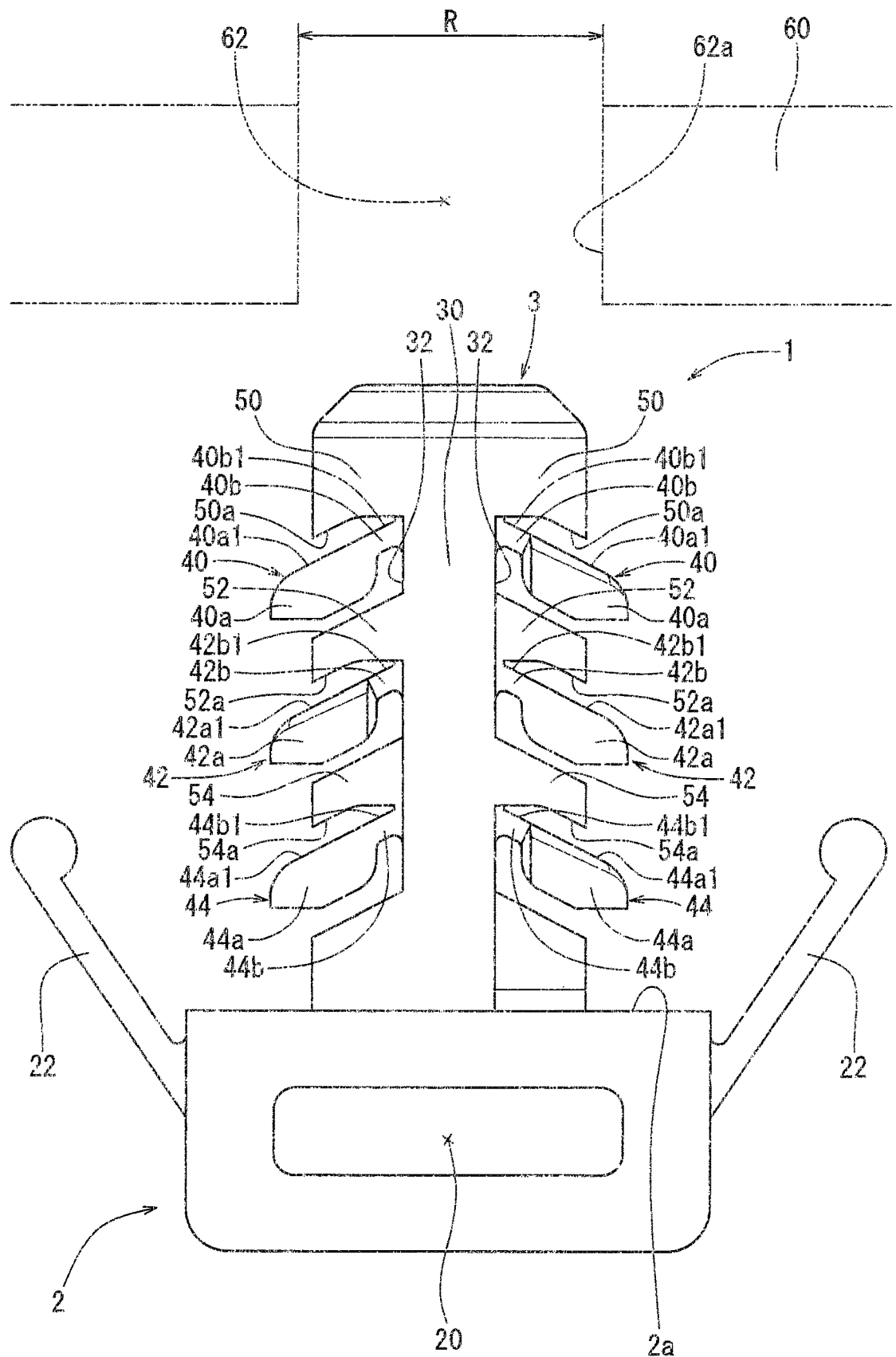
FIG. 6 is an elevational view of the clip, which view illustrates a condition before an anchor of the clip is inserted into an insertion hole formed in a first panel member.
Figure 7:
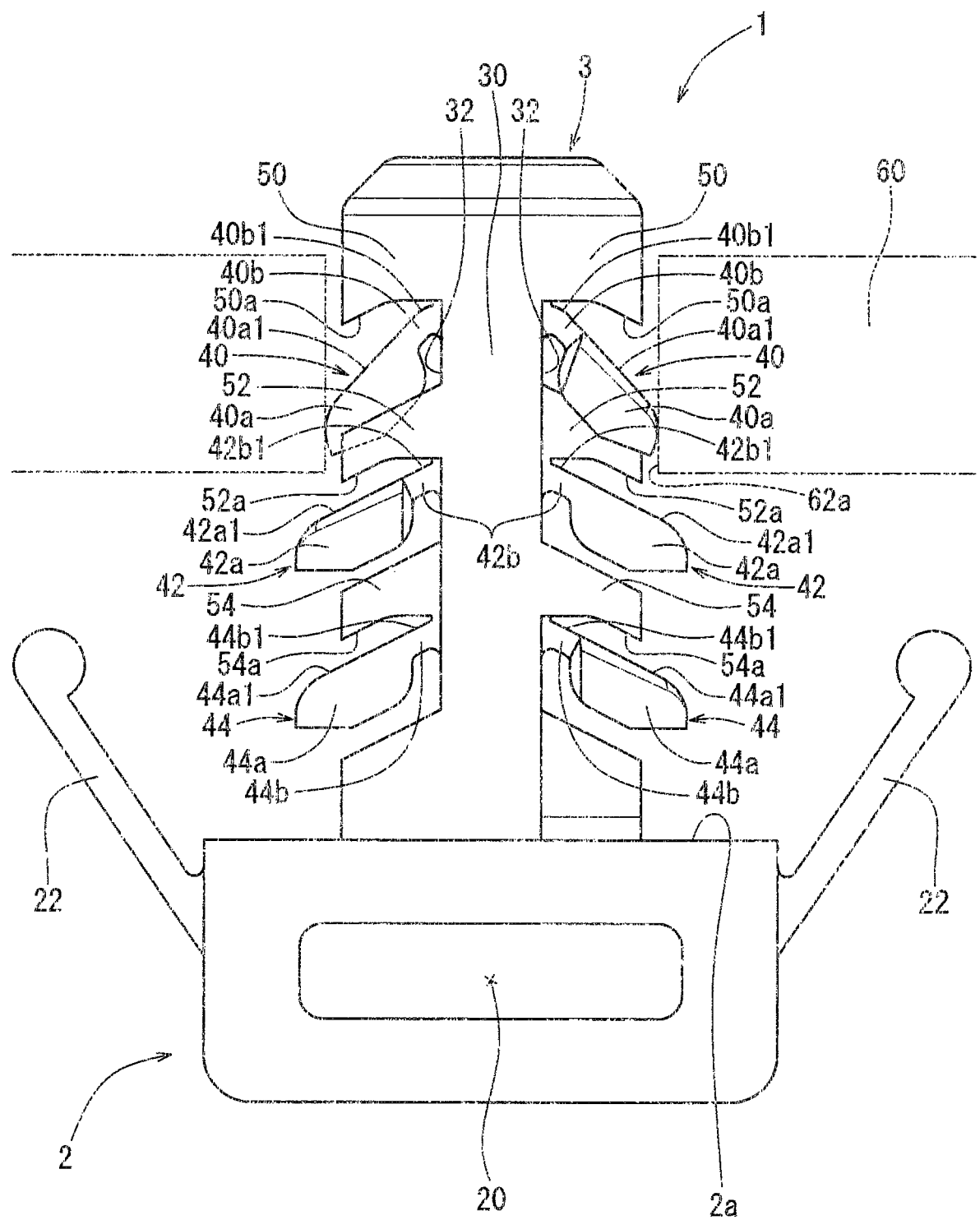
FIG. 7 is an elevational view of the clip, which view illustrates a condition in which the anchor of the clip is being inserted into the insertion hole of the first panel member.

Next, an operation of the clip 1 will now be described with reference to FIGS. 6 to 13. First, in order to attach the attaching member (not shown) to the first panel member 60 (the subject member) that is large in thickness, the base 2 of the clip 1 may be connected to the attaching member via the coupling hole 20 formed therein, so as to combine the clip 1 with the attaching member. Thereafter, as shown in FIG. 6, the anchor 3 (the pillar 30) of the clip 1 may be pressed against and inserted into the attaching hole 62 formed in the first panel member 60. Upon insertion of the anchor 3, each of the first engagement strips 40 (the strip body 40a) formed in the pillar 30 may contact an inner surface 62a of the attaching hole 62. As a result, the anchor 3 may be introduced into the attaching hole 62 while each of the first engagement strips 40 is folded downward (inward) about the flexible portion 40b (FIG. 7).

Figure 8:
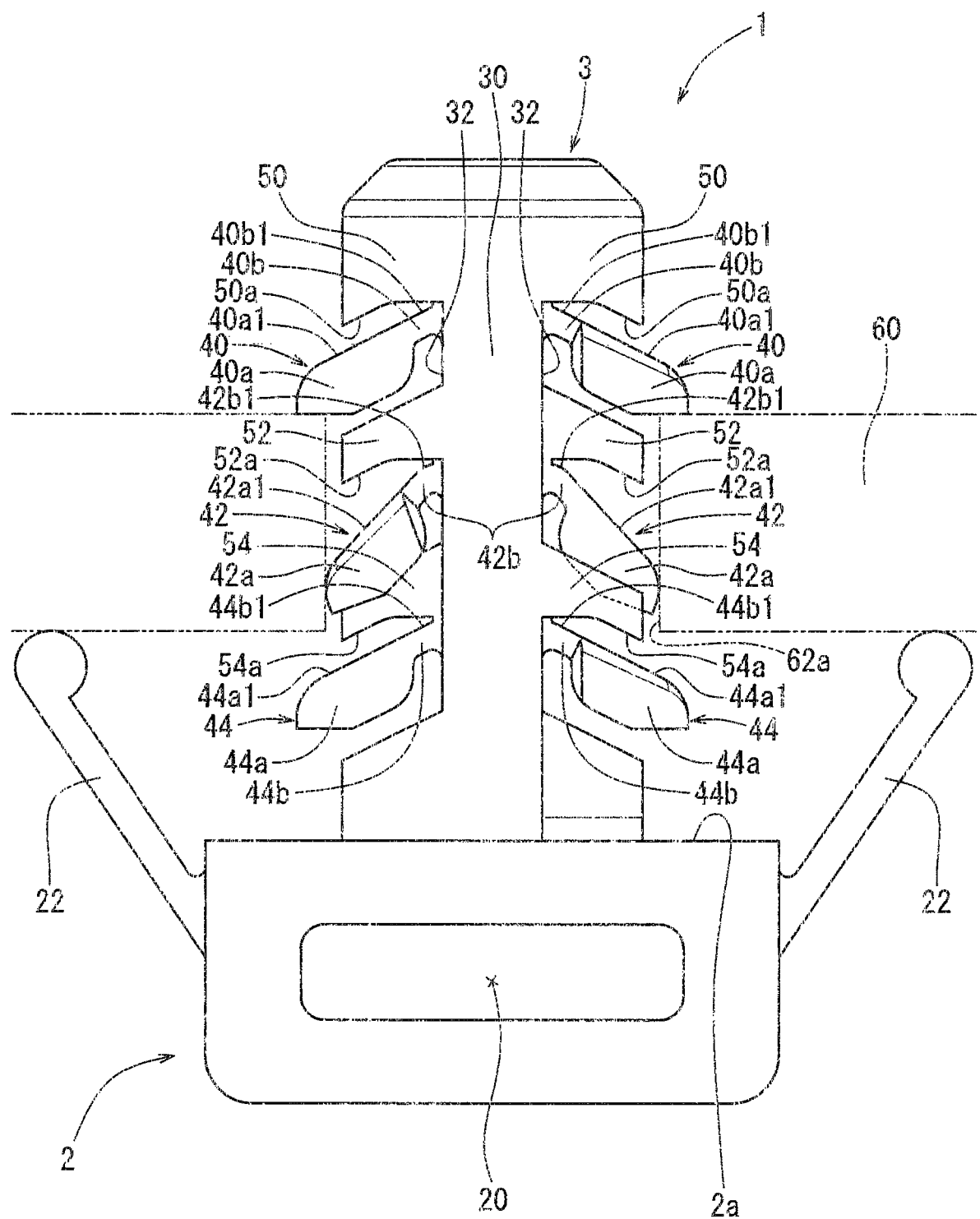
FIG. 8 is an elevational view of the clip, which view illustrates a condition in which the anchor of the clip is completely inserted into the insertion hole of the first panel member, so that the clip is attached to the first panel member.

When the anchor 3 of the clip 1 is further inserted into the attaching hole 62 of the first panel member 60, each of the second engagement strips 42 is started to be folded downward (inward) about the flexible portion 42b. Subsequently, when the anchor 3 is completely inserted into the attaching hole 62, the first engagement strips 40 may pass through the attaching hole 62. As a result, the first engagement strips 40 may respectively be restored outward and be released from the attaching hole 62. Thus, each of the first engagement strips 40 (the strip body 40a) can be elastically restored, so as to elastically engage the periphery of the attaching hole 62 (FIG. 8). At this time, the second engagement strips 42 may respectively be held in the attaching hole 62 while being folded inward. Further, the stabilizers 22 may elastically contact a surface of the first panel member 60 so as to stabilize the clip 1. Thus, the anchor 3 (the clip 1) can be attached to the first panel member 60 with a desired retention force (which may be referred to as an attached condition of the clip 1). As a result, the attaching member can be attached to the first panel member 60 via the clip 1.

According to the embodiment, the clip 1 can be easily attached to the first panel member 60. Therefore, the attaching member can be easily attached to the first panel member 60 via the clip 1. Further, when the anchor 3 of the clip 1 is inserted into the attaching hole 62, the first and second engagement strips 40 and 42 can be freely folded inward. Therefore, the anchor 3 can be inserted into the attaching hole 62 with a reduced insertion load.

Figure 9:
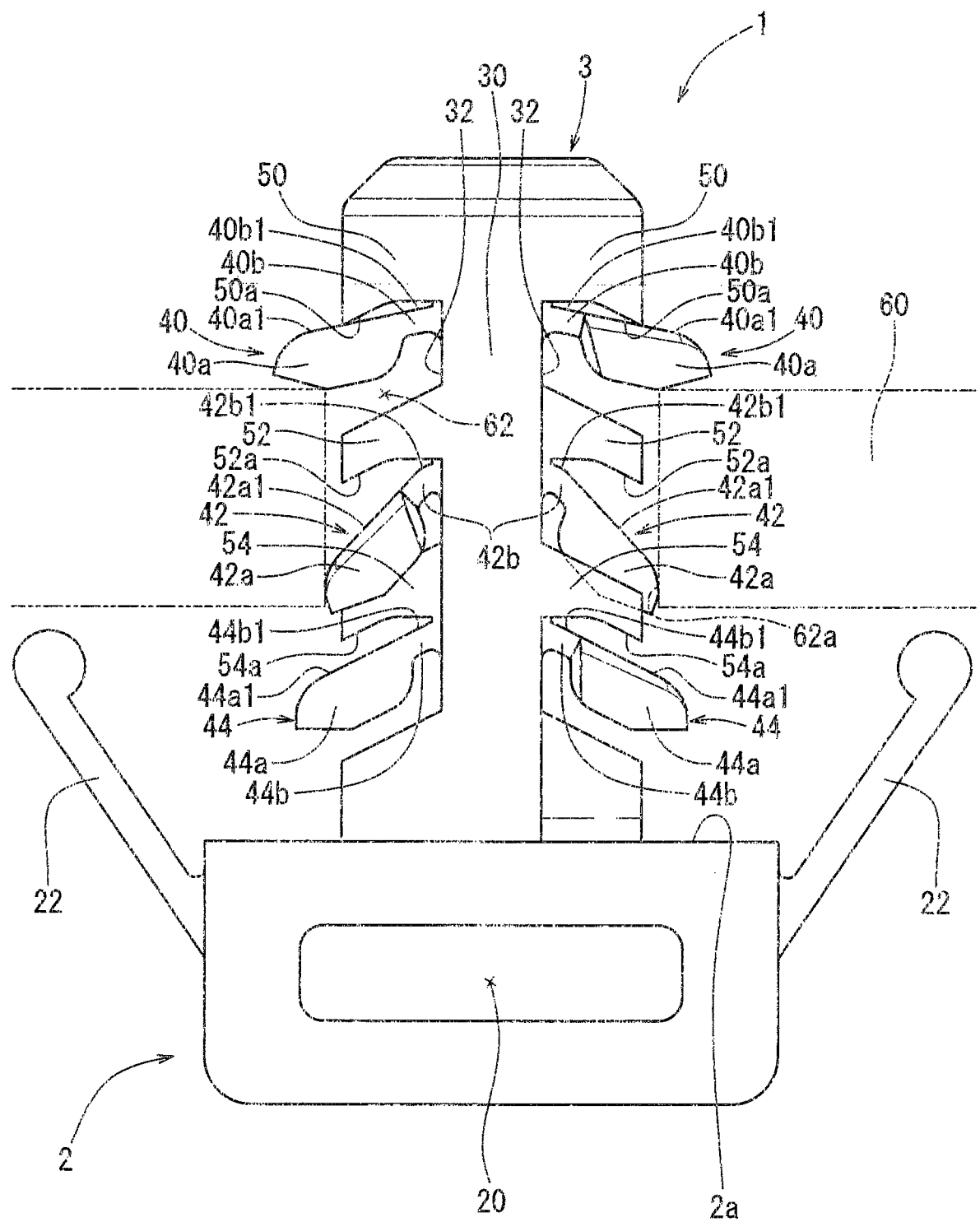
FIG. 9 is a view similar to FIG. 8, which view illustrates a condition in which an extraction load is applied to the clip.

Further, in the attached condition of the clip 1, i.e., in a condition in which the clip 1 is attached to the first panel member 60 (FIG. 8), when a removal or extraction load (a large pullout load) is applied to the anchor 3 (the clip 1) via the base 2, such an extraction load can be applied to the first engagement strips 40 through the periphery of the attaching hole 62. As a result, each of the first engagement strips 40 can be folded back (upward and outward) about the flexible portion 40b (FIG. 9). However, as previously described, the anchor 3 may have the first blocks 50 that are positioned directly above and adjacent to the first engagement strips 40. Therefore, when each of the first engagement strips 40 are folded back, the surface 40a1 of the strip body 40a may contact or interfere with the stopper surface 50a of each of the first blocks 50 (FIG. 9). As a result, the first engagement strips 40 can be prevented from being excessively folded back.

Thus, the first engagement strips 40 can be prevented from being disengaged from the periphery of the attaching hole 62, so that the clip 1 (the anchor 3) attached to the first panel member 60 can be prevented from being removed from the first panel member 60. As a result, the attaching member attached to the first panel member 60 via the clip 1 may be prevented from being removed from the first panel member 60.

Further, when the surface 40a1 of the strip body 40a of each of the first engagement strips 40 contacts the stopper surface 50a of each of the first blocks 50 due to the extraction load, the strip body 40a of each of the first engagement strips 40 may be subjected to a shearing force. Therefore, the clip 1 can be retained in the attaching hole 62 with a desired retention force that is capable of resisting the extraction load applied thereto.

Figure 10:
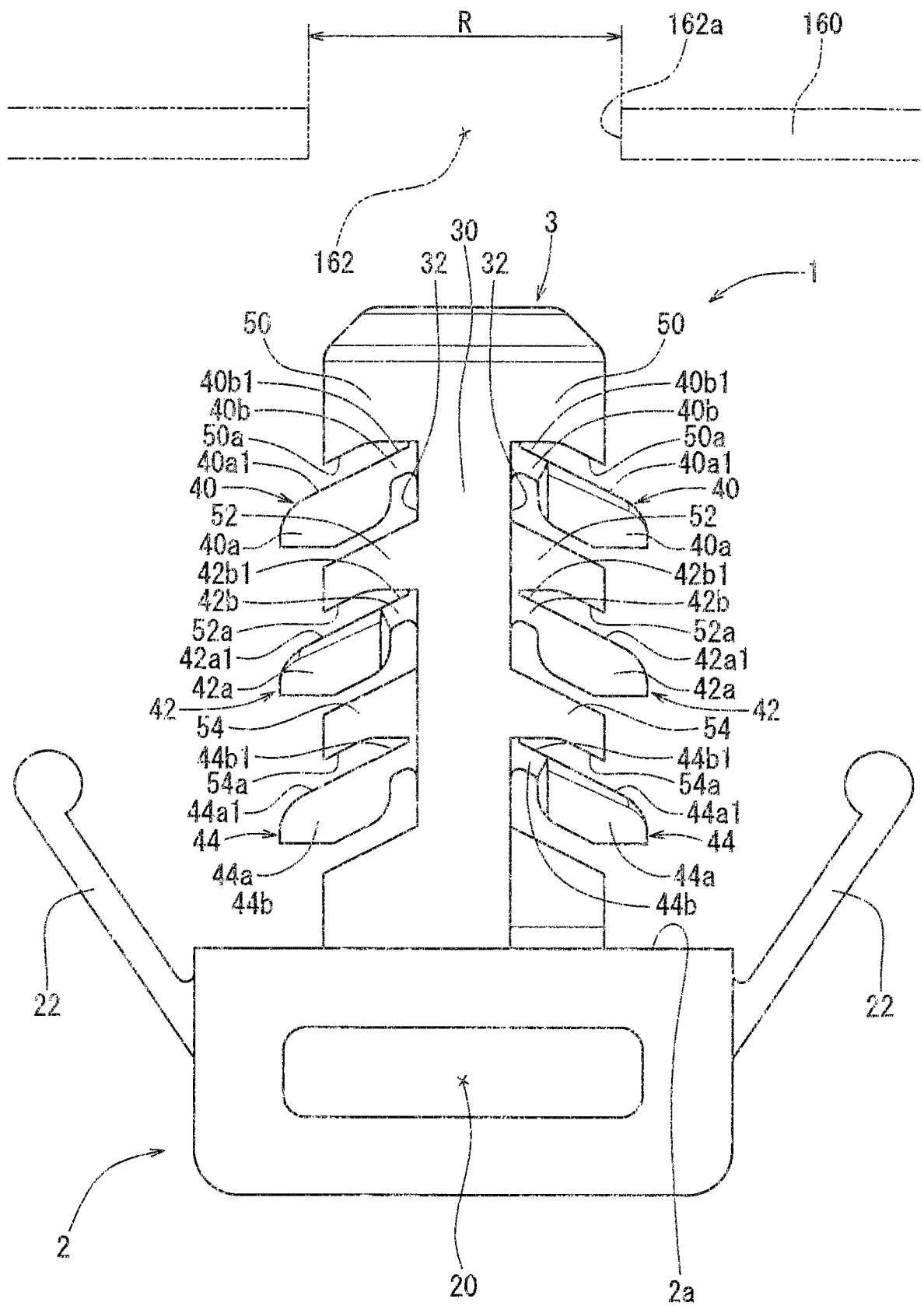
FIG. 10 is an elevational view of the clip, which view illustrates a condition before an anchor of the clip is inserted into an insertion hole formed in a second panel member.

Next, in order to attach the attaching member (not shown) to the second panel member 160 (the subject member) that is small in thickness, as shown in FIG. 10, the anchor 3 (the pillar 30) of the clip 1 may be pressed against and inserted into the attaching hole 162 formed in the second panel member 160. Upon insertion of the anchor 3, each of the first engagement strips 40 (the strip body 40a) formed in the pillar 30 may contact an inner surface 162a of the attaching hole 162. As a result, the anchor 3 may be introduced into the attaching hole 162 while each of the first engagement strips 40 is folded downward (inward) about the flexible portion 40b. Subsequently, when the anchor 3 is further inserted into the attaching hole 162, the first engagement strips 40 may passes through the attaching hole 162. As a result, the first engagement strips 40 may respectively be restored outward and be released from the attaching hole 162.

Thereafter, when the anchor 3 is further inserted into the attaching hole 162, each of the second engagement strips 42 (the strip body 42a) formed in the pillar 30 may contact an inner surface 162a of the attaching hole 162. As a result, the anchor 3 may be further introduced into the attaching hole 162 while each of the second engagement strips 42 is folded downward (inward) about the flexible portion 42b. Subsequently, when the anchor 3 is further inserted into the attaching hole 162, the second engagement strips 42 may passes through the attaching hole 162. As a result, the second engagement strips 42 may respectively be restored outward and be released from the attaching hole 162.

Figure 11:
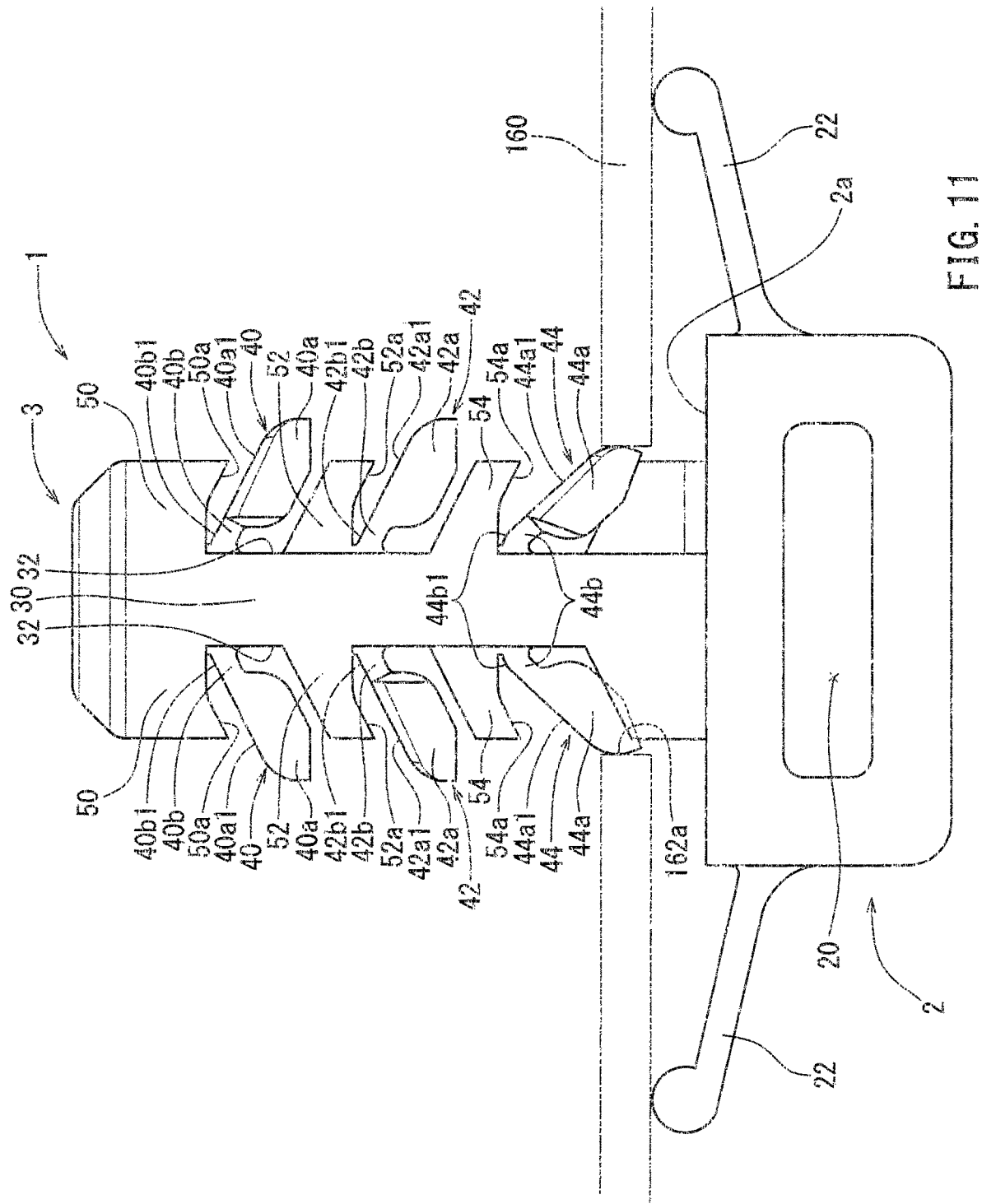
FIG. 11 is an elevational view of the clip, which view illustrates a condition in which the anchor of the clip is being inserted into the insertion hole of the second panel member.

Thereafter, when the anchor 3 is further inserted into the attaching hole 162, each of the third engagement strips 44 (the strip body 44a) formed in the pillar 30 may contact an inner surface 162a of the attaching hole 162. As a result, the anchor 3 may be further introduced into the attaching hole 162 while each of the third engagement strips 44 is folded downward (inward) about the flexible portion 44b (FIG. 11).

When the anchor 3 is completely inserted into the attaching hole 162, the third engagement strips 44 may pass through the attaching hole 162. As a result, the third engagement strips 44 may respectively be restored outward and be released from the attaching hole 162. Thus, each of the third engagement strips 44 (the strip body 44a) can elastically engage the periphery of the attaching hole 162 (FIG. 12). At this time, the stabilizers 22 may elastically contact a surface of the second panel member 160 so as to stabilize the clip 1. Thus, the anchor 3 (the clip 1) can be attached to the second panel member 160 with a desired retention force (which may be referred to as an attached condition of the clip 1). As a result, the attaching member can be attached to the second panel member 160 via the clip 1.

According to the embodiment, the clip 1 can be easily attached to the second panel member 160. Therefore, the attaching member can be easily attached to the second panel member 160 via the clip 1. Further, when the anchor 3 of the clip 1 is inserted into the attaching hole 162, the first to third engagement strips 40, 42 and 44 can be freely folded inward in sequence. Therefore, the anchor 3 can be inserted into the attaching hole 162 with a reduced insertion load.

Figure 13:
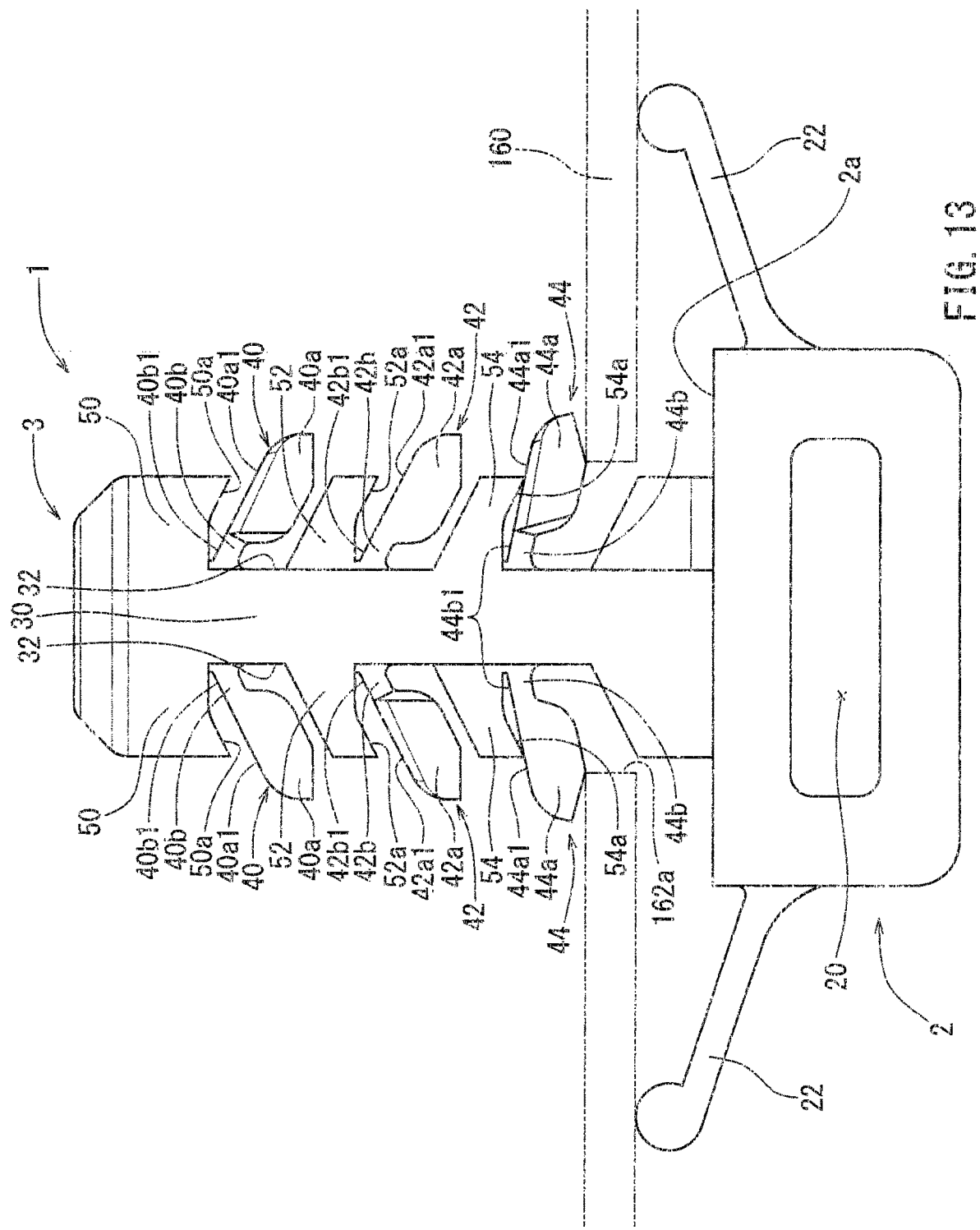
FIG. 13 is a view similar to FIG. 12, which view illustrates a condition in which an extraction load is applied to the clip.

Further, in the attached condition of the clip 1, i.e., in a condition in which the clip 1 is attached to the second panel member 160 (FIG. 12), when a removal or extraction load (a large pullout load) is applied to the anchor 3 (the clip 1) via the base 2, such an extraction load can be applied to the third engagement strips 44 through the periphery of the attaching hole 162. As a result, each of the third engagement strips 44 can be folded back (upward and outward) about the flexible portion 44b (FIG. 13). However, as previously described, the anchor 3 may have the third blocks 54 that are positioned directly above and adjacent to the third engagement strips 44. Therefore, when each of the third engagement strips 44 are folded back, the surface 44a1 of the strip body 44a may contact the stopper surface 54a of each of the third blocks 54 (FIG. 13). As a result, the third engagement strips 44 can be prevented from being excessively folded back.

Thus, the third engagement strips 44 can be prevented from being disengaged from the periphery of the attaching hole 162, so that the clip 1 (the anchor 3) attached to the second panel member 160 can be prevented from being removed from the second panel member 160. As a result, the attaching member attached to the second panel member 160 via the clip 1 may be prevented from being removed from the second panel member 160.

Further, when the surface 44a1 of the strip body 44a of each of the third engagement strips 44 contacts the stopper surface 54a of each of the third blocks 54 due to the extraction load, the strip body 44a of each of the third engagement strips 44 may be subjected to a shearing force. Therefore, the clip 1 can be retained in the attaching hole 162 with a desired retention force that is capable of resisting the extraction load applied thereto.

As described above, according to the clip 1 thus constructed, when the extraction load is applied to the clip 1 attached to the first panel member 60 or the second panel member 160, the first to third engagement strips 40, 42 and 44 can respectively be prevented from being excessively folded back due to the presence of the first to third blocks 50, 52 and 54. Therefore, the clip 1 attached to the first panel member 60 or the second panel member 160 can be effectively prevented from being removed therefrom. As a result, the attaching member attached to the first panel member 60 or the second panel member 160 via the clip 1 may be prevented from being removed therefrom.

Further, each of the first to third engagement strips 40, 42 and 44 is inclined downward relative to the central axis C of the pillar 30. Therefore, the pillar 30 can be smoothly inserted into the attaching hole 62 of the first panel member 60 (or the attaching hole 162 of the second panel member 160).

The stopper surface 50a, 52a and 54a of each of the first to third blocks 50, 52 and 54 is directed parallel to the surface 40a1, 42a1 and 42a1 of the strip body 40a, 42a and 44a of each of the first to third engagement strips 40, 42 and 44. Therefore, when the extraction load is applied to the clip 1, each of the first to third engagement strips 40, 42 and 44 can be quickly prevented from being excessively folded back by each of the first to third blocks 50, 52 and 54.

Further, the distance D1 between the outer circumferences of the first blocks 50, the distance D2 between the outer circumferences of the second blocks 52 and the distance D3 between the outer circumferences of the third blocks 54 are respectively determined so as to be slightly smaller than the inner diameter R of the attaching hole 62 of the first panel member 60 and the attaching hole 162 of the second panel member 160. Therefore, the pillar 30 can be inserted into the attaching hole 62 of the first panel member 60 (or the attaching hole 162 of the second panel member 160) while the central axis C of the pillar 30 is in substantially alignment with an axis of the attaching hole 62 (or the attaching hole 162).

Second Embodiment

A second detailed representative embodiment will be described with reference to FIGS. 14 to 26. Further, because the second embodiment relates to the first embodiment, only the constructions and elements that are different from the first embodiment will be explained in detail. Elements that are the same in the first and second embodiments will be identified by the same reference numerals and a detailed description of such elements may be omitted or simplified.

Figure 14:
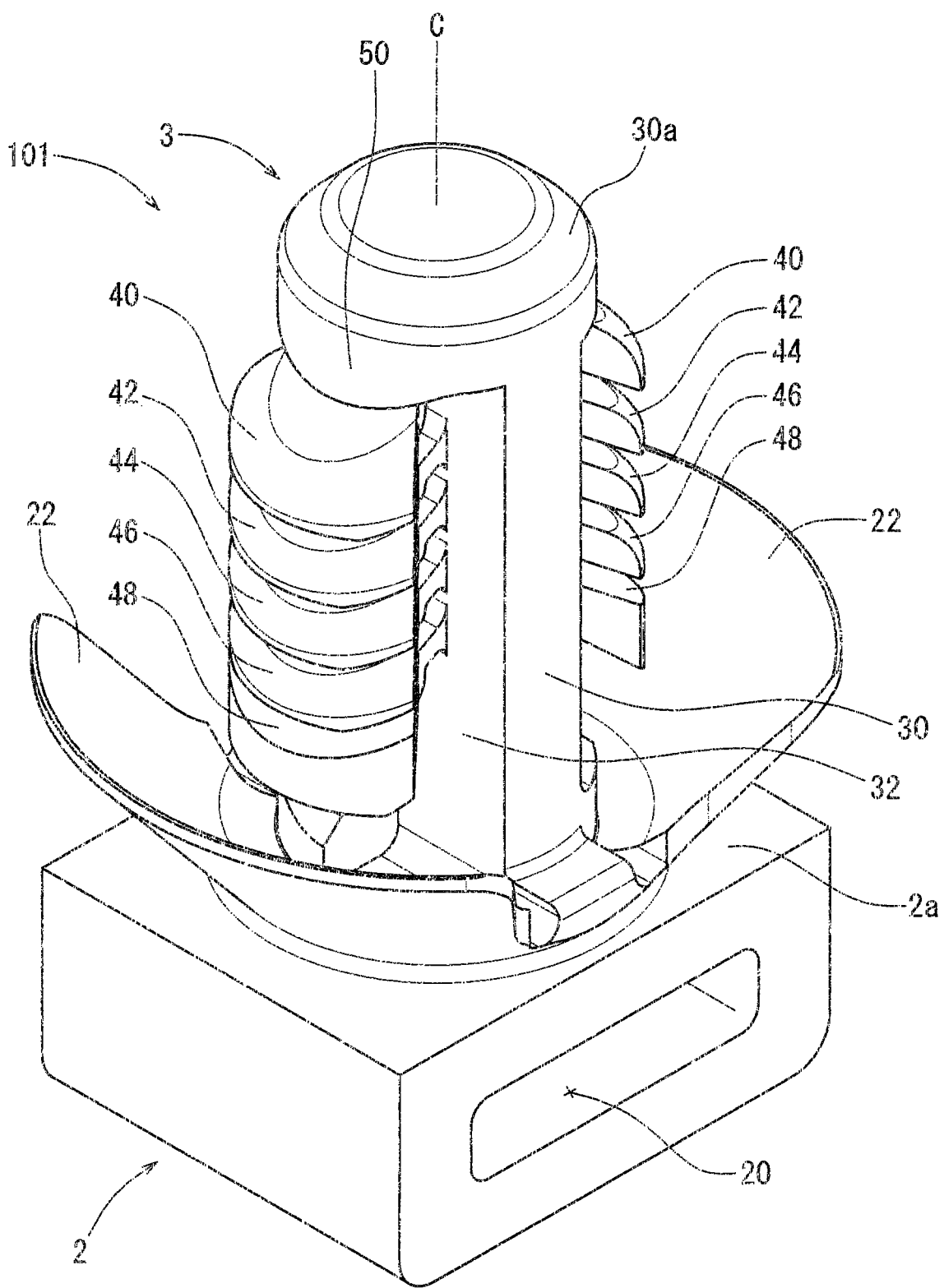
FIG. 14 is a perspective view of a clip according to a second embodiment.
Figure 15:
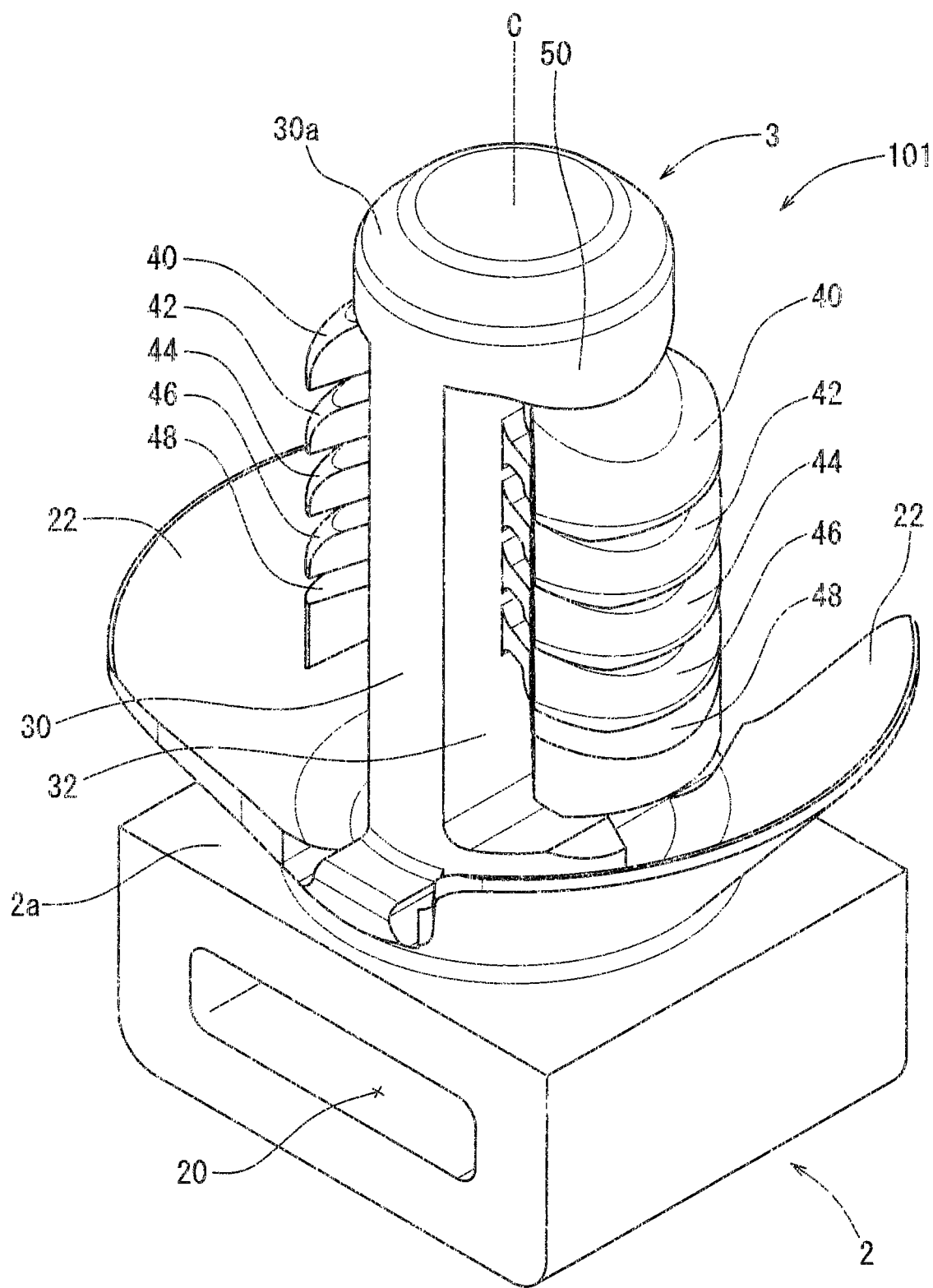
FIG. 15 is a perspective view of the clip, which is viewed from a direction different from FIG. 14.
Figure 16:
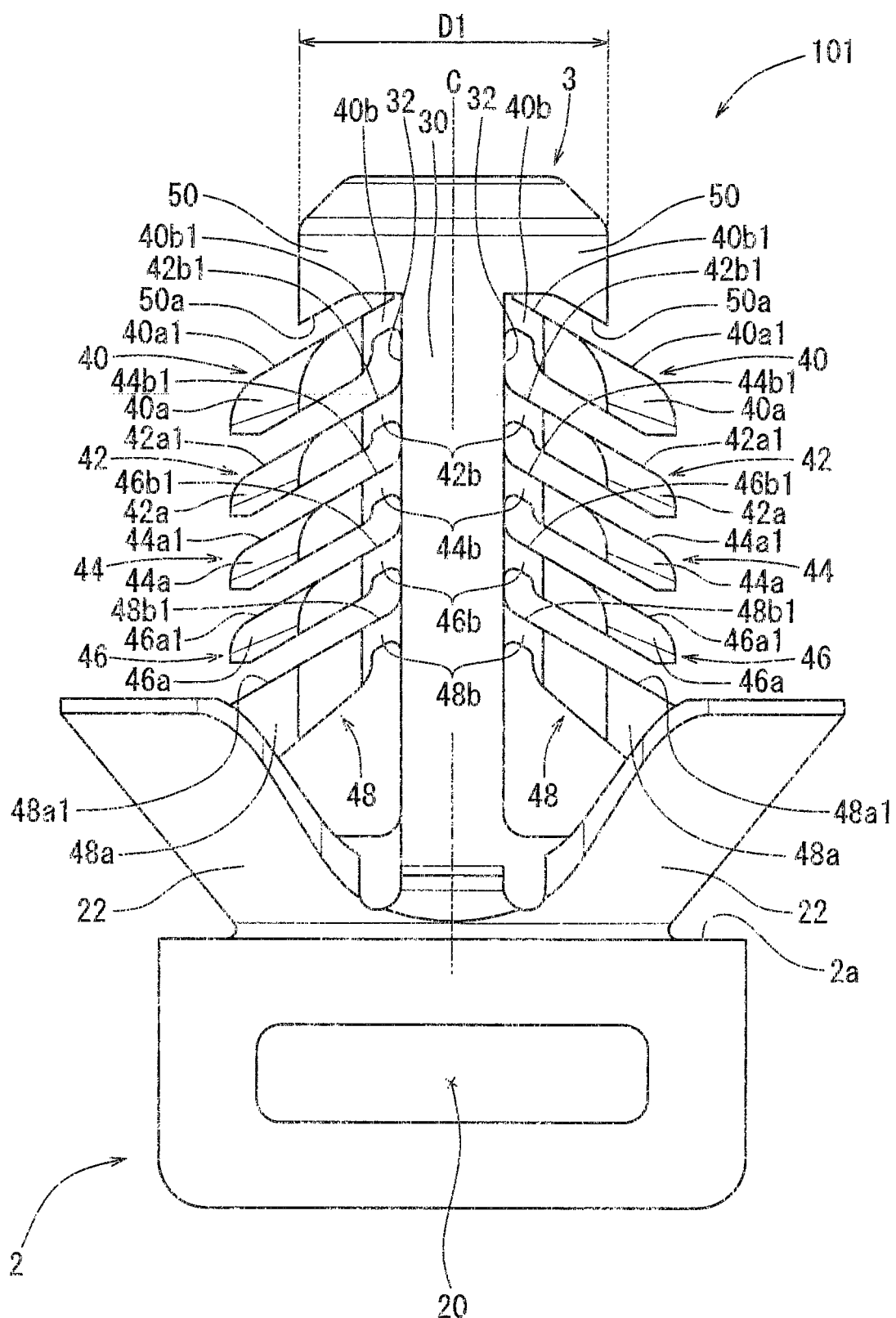
FIG. 16 is an elevational view of the clip.

As shown in FIGS. 14 to 18, a clip 101 may preferably include a base 2 and an anchor 3. As shown in FIGS. 14 to 16, the anchor 3 may have a headed plate-shaped pillar 30. The pillar 30 may have a tapered circular disk-shaped top (head) portion 30a and a bottom portion connected to the base 2. Further, the anchor 3 may have five (first to fifth) pairs of cantilevered flexible engagement strips 40, 42, 44, 46 and 48 and a pair of rigid blocks 50 that are formed in opposite surfaces 32 of the pillar 30. Further, the first pair of engagement strips 40 and the fifth pair of engagement strips 48 may respectively be referred to as a top-side pair of engagement strips and a bottom-side pair of engagement strips. Further, unlike the first embodiment, the stabilizers 22 may be formed in the upper surface 2a of the base 2. The stabilizers 22 may be positioned across the pillar 30 on the upper surface 2a of the base 2 and projected obliquely upward therefrom.

Figure 17:
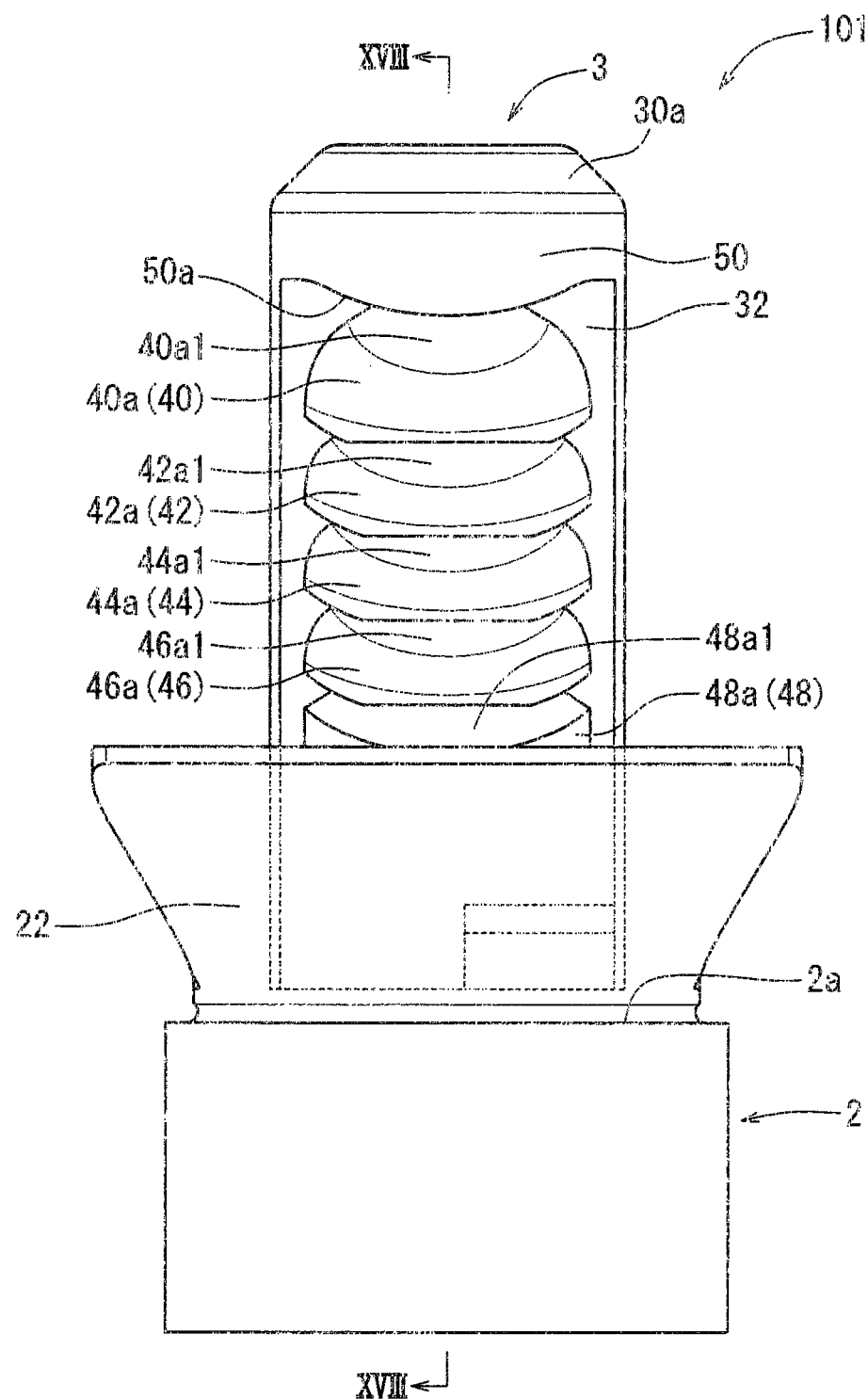
FIG. 17 is a side view of the clip.

As best shown in FIG. 16, the each pair of engagement strips 40, 42, 44, 46 and 48 may preferably be arranged in a 2-fold (180 degrees) rotationally symmetrical fashion about a central axis C of the pillar 30. Further, the engagement strips 40, 42, 44, 46 and 48 formed in each of the opposite surfaces 32 of the pillar 30 may respectively be referred to as first to fifth engagement strips. As shown in FIG. 17, unlike the first embodiment, the first to fifth engagement strips 40, 42, 44, 46 and 48 may be arranged in a linear arrangement along the central axis C of the pillar 30. That is, the first to fifth engagement strips 40, 42, 44, 46 and 48 may be positioned on each of the opposite surfaces 32 of the pillar 30 in a row along the central axis C of the pillar 30.

Figure 18:
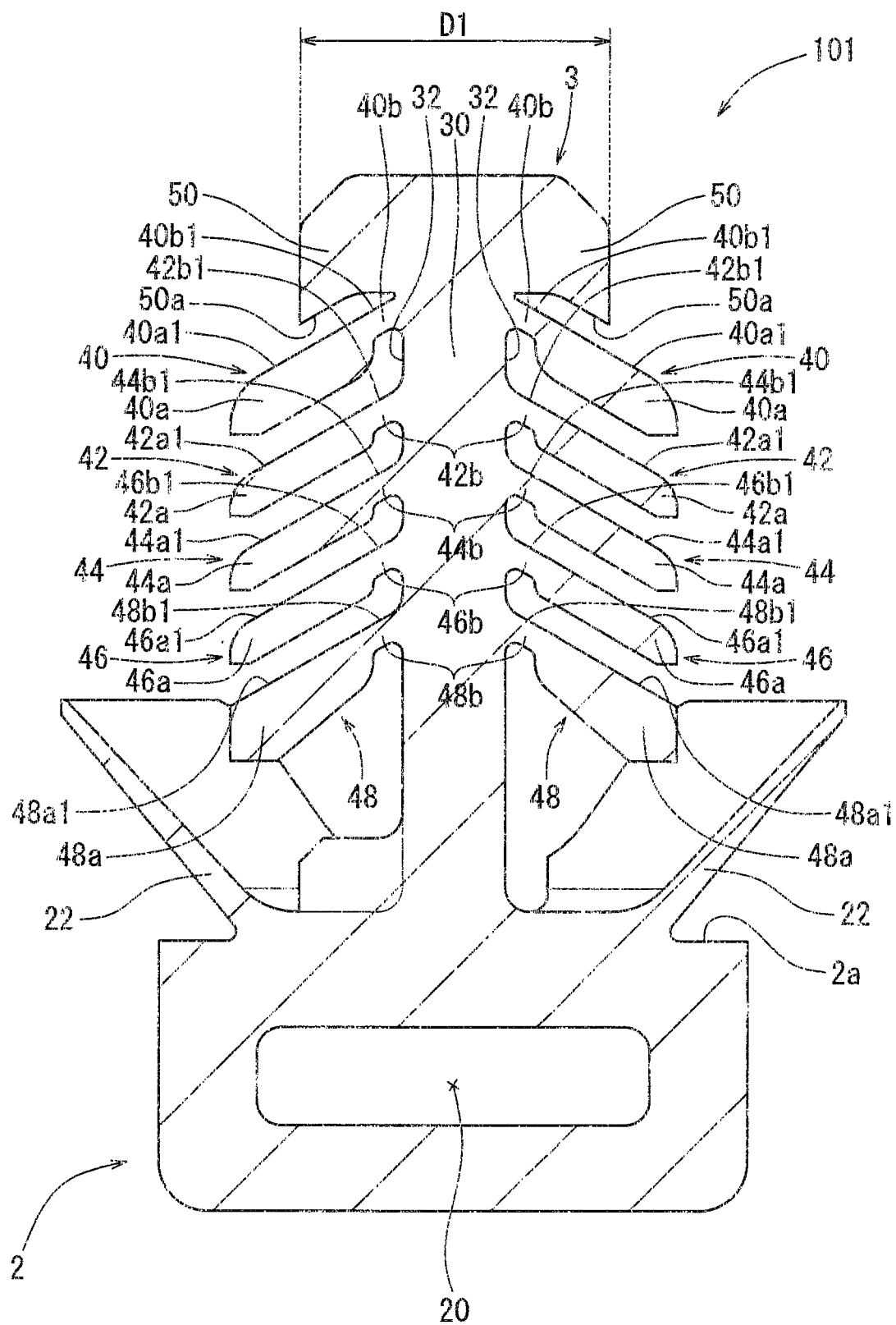
FIG. 18 is a cross-sectional view taken along line XVIII-XVIII of FIG. 17.

As shown in FIGS. 16 to 18, the first (upper or top-side) engagement strips 40 may respectively be connected to the opposite surfaces 32 of the pillar 30 so as to be inclined downward (i.e., toward the base 2) relative to the central axis C of the pillar 30. Each of the first engagement strips 40 may be composed of a strip body 40a having a rounded periphery and a flexible portion 40b connected to each of the opposite surfaces 32 of the pillar 30. The strip body 40a may be configured to contact or engage a periphery of the attaching hole 62 of the first panel member 60 or the attaching hole 162 of the second panel member 160 when the pillar 30 is pressed into the attaching hole 62 or the attaching hole 162. Further, a (upper) surface 40a1 of the strip body 40a and a (upper) surface 40b1 of the flexible portion 40b may respectively be flattened and shaped to be flush with each other. In particular, the surface 40a1 of the strip body 40a and the surface 40b1 of the flexible portion 40b may respectively be inclined downward with respect to the central axis C of the pillar 30 at the same angle.

As shown in FIGS. 16 to 18, similar to the first engagement strips 40, the second engagement strips 42 may respectively be connected to the opposite surfaces 32 of the pillar 30 so as to be inclined downward relative to the central axis C of the pillar 30. Each of the second engagement strips 42 may be composed of a strip body 42a and a flexible portion 42b connected to each of the opposite surfaces 32 of the pillar 30. The strip body 42a may be configured to contact or engage the periphery of the attaching hole 62 of the first panel member 60 or the attaching hole 162 of the second panel member 160 when the pillar 30 is pressed into the attaching hole 62 or the attaching hole 162. Further, a (upper) surface 42a1 of the strip body 42a and a (upper) surface 42b1 of the flexible portion 42b may respectively be flattened and shaped to be flush with each other. In particular, the surface 42a1 of the strip body 42a and the surface 42b1 of the flexible portion 42b may respectively be inclined downward with respect to the central axis C of the pillar 30 at the same angle. Further, the strip body 42a may have a thickness smaller than the strip body 40a of each of the first engagement strips 40.

As shown in FIGS. 16 to 18, the third engagement strips 44 may respectively have the same structure as the second engagement strips 42. Each of the third engagement strips 44 may be composed of a strip body 44a and a flexible portion 44b connected to each of the opposite surfaces 32 of the pillar 30. Further, a (upper) surface 44a1 of the strip body 44a and a (upper) surface 44b1 of the flexible portion 44b may respectively be flattened and shaped to be flush with each other. In particular, the surface 44a1 of the strip body 44a and the surface 44b1 of the flexible portion 44b may respectively be inclined downward with respect to the central axis C of the pillar 30 at the same angle.

As shown in FIGS. 16 to 18, the fourth engagement strips 46 may respectively have the same structure as the second engagement strips 42. Each of the fifth engagement strips 46 may be composed of a strip body 46a and a flexible portion 46b connected to each of the opposite surfaces 32 of the pillar 30. Further, a (upper) surface 46a1 of the strip body 46a and a (upper) surface 46b1 of the flexible portion 46b may respectively be flattened and shaped to be flush with each other. In particular, the surface 46a1 of the strip body 46a and the surface 46b1 of the flexible portion 46b may respectively be inclined downward with respect to the central axis C of the pillar 30 at the same angle.

As shown in FIGS. 16 to 18, the fifth (lower or bottom-side) engagement strips 48 may respectively be connected to the opposite surfaces 32 of the pillar 30 so as to be inclined downward relative to the central axis C of the pillar 30. Each of the fifth engagement strips 48 may be composed of a strip body 48a and a flexible portion 48b connected to each of the opposite surfaces 32 of the pillar 30. The strip body 48a may be configured to contact or engage the periphery of the attaching hole 62 of the first panel member 60 or the attaching hole 162 of the second panel member 160 when the pillar 30 is pressed into the attaching hole 62 or the attaching hole 162. Further, a (upper) surface 48a1 of the strip body 48a and a (upper) surface 48b1 of the flexible portion 48b may respectively be flattened and shaped to be flush with each other. In particular, the surface 48a1 of the strip body 48a and the surface 48b1 of the flexible portion 48b may respectively be inclined downward with respect to the central axis C of the pillar 30 at the same angle. Further, the fifth engagement strips 48 may be configured to be greater than the first engagement strips 40 in thickness of the strip body 48a.

As best shown in FIG. 16, the pair of blocks 50 may preferably be arranged in a 2-fold (180 degrees) rotationally symmetrical fashion about the central axis C of the pillar 30. As best shown in FIGS. 16 to 18, the blocks 50 may respectively be positioned over and adjacent to the first engagement strips 40. That is, the blocks 50 may respectively be positioned on upper portions of the opposite surfaces 32 of the pillar 30 in combination with the first engagement strips 40.

As best shown in FIGS. 3 and 5, the blocks 50 may respectively be formed in the opposite surfaces 32 of the pillar 30 so as to be integrated with the top portion 30a of the pillar 30. Each of the blocks 50 may have a downwardly inclined detent or stopper surface 50a.

As shown in FIGS. 16 to 18, a distance D1 between outer circumferences of the blocks 50 may be determined so as to be slightly smaller than an inner diameter R (FIGS. 19 and 23) of the attaching hole 62 of the first panel member 60 and the attaching hole 162 of the second panel member 160. Conversely, the strip body 40a, 42a, 44a, 46a and 48a of each of the first to fifth engagement strips 40, 42, 44, 46 and 48 may be protruded beyond a circumferential periphery of each of the first blocks 50, so as to have a protrusion region having a desired length. Further, as shown in FIG. 18, the first to fifth engagement strips 40, 42, 44, 46 and 48 may respectively be positioned at substantially regular intervals. Preferably, the first to fifth engagement strips 40, 42, 44, 46 and 48 may respectively be positioned at predetermined small intervals that are smaller than a thickness thereof and a length of the protrusion region.

Figure 19:
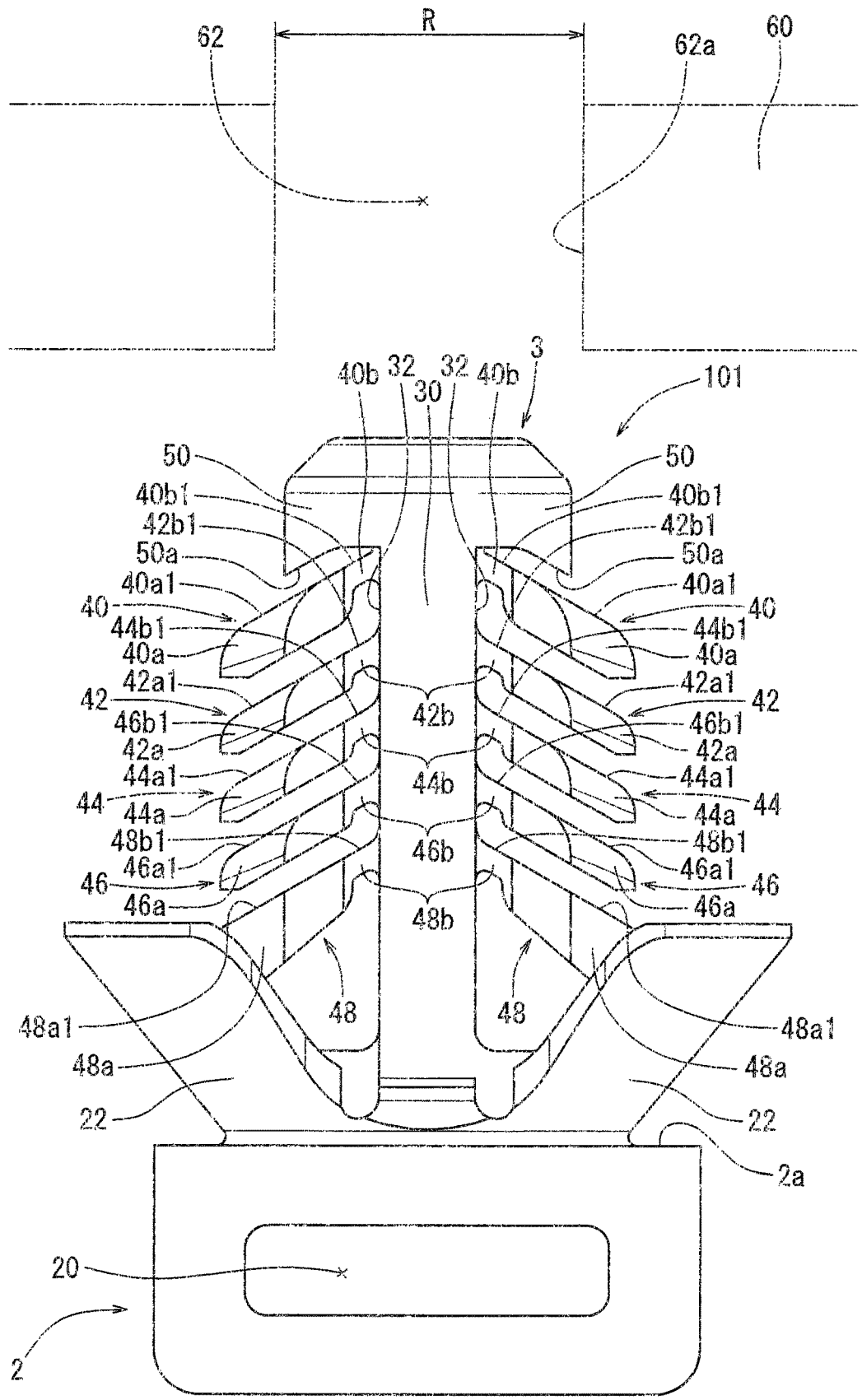
FIG. 19 is an elevational view of the clip, which view illustrates a condition before an anchor of the clip is inserted into an insertion hole formed in the first panel member.
Figure 20:
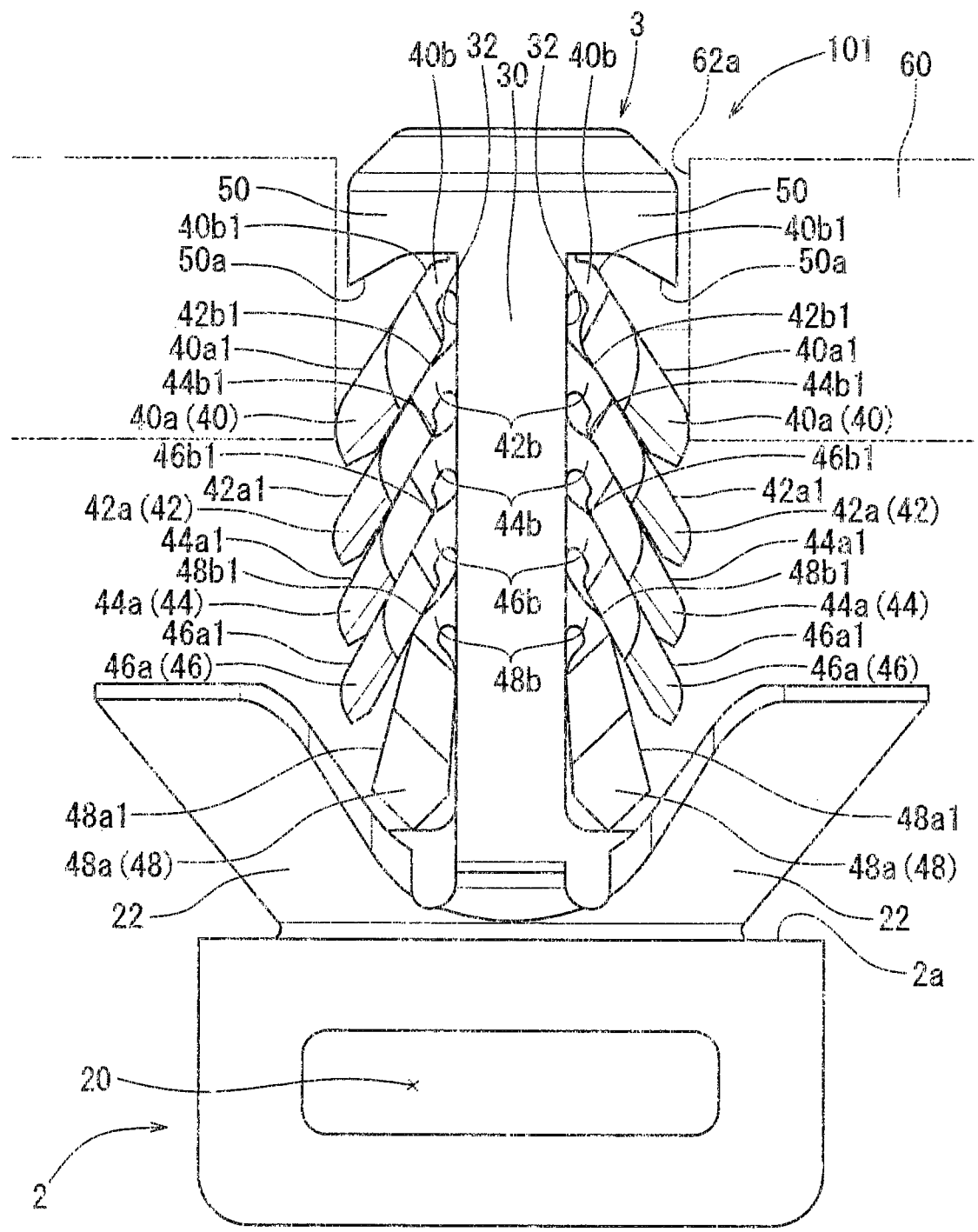
FIG. 20 is an elevational view of the clip, which view illustrates a condition in which the anchor of the clip is being inserted into the insertion hole of the first panel member.

Next, an operation of the clip 101 will now be described with reference to FIGS. 19 to 26. First, in order to attach the attaching member (not shown) to the first panel member 60 (the subject member) that is large in thickness, the base 2 of the clip 101 may be connected to the attaching member, so as to combine the clip 101 with the attaching member. Thereafter, as shown in FIG. 19, the anchor 3 (the pillar 30) of the clip 101 may be pressed against and inserted into the attaching hole 62 formed in the first panel member 60. Upon insertion of the anchor 3, each of the first engagement strips 40 (the strip body 40a) formed in the pillar 30 may contact an inner surface 62a of the attaching hole 62. As a result, the anchor 3 may be introduced into the attaching hole 62 while each of the first engagement strips 40 is folded downward (inward) about the flexible portion 40b (FIG. 20).

As previously described, the first to fifth engagement strips 40, 42, 44, 46 and 48 may respectively be positioned at predetermined small intervals. Therefore, when the first engagement strips 40 is folded downward, the second to fifth engagement strips 42, 44, 46 and 48 may be sequentially folded downward in this order due to a domino effect (FIG. 20).

Figure 21:
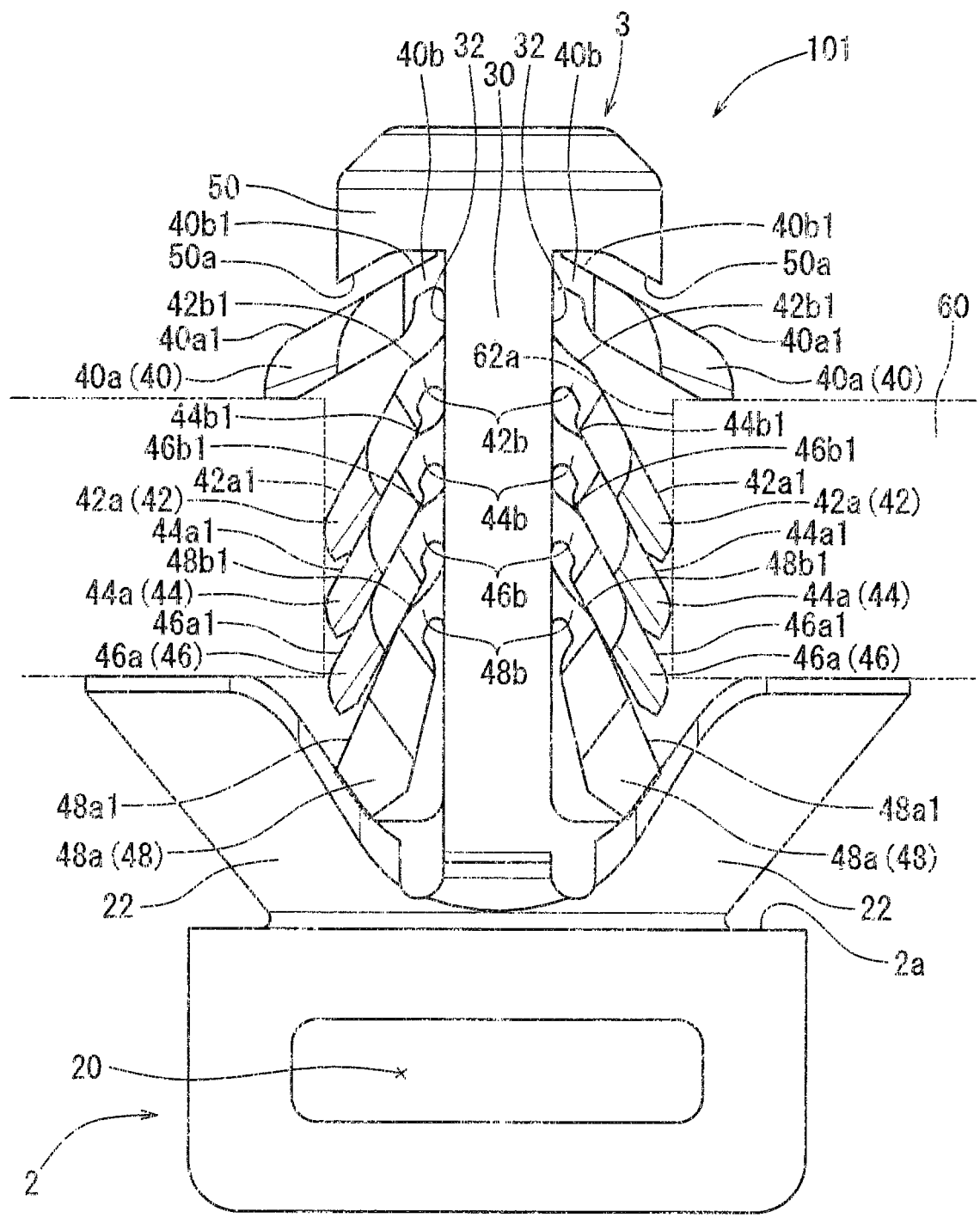
FIG. 21 is an elevational view of the clip, which view illustrates a condition in which the anchor of the clip is completely inserted into the insertion hole of the first panel member, so that the clip is attached to the first panel member.

Subsequently, when the anchor 3 is completely inserted into the attaching hole 62, the first engagement strips 40 may pass through the attaching hole 62. As a result, the first engagement strips 40 may respectively be restored outward and be released from the attaching hole 62. Thus, each of the first engagement strips 40 (the strip body 40a) can elastically engage the periphery of the attaching hole 62 (FIG. 21). At this time, the second to fifth engagement strips 42, 44, 46 and 48 may respectively remain folded inward. Further, the stabilizers 22 may elastically contact a surface of the first panel member 60 so as to stabilize the clip 101. Thus, the anchor 3 (the clip 101) can be attached to the first panel member 60 with a desired retention force (which may be referred to as an attached condition of the clip 101). As a result, the attaching member can be attached to the first panel member 60 via the clip 101.

According to the embodiment, the clip 101 can be easily attached to the first panel member 60. Therefore, the attaching member can be easily attached to the first panel member 60 via the clip 101. Further, when the anchor 3 of the clip 101 is inserted into the attaching hole 62, the first to fifth engagement strips 40, 42, 44, 46 and 48 can be freely folded inward. Therefore, the anchor 3 can be inserted into the attaching hole 62 with a reduced insertion load.

Figure 22:
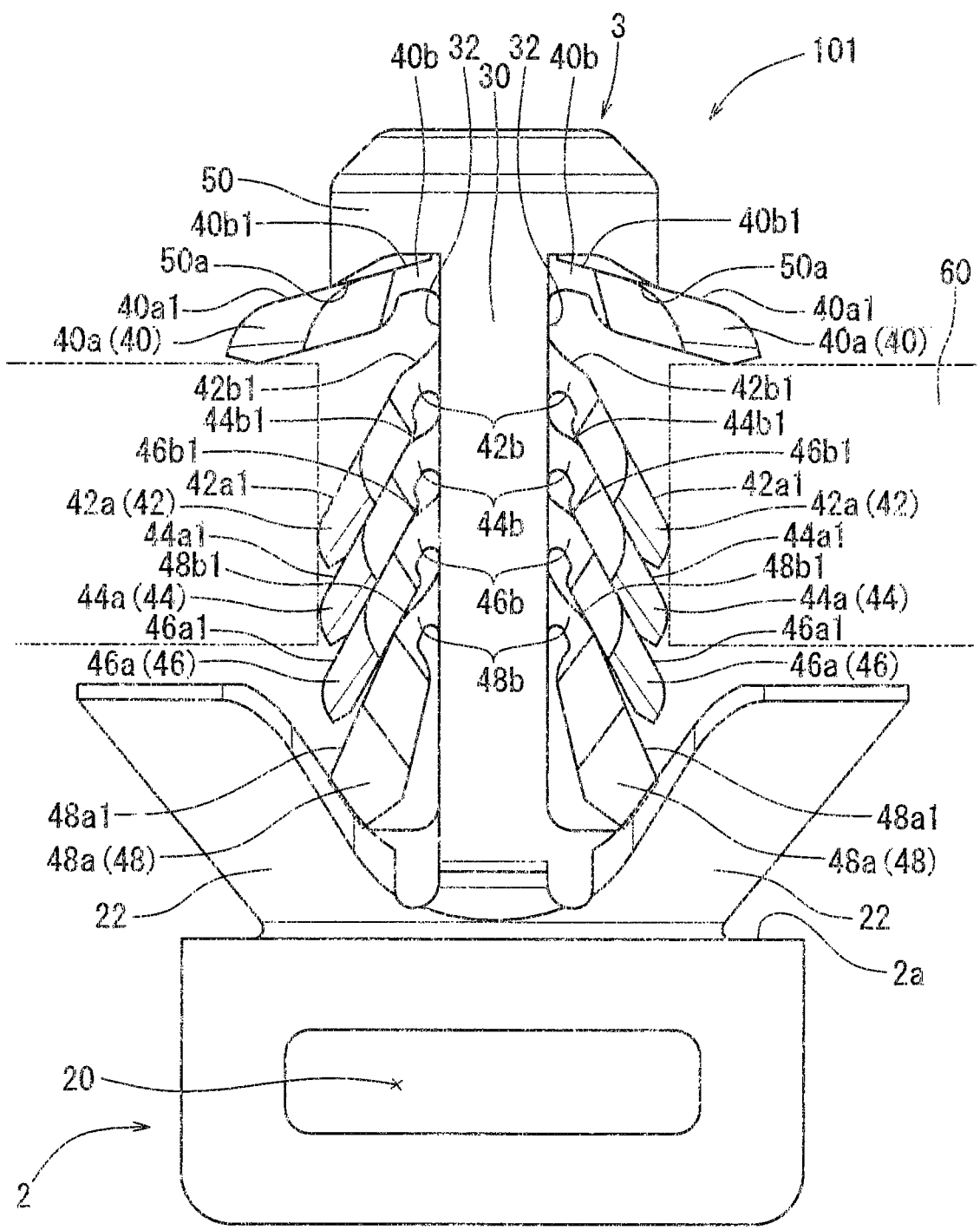
FIG. 22 is a view similar to FIG. 21, which view illustrates a condition in which an extraction load is applied to the clip.

Further, in the attached condition of the clip 101, i.e., in a condition in which the clip 101 is attached to the first panel member 60 (FIG. 21), when a removal or extraction load (a large pullout load) is applied to the anchor 3 (the clip 101) via the base 2, such an extraction load can be applied to the first engagement strips 40 through the periphery of the attaching hole 62. As a result, each of the first engagement strips 40 can be folded back (upward and outward) about the flexible portion 40b (FIG. 22). However, as previously described, the anchor 3 may have the blocks 50 that are positioned over and adjacent to the first engagement strips 40. Therefore, when each of the first engagement strips 40 are folded back, the surface 40a1 of the strip body 40a may contact the stopper surface 50a of each of the blocks 50 (FIG. 22). As a result, the first engagement strips 40 can be prevented from being excessively folded back.

Thus, the first engagement strips 40 can be prevented from being disengaged from the periphery of the attaching hole 62, so that the clip 101 (the anchor 3) attached to the first panel member 60 can be prevented from being removed from the first panel member 60. As a result, the attaching member attached to the first panel member 60 via the clip 101 may be prevented from being removed from the first panel member 60.

Further, when the surface 40a1 of the strip body 40a of each of the first engagement strips 40 contacts the stopper surface 50a of each of the blocks 50 due to the extraction load, the strip body 40a of each of the first engagement strips 40 may be subjected to a shearing force. Therefore, the clip 101 can be retained in the attaching hole 62 with a desired retention force that is capable of resisting the extraction load applied thereto.

Figure 23:
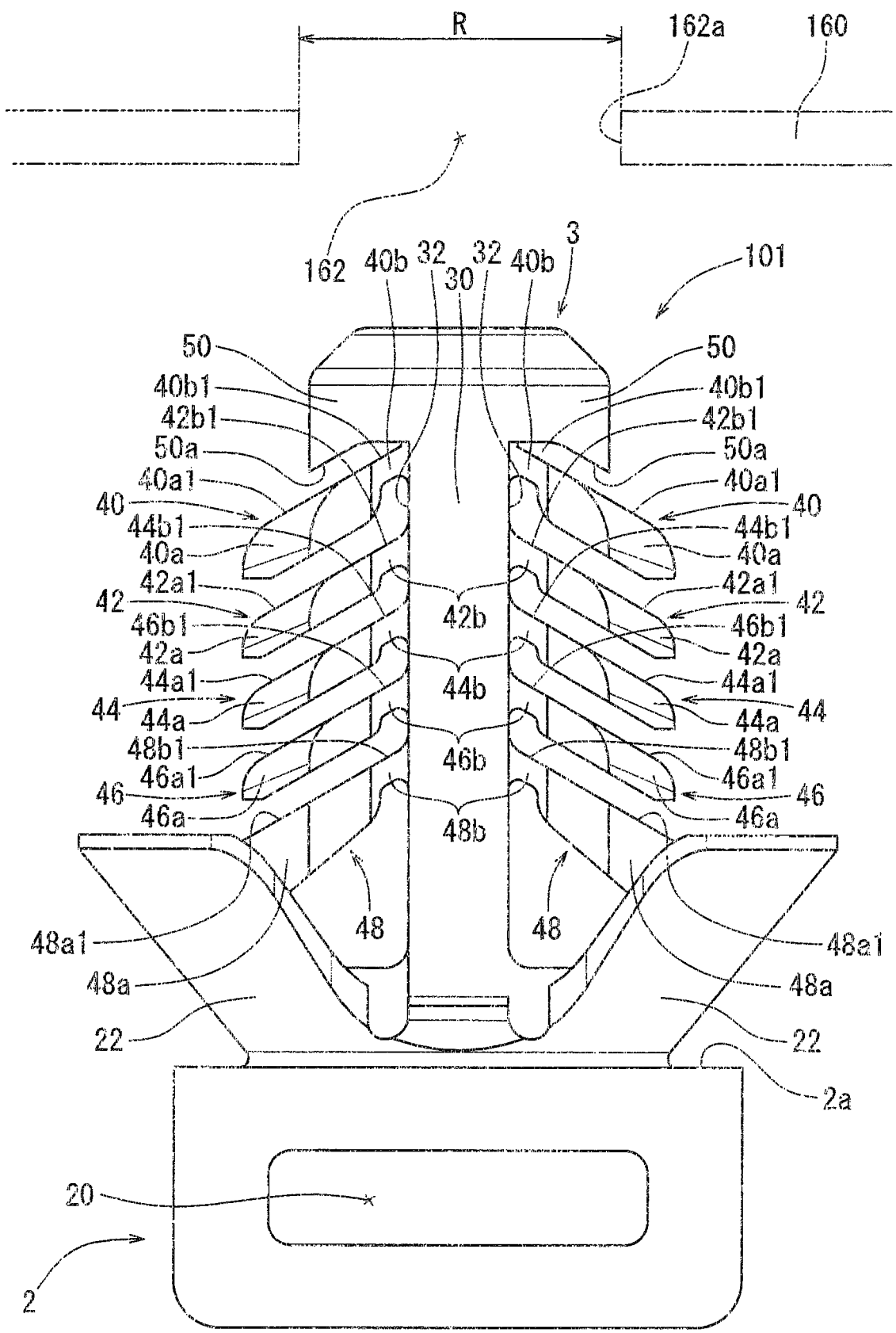
FIG. 23 is an elevational view of the clip, which view illustrates a condition before an anchor of the clip is inserted into an insertion hole formed in the second panel member.

Next, in order to attach the attaching member (not shown) to the second panel member 160 (the subject member) that is small in thickness, as shown in FIG. 23, the anchor 3 (the pillar 30) of the clip 101 may be pressed against and inserted into the attaching hole 162 formed in the second panel member 160. Upon insertion of the anchor 3, each of the first engagement strips 40 (the strip body 40a) formed in the pillar 30 may contact an inner surface 162a of the attaching hole 162. As a result, the anchor 3 may be introduced into the attaching hole 162 while each of the first engagement strips 40 is folded downward (inward) about the flexible portion 40b. At this time, the second to fifth engagement strips 42, 44, 46 and 48 may be sequentially folded downward in this order due to a domino effect.

Figure 24:
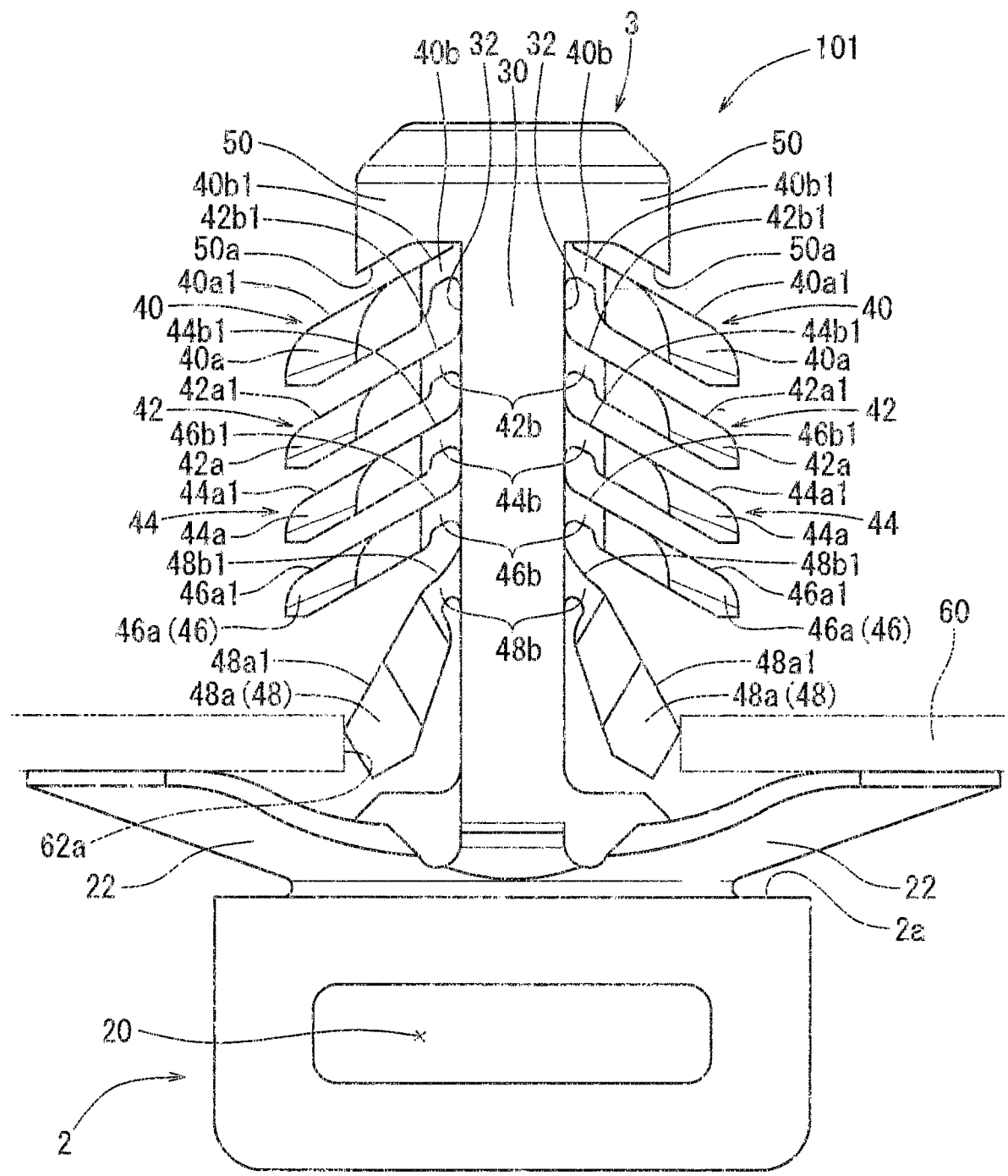
FIG. 24 is an elevational view of the clip, which view illustrates a condition in which the anchor of the clip is being inserted into the insertion hole of the second panel member.

Subsequently, when the anchor 3 is further inserted into the attaching hole 162, the first to fifth engagement strips 40, 42, 44, 46 and 48 may sequentially pass through the attaching hole 162, so as to be restored outward and be released from the attaching hole 162 (FIG. 24).

Figure 25:
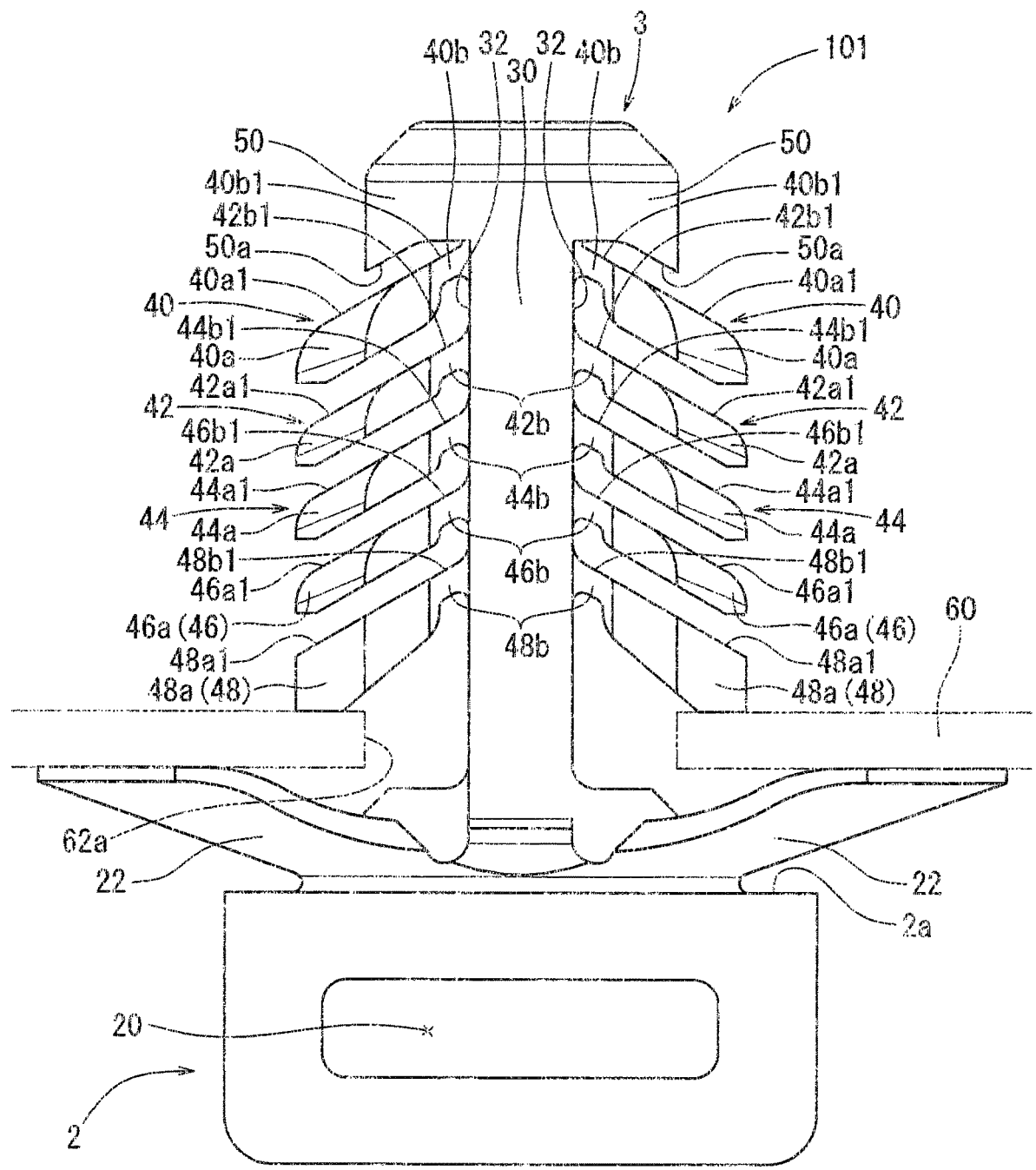
FIG. 25 is an elevational view of the clip, which view illustrates a condition in which the anchor of the clip is completely inserted into the insertion hole of the second panel member, so that the clip is attached to the second panel member.

When the anchor 3 is completely inserted into the attaching hole 62, the fifth engagement strips 48 may pass through the attaching hole 162. As a result, the fifth engagement strips 48 may respectively be restored outward and be released from the attaching hole 162. Thus, each of the fifth engagement strips 48 (the strip body 48a) can elastically engage the periphery of the attaching hole 162 (FIG. 25). At this time, the stabilizers 22 may elastically contact a surface of the second panel member 160 so as to stabilize the clip 101. Thus, the anchor 3 (the clip 101) can be attached to the second panel member 160 with a desired retention force (which may be referred to as an attached condition of the clip 101). As a result, the attaching member can be attached to the second panel member 160 via the clip 101.

According to the embodiment, the clip 101 can be easily attached to the second panel member 160. Therefore, the attaching member can be easily attached to the second panel member 160 via the clip 101. Further, when the anchor 3 of the clip 101 is inserted into the attaching hole 162, the first to fifth engagement strips 40, 42, 44, 46 and 48 can be freely folded inward. Therefore, the anchor 3 can be inserted into the attaching hole 162 with a reduced insertion load.

Figure 26:
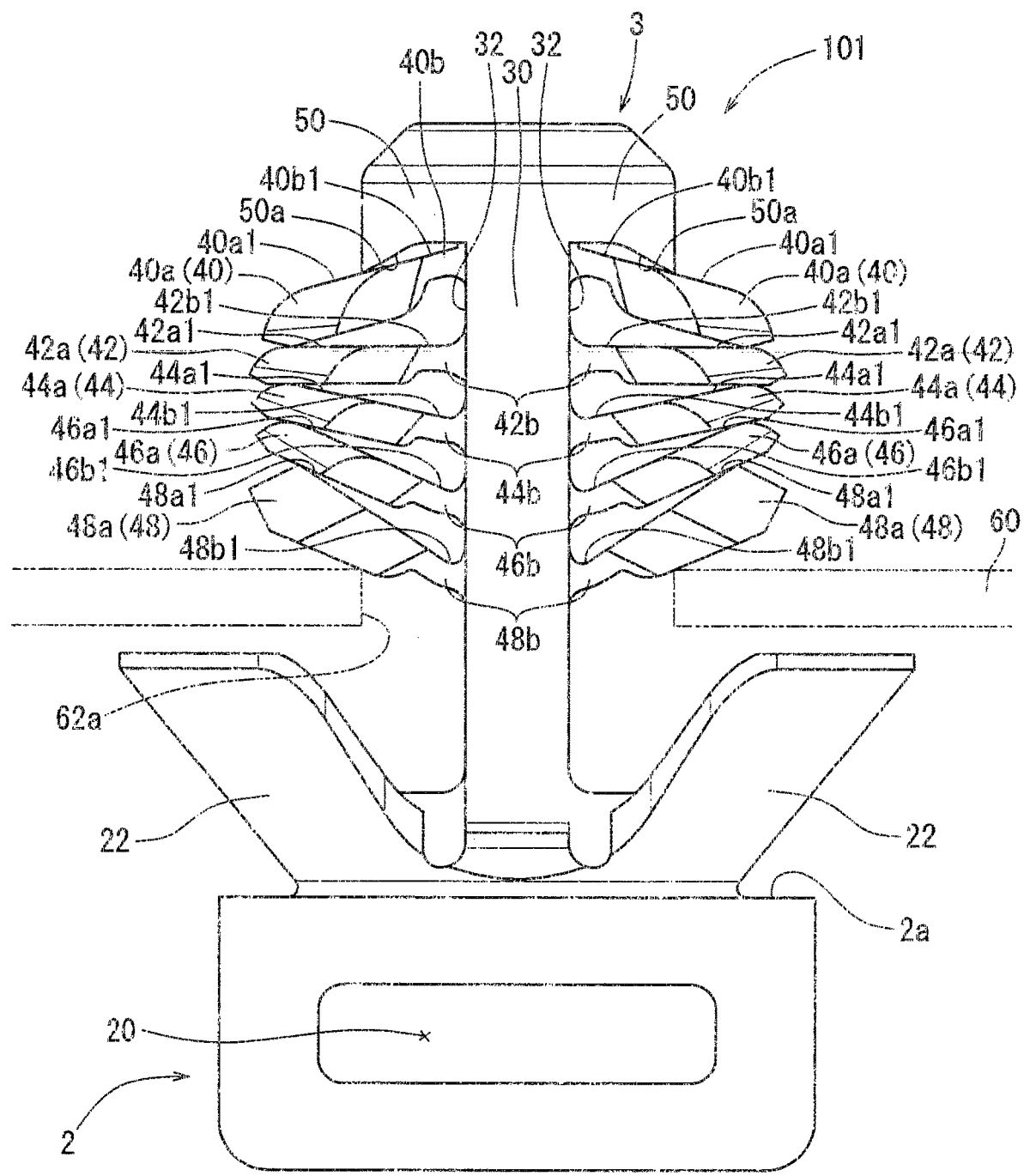
FIG. 26 is a view similar to FIG. 25, which view illustrates a condition in which an extraction load is applied to the clip.
Figure 27:
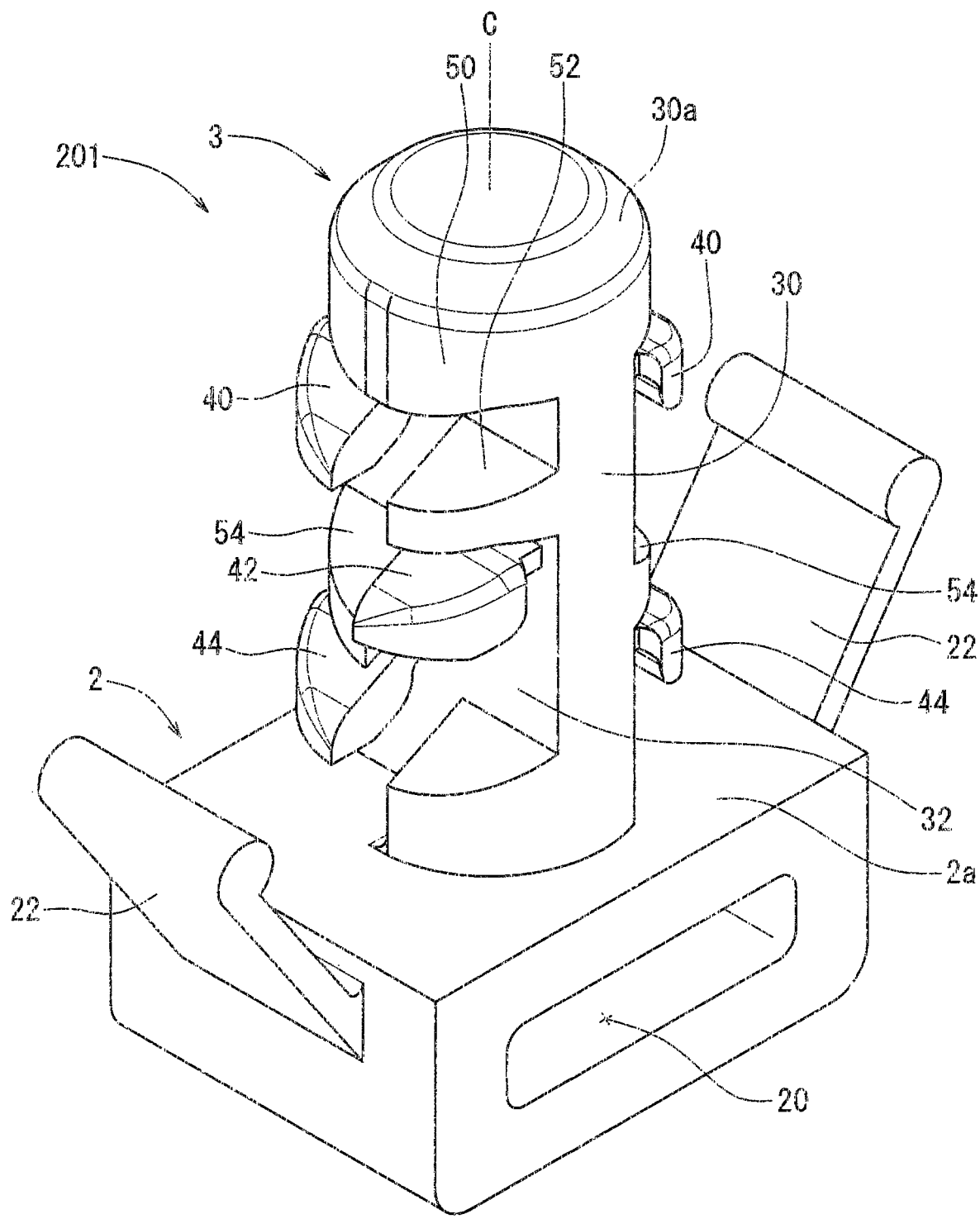
FIG. 27 is a perspective view of a clip according to a modified form of the first embodiment.
Figure 28:
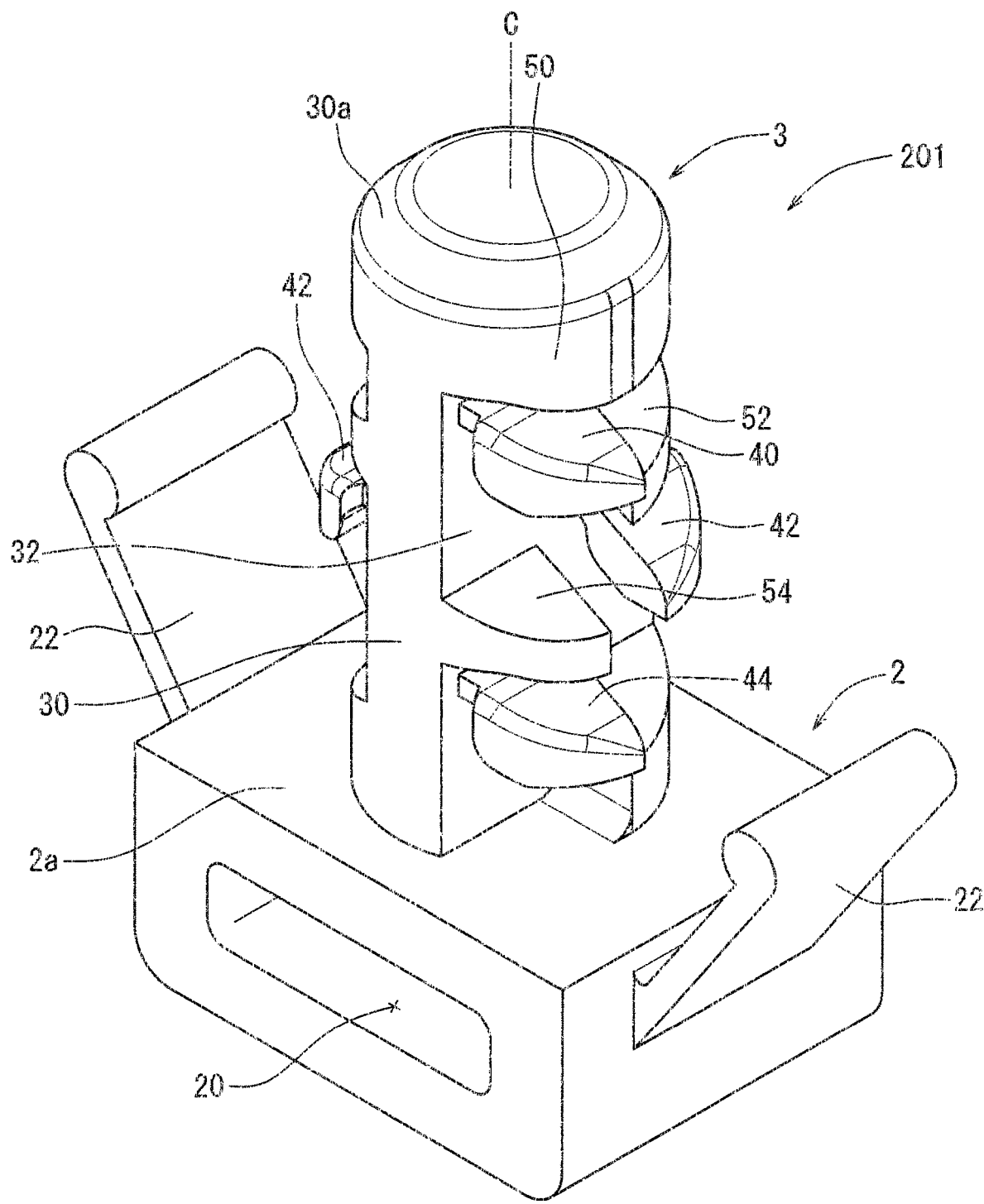
FIG. 28 is a perspective view of the clip, which is viewed from a direction different from FIG. 27.
Figure 29:
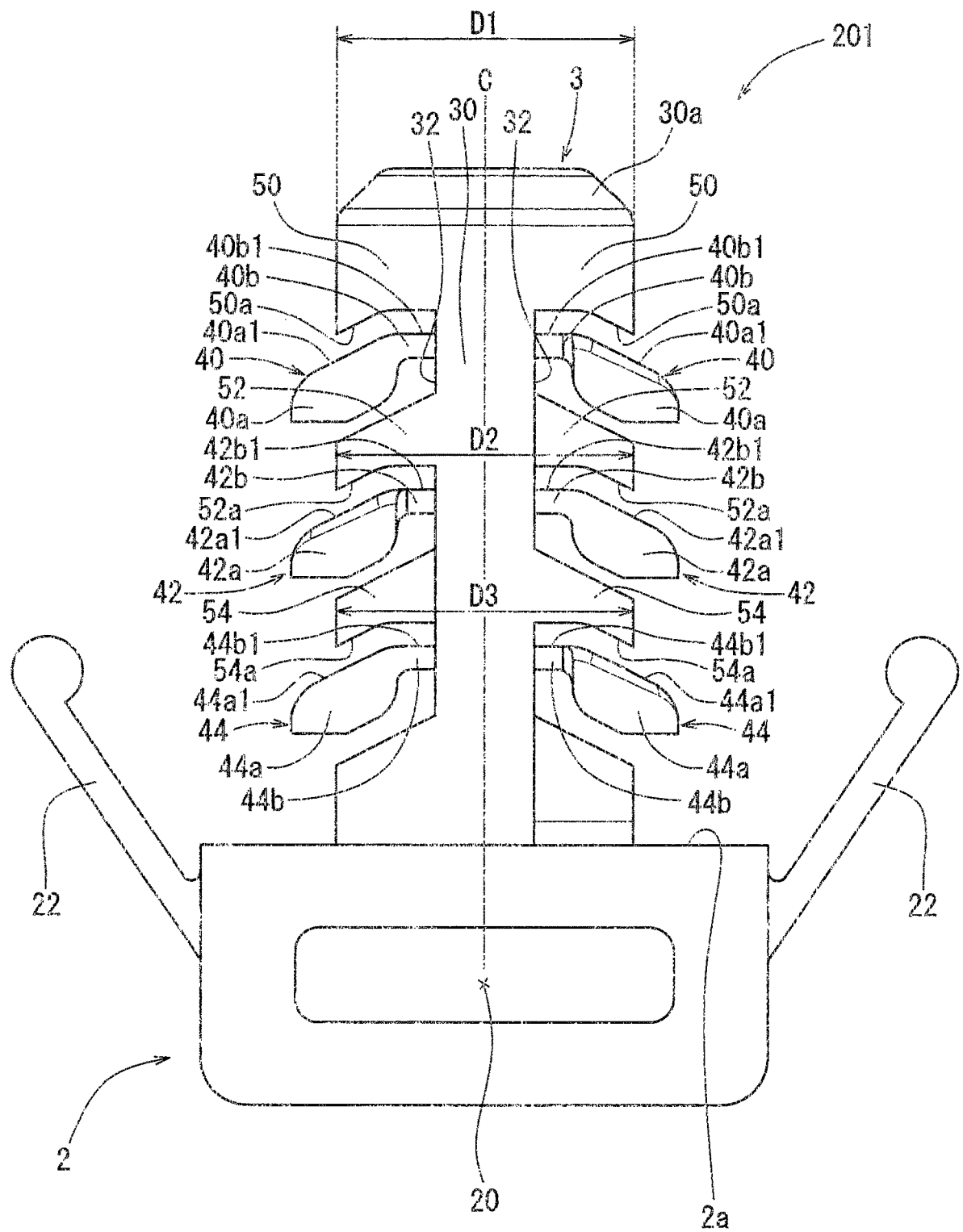
FIG. 29 is an elevational view of the clip.
Figure 30:
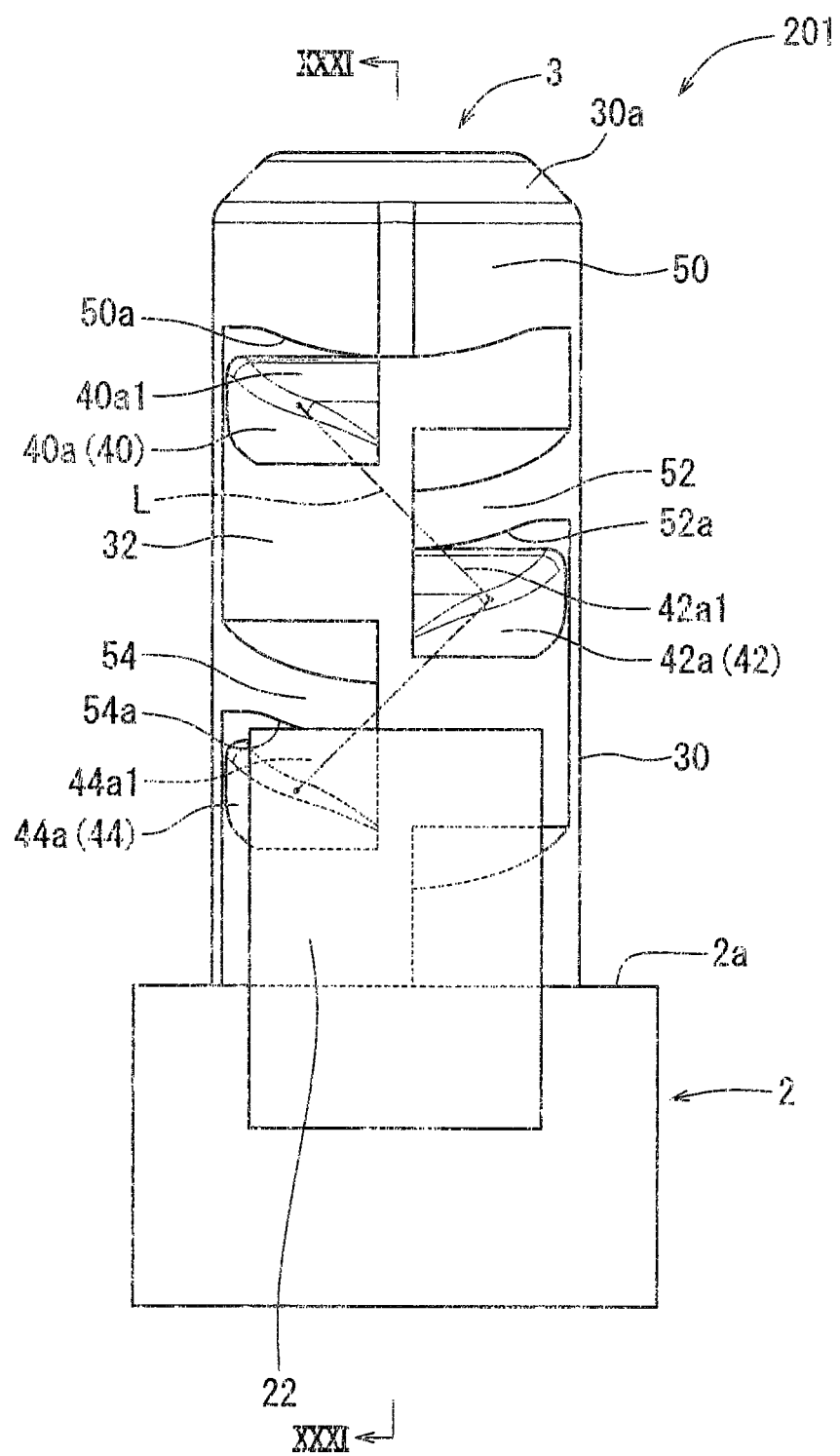
FIG. 30 is a side view of the clip.
Figure 31:
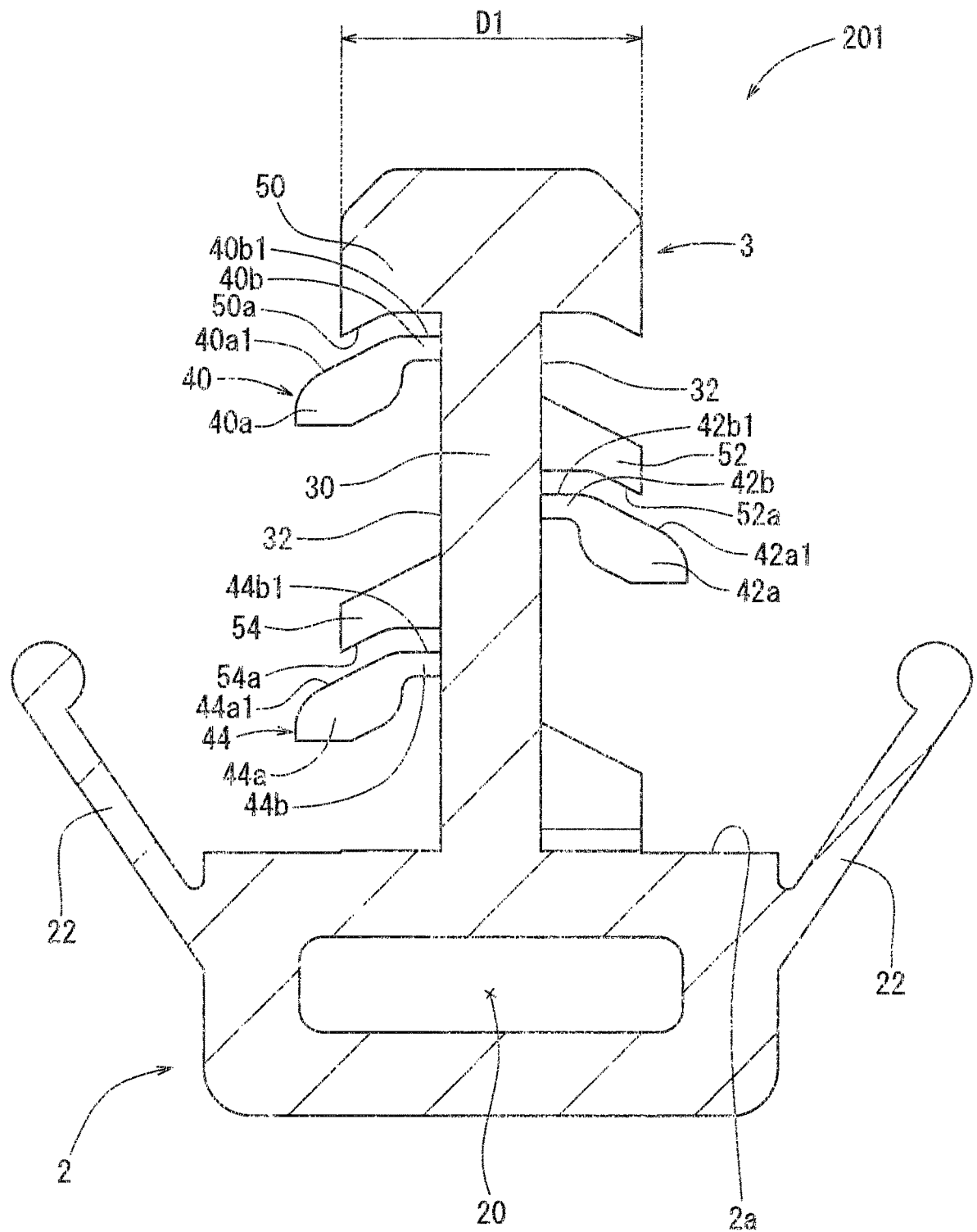
FIG. 31 is a cross-sectional view taken along line XXXI-XXXI of FIG. 30.

Further, in the attached condition of the clip 101, i.e., in a condition in which the clip 101 is attached to the second panel member 160 (FIG. 25), when a removal or extraction load (a large pullout load) is applied to the anchor 3 (the clip 101) via the base 2, such an extraction load can be applied to the fifth engagement strips 48 through the periphery of the attaching hole 162. As a result, each of the fifth engagement strips 48 can be folded back (upward and outward) about the flexible portion 48b (FIG. 26). Due to the flexure of the fifth engagement strips 48, the first to fourth engagement strips 40, 42, 44 and 46 may be sequentially folded back in reverse order due to a domino effect.

As previously described, the anchor 3 may have the blocks 50 that are positioned over and adjacent to the first engagement strips 40. Therefore, when each of the first engagement strips 40 are folded back, the surface 40a1 of the strip body 40a may contact the stopper surface 50a of each of the blocks 50 (FIG. 26). As a result, the first engagement strips 40 can be prevented from being excessively folded back. Simultaneously, the second to fifth engagement strips 42, 44, 46 and 48 may be prevented from being further folded back.

Thus, the fifth engagement strips 48 can be prevented from being disengaged from the periphery of the attaching hole 162, so that the clip 101 attached to the second panel member 160 can be prevented from being removed from the second panel member 160. As a result, the attaching member attached to the second panel member 160 via the clip 101 may be prevented from being removed from the second panel member 160.

Further, when the surface 40a1 of the strip body 40a of each of the first engagement strips 40 contacts the stopper surface 50a of each of the blocks 50 due to the extraction load, all of the strip body 40a of each of the first engagement strips 40, the strip body 42a of each of the second engagement strips 42, the strip body 44a of each of the third engagement strips 44, the strip body 46a of each of the fifth engagement strips 46 and the strip body 48a of each of the fifth engagement strips 48 may be subjected to a shearing force. Therefore, the clip 101 can be retained in the attaching hole 162 with a desired retention force that is capable of resisting the extraction load applied thereto.

According to the embodiment, the fifth engagement strips 48 may be configured to be greater than the first engagement strips 40. Therefore, the fifth engagement strips 48 may produce an increased retention force.

Naturally, various changes and modifications may be made to the first and second embodiments without departing from the scope of the disclosure. For example, in the clip 1 according to the first embodiment, as shown in FIG. 3, each of the first engagement strips 40 is shaped such that the surface 40a1 of the strip body 40a and the surface 40b1 of the flexible portion 40b are respectively flattened and flush with each other. However, as shown in FIGS. 27 to 31, in a clip 201 according to a modified form of the first embodiment, each of the first engagement strips 40 may be shaped such that the surface 40a1 of the strip body 40a and the surface 40b1 of the flexible portion 40b are not respectively flush with each other. In particular, in the clip 201, the surface 40b1 of the flexible portion 40b may be perpendicular to the central axis C of the pillar 30 while the surface 40a1 of the strip body 40a may be inclined downward with respect to the surface 40b1 of the flexible portion 40b. The same is true on the second and third engagement strips 42 and 44.

Further, in the clip 1 according to the first embodiment, the anchor 3 has three pairs of engagement strips 40, 42 and 44 and three pairs of blocks 50, 52 and 54. However, the number of the engagement strips and the blocks is not limited. Similarly, in the clip 101 according to the second embodiment, the anchor 3 has five pairs of engagement strips 40, 42, 44, 46 and 48. However, the number of the engagement strips is also limited.

Third Embodiment

A third detailed representative embodiment will be described with reference to FIGS. 32 to 46. Further, because the third embodiment relates to the second embodiment, only the constructions and elements that are different from the second embodiment will be explained in detail. Elements that are the same in the second and third embodiments will be identified by the same reference numerals and a detailed description of such elements may be omitted or simplified.

Figure 32:
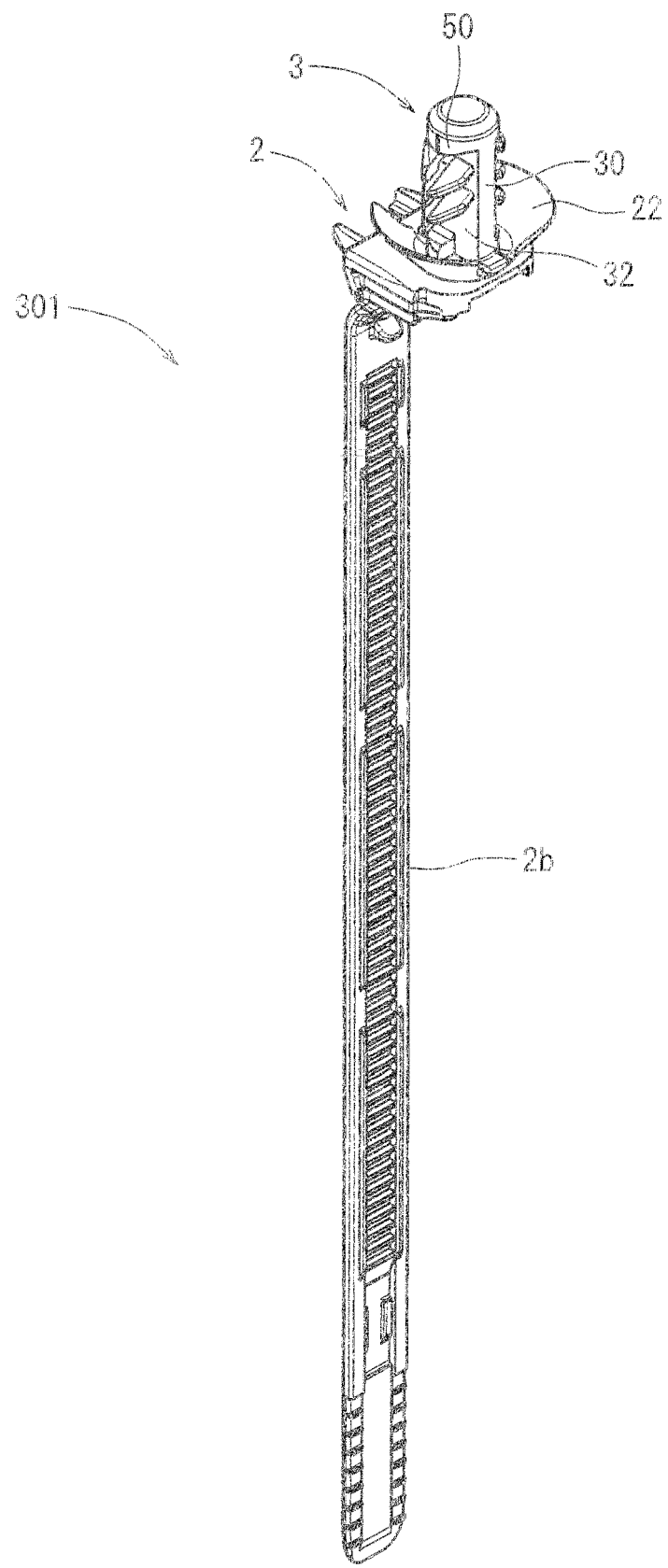
FIG. 32 is a perspective view of a clip according to a third embodiment.
Figure 33:
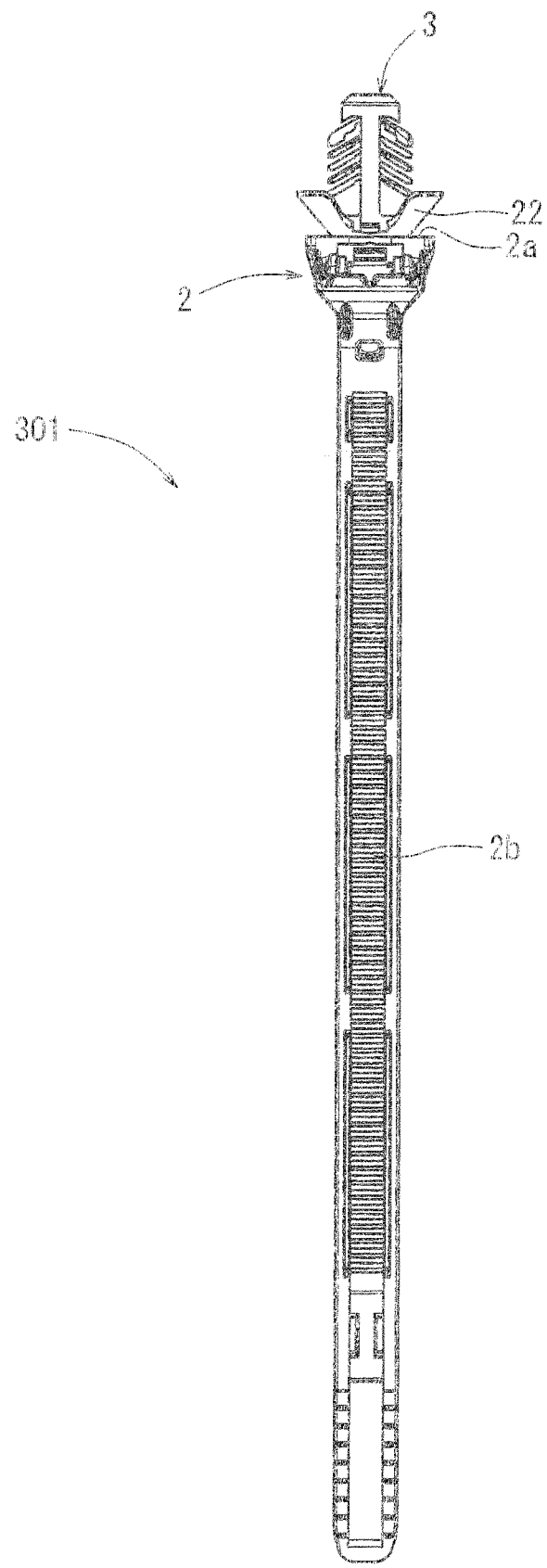
FIG. 33 is an elevational view of the clip.
Figure 34:
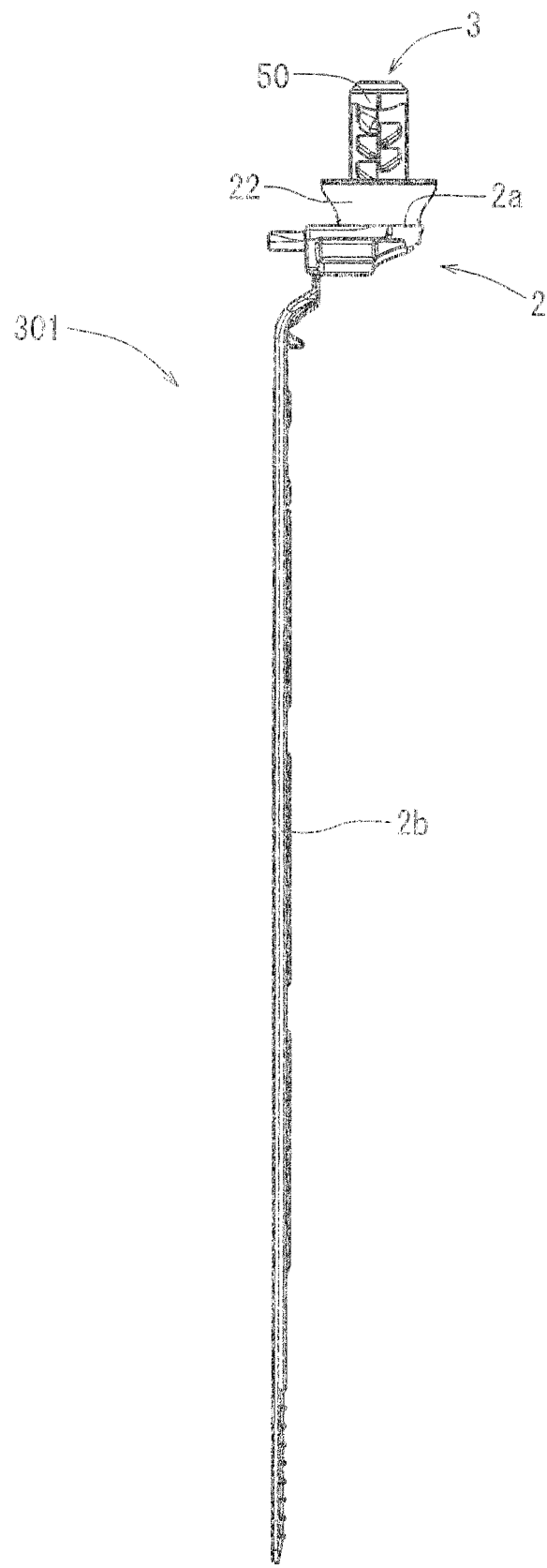
FIG. 34 is a side view of the clip.

As shown in FIGS. 32 to 34, a clip 301 may preferably include a base 2 and an anchor 3. Unlike the second embodiment, the base 2 may have a form of a buckle having a belt 2b. That is, the clip 301 may be formed as a cable tie for clamping or binding a wiring harness or other such members (not shown). Further, as shown in FIGS. 40 to 46, the clip 301 is intended to be attached to the first panel member 60 having the attaching hole 62 with the inner diameter R and a third panel member 260 having an attaching hole 262 with an inner diameter R1 that is greater than the diameter R (R1>R).

Figure 35:
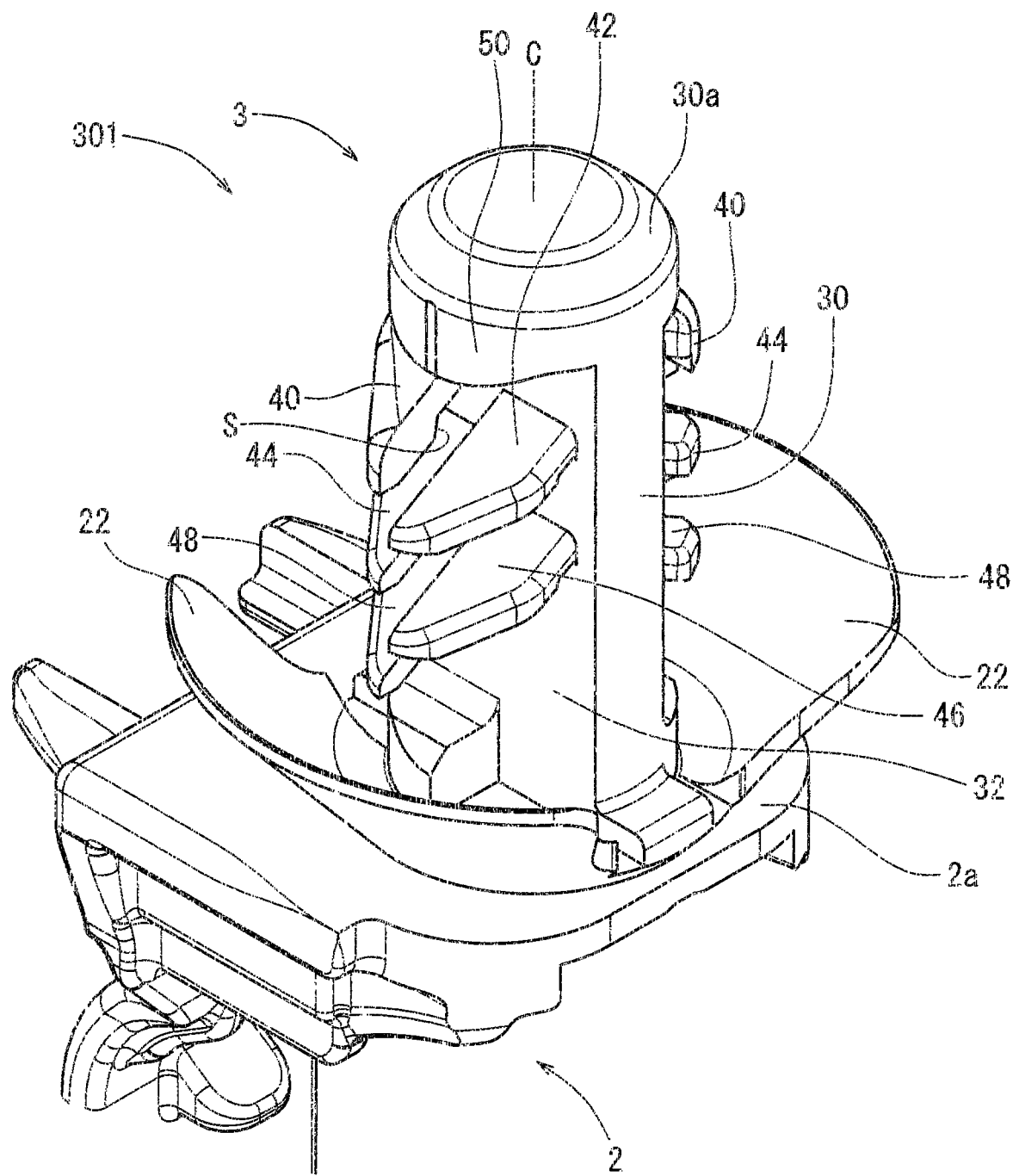
FIG. 35 is a partially enlarged view of FIG. 32.
Figure 36:
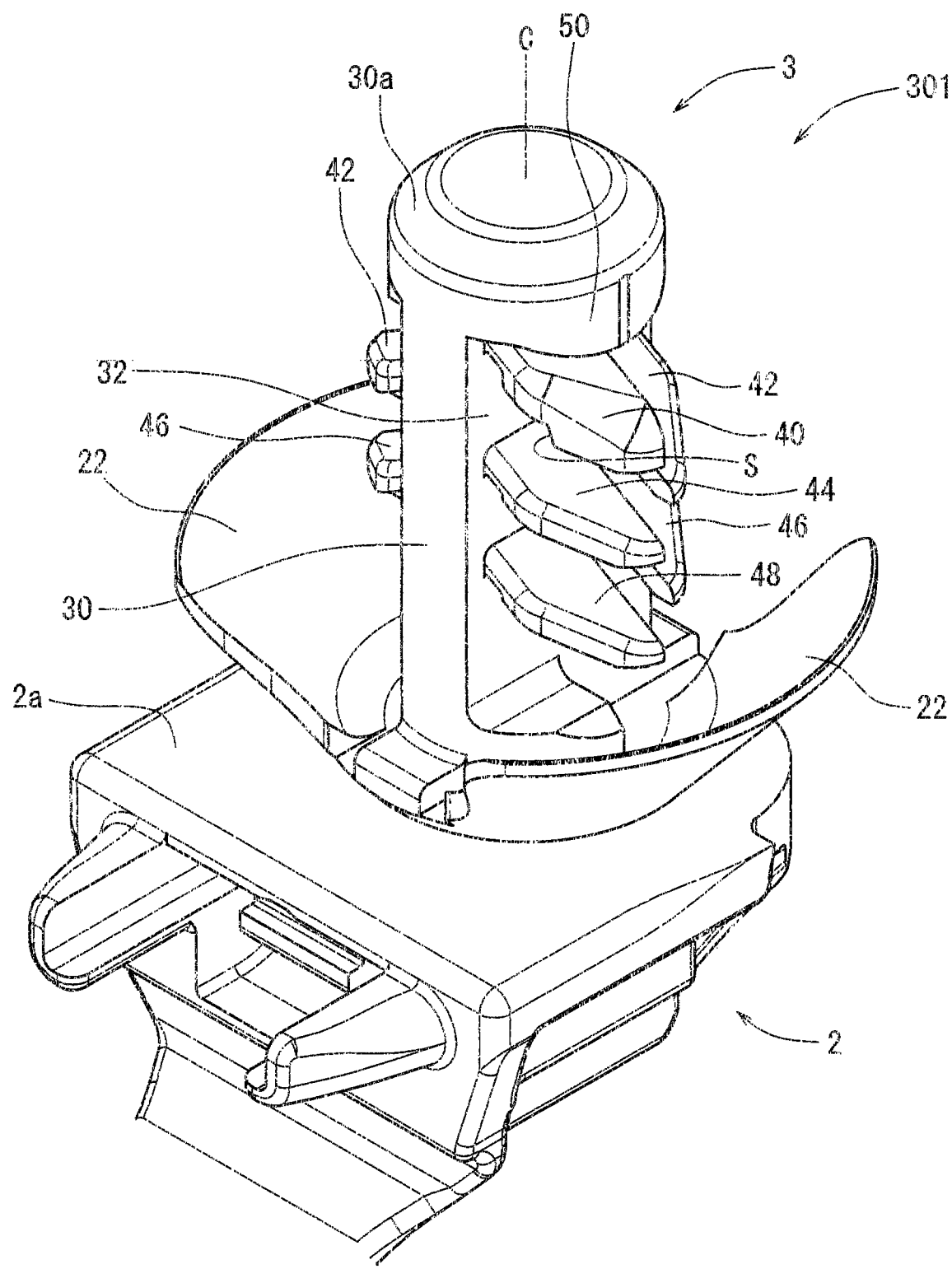
FIG. 36 is a view similar to FIG. 35, which is viewed from a direction different from FIG. 35.
Figure 37:
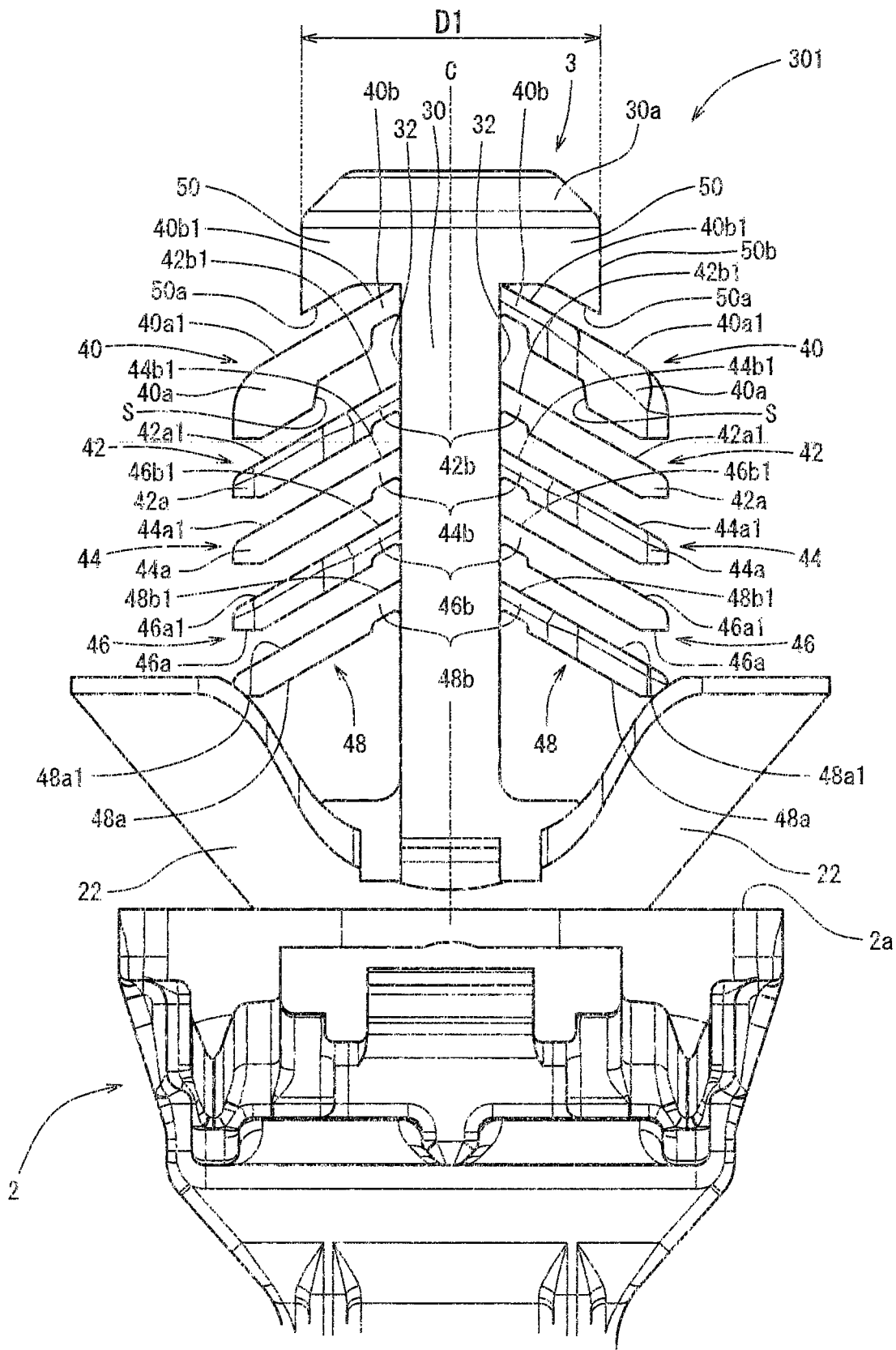
FIG. 37 is a partially enlarged view of FIG. 33.

As shown in FIGS. 35 to 37, the anchor 3 may have a headed plate-shaped pillar 30. The pillar 30 may have a tapered circular disk-shaped top (head) portion 30a and a bottom portion connected to the base (buckle) 2. Further, the anchor 3 may have five (first to fifth) pairs of cantilevered flexible engagement strips 40, 42, 44, 46 and 48 and a pair of rigid blocks 50 that are formed in opposite surfaces 32 of the pillar 30.

Figure 38:
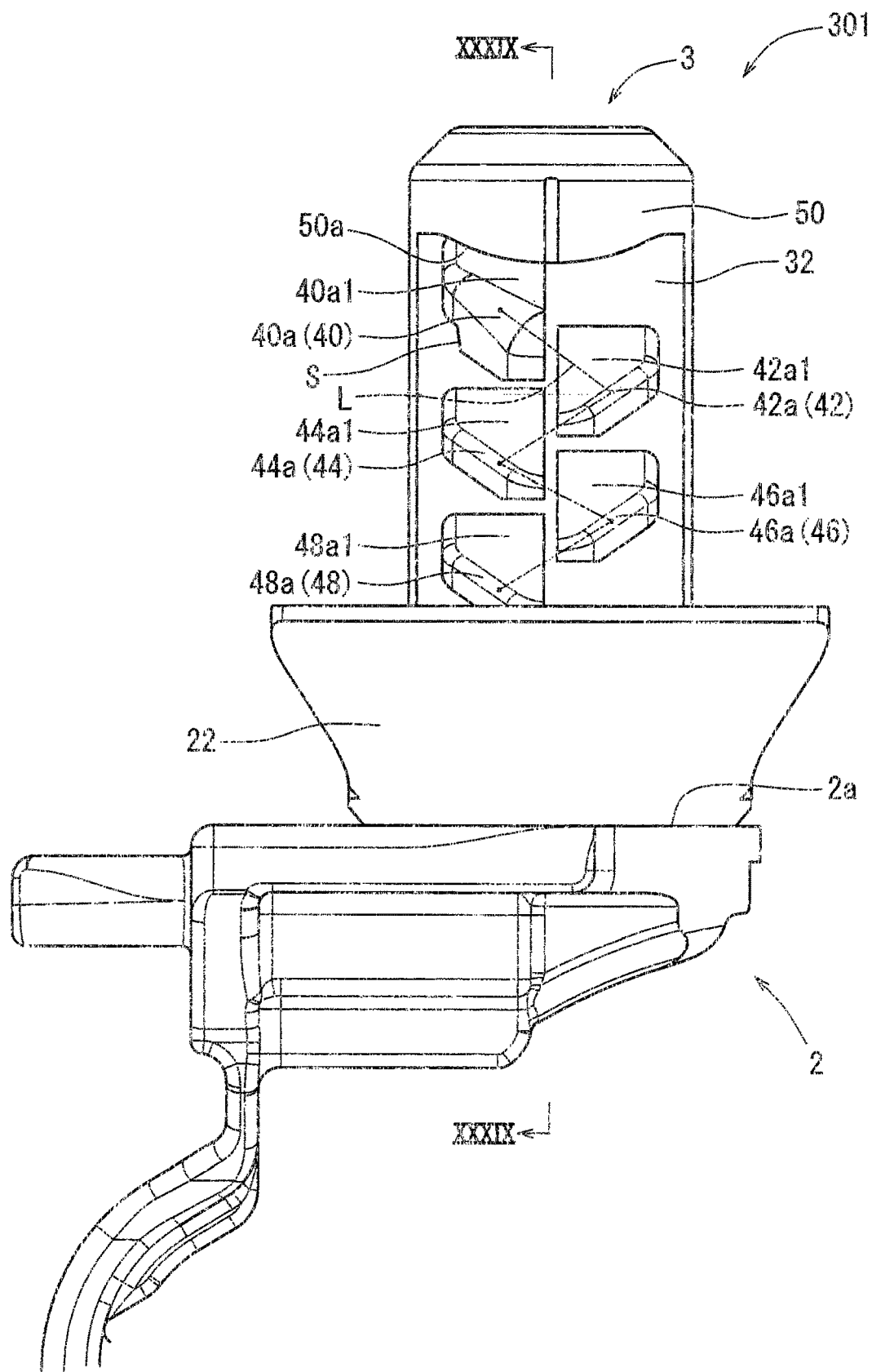
FIG. 38 is a partially enlarged view of FIG. 34.

As best shown in FIG. 37, the each pair of engagement strips 40, 42, 44, 46 and 48 may preferably be arranged in a 2-fold (180 degrees) rotationally symmetrical fashion about a central axis C of the pillar 30. Further, the engagement strips 40, 42, 44, 46 and 48 formed in each of the opposite surfaces 32 of the pillar 30 may respectively be referred to as first to fifth engagement strips. As shown in FIG. 38, unlike the second embodiment, the first to fifth engagement strips 40, 42, 44, 46 and 48 may be arranged in a zig-zag manner shown by line L along the central axis C of the pillar 30. That is, the first to fifth engagement strips 40, 42, 44, 46 and 48 may be positioned on each of the opposite surfaces 32 of the pillar 30 in two rows along the central axis C of the pillar 30. Further, as shown in FIG. 39, the first to fifth engagement strips 40, 42, 44, 46 and 48 may respectively be positioned at substantially regular intervals.

Figure 39:
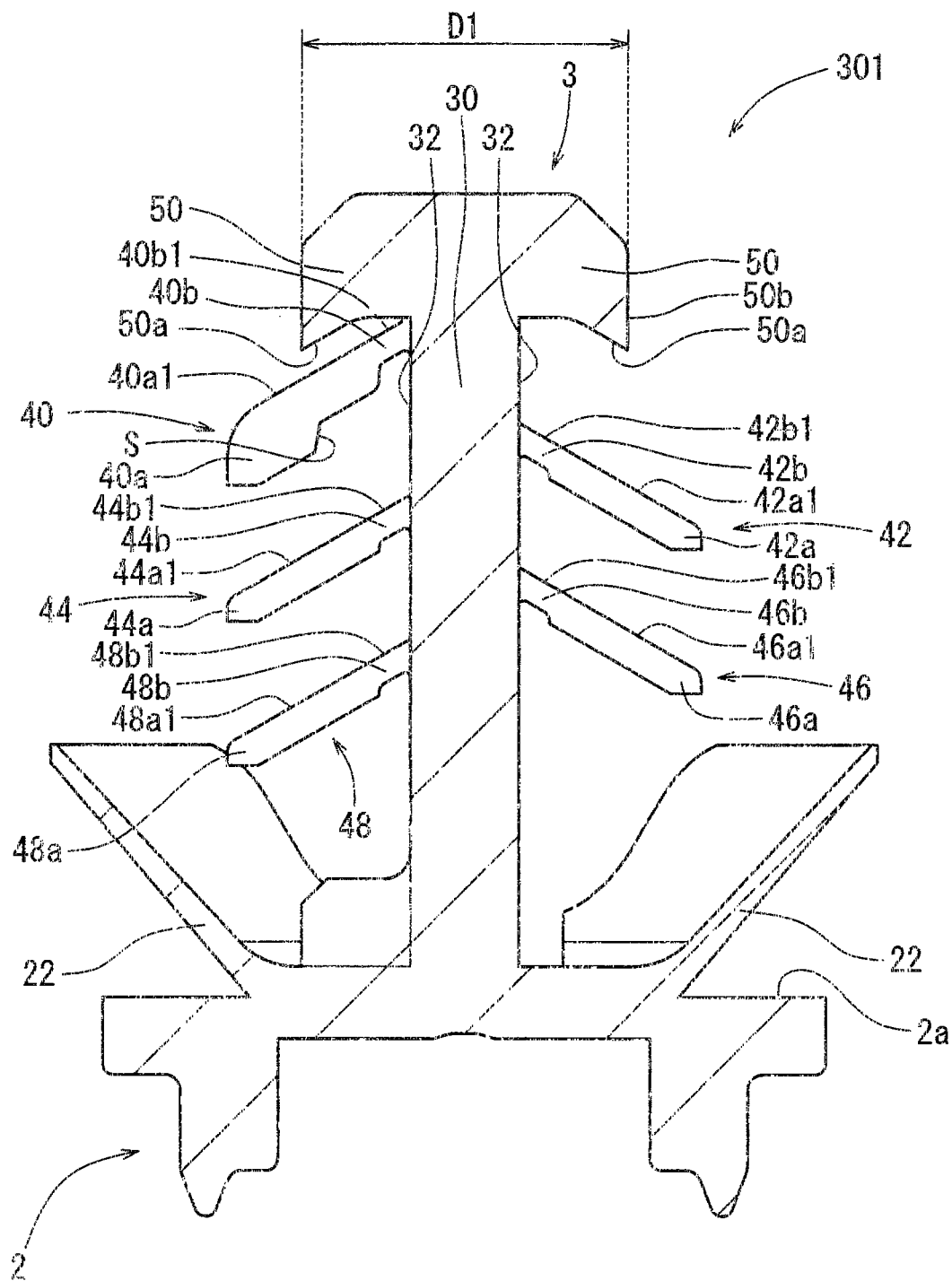
FIG. 39 is a cross-sectional view taken along line XXXIX-XXXIX of FIG. 38.

As shown in FIGS. 37 and 39, similar to the second embodiment, the first (upper) engagement strips 40 may respectively be connected to the opposite surfaces 32 of the pillar 30 so as to be inclined downward (i.e., toward the base 2) relative to the central axis C of the pillar 30. Each of the first engagement strips 40 may be composed of a strip body 40a and a flexible portion 40b connected to each of the opposite surfaces 32 of the pillar 30. The strip body 40a may be configured to contact or engage a periphery of the attaching hole 62 of the first panel member 60 or the attaching hole 162 of the second panel member 160 when the pillar 30 is pressed into the attaching hole 62 or the attaching hole 162. Further, a (upper) surface 40a1 of the strip body 40a and a (upper) surface 40b1 of the flexible portion 40b may respectively be flattened and shaped to be flush with each other. In particular, the surface 40a1 of the strip body 40a and the surface 40b1 of the flexible portion 40b may respectively be inclined downward with respect to the central axis C of the pillar 30 at the same angle.

As shown in FIGS. 37 and 39, the second engagement strips 42, the third engagement strips 44, and the fourth engagement strips 46 and the fifth engagement strips 48 may respectively be formed in the same manner as the first engagement strips 40. However, the strip body 42a, 44a, 46a and 48a of each of the second to fifth engagement strips 42, 44, 46 and 48 may be formed so as to be thinner than the strip body 40a of each of the first engagement strips 40. Further, the strip body 40a of each of the first engagement strips 40 may have a shoulder portion S so as to form a thickened distal end portion therein. The shoulder portion S may preferably be positioned so as to substantially be aligned with an outer surface 50b of each of the blocks 50 in the longitudinal direction of the pillar 30. In particular, the shoulder portion S may be arranged so as to be positioned radially outside of the outer surface 50b of each of the blocks 50 when each of the first engagement strips 40 are folded back about the flexible portion 40b until the surface 40a1 of the strip body 40a contacts the stopper surface 50a of each of the blocks 50 (FIGS. 41 and 45), which will be hereinafter described.

Next, an operation of the clip 301 will now be described with reference to FIGS. 40 to 46. First, in order to attach the attaching member (not shown) to the first panel member 60 (the subject member), the base (buckle) 2 of the clip 301 may be connected to the attaching member using the belt 2b, so as to combine the clip 301 with the attaching member. Thereafter, the anchor 3 (the pillar 30) of the clip 301 may be pressed against and inserted into the attaching hole 62 formed in the first panel member 60. Upon insertion of the anchor 3, each of the first engagement strips 40 (the strip body 40a) formed in the pillar 30 may contact an inner surface 62a of the attaching hole 62. As a result, the anchor 3 may be introduced into the attaching hole 62 while each of the first engagement strips 40 is folded downward (inward) about the flexible portion 40b.

Figure 40:
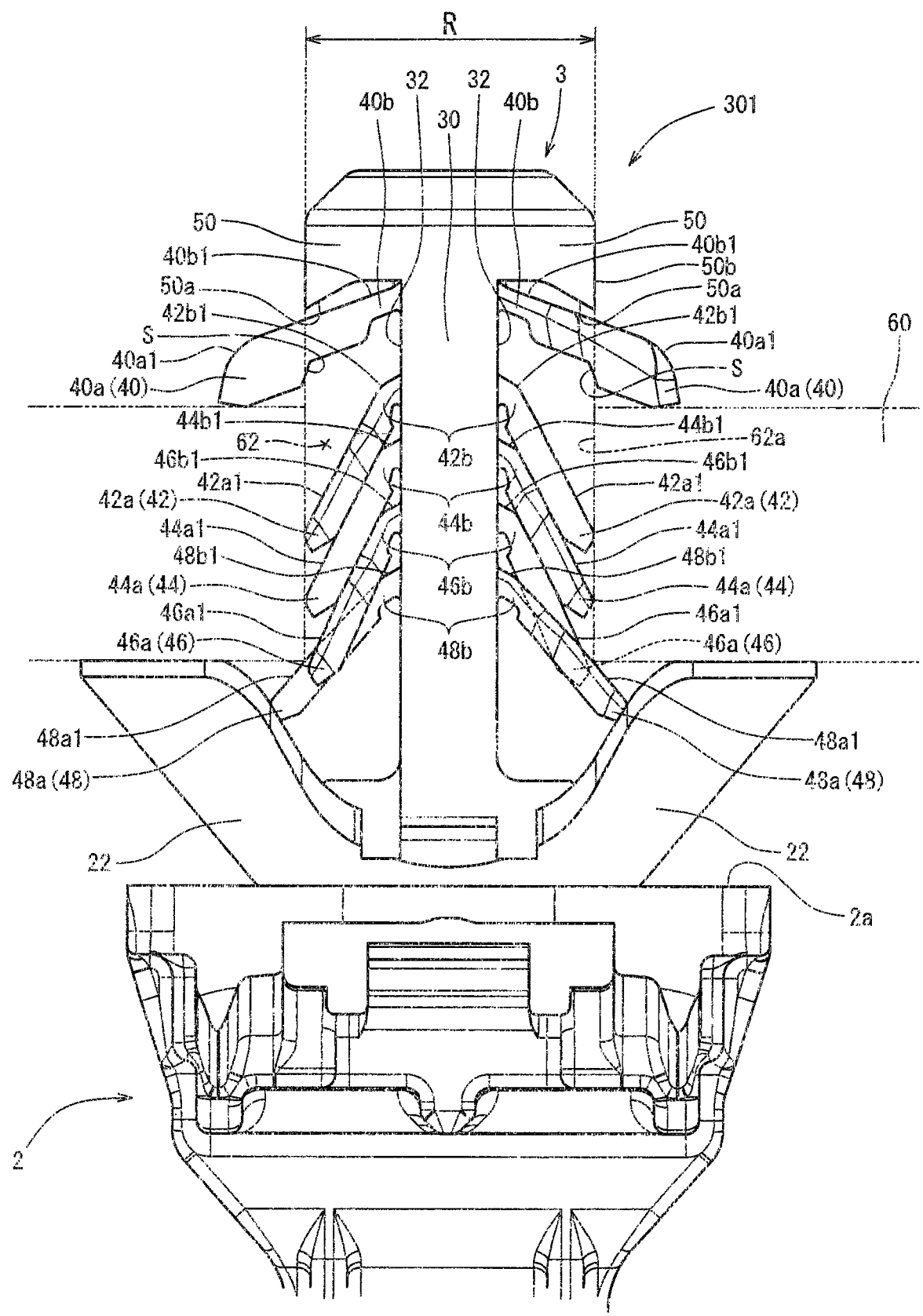
FIG. 40 is a partially enlarged elevational view of the clip, which view illustrates a condition in which the anchor of the clip is completely inserted into the insertion hole of the first panel member, so that the clip is attached to the first panel member.

When the anchor 3 of the clip 301 is further inserted into the attaching hole 62 of the first panel member 60, each of the second engagement strips 42, each of the third engagement strips 44, each of the fourth engagement strips 46 and each of the fifth engagement strips 48 are respectively sequentially folded downward (inward) about the flexible portion 42b, the flexible portion 44b, the flexible portion 46b and the flexible portion 48b in this order. Subsequently, when the anchor 3 is completely inserted into the attaching hole 62, the first engagement strips 40 may pass through the attaching hole 62. As a result, the first engagement strips 40 may respectively be restored outward and be released from the attaching hole 62. Thus, each of the first engagement strips 40 (the strip body 40a) can be elastically restored, so as to elastically engage the periphery of the attaching hole 62 (FIG. 40). At this time, the second engagement strips 42, the third engagement strips 44, the fourth engagement strips 46 and the fifth engagement strips 48 may respectively remain folded inward. Further, the stabilizers 22 may elastically contact a surface of the first panel member 60 so as to stabilize the clip 301. Thus, the anchor 3 (the clip 301) can be attached to the first panel member 60 with a desired retention force (which may be referred to as an attached condition of the clip 301). As a result, the attaching member can be attached to the first panel member 60 via the clip 301.

According to the embodiment, the clip 301 can be easily attached to the first panel member 60. Therefore, the attaching member can be easily attached to the first panel member 60 via the clip 301. Further, when the anchor 3 of the clip 301 is inserted into the attaching hole 62, the first to fifth engagement strips 40, 42, 44, 46 and 48 can be freely folded inward. Therefore, the anchor 3 can be inserted into the attaching hole 62 with a reduced insertion load.

Figure 41:
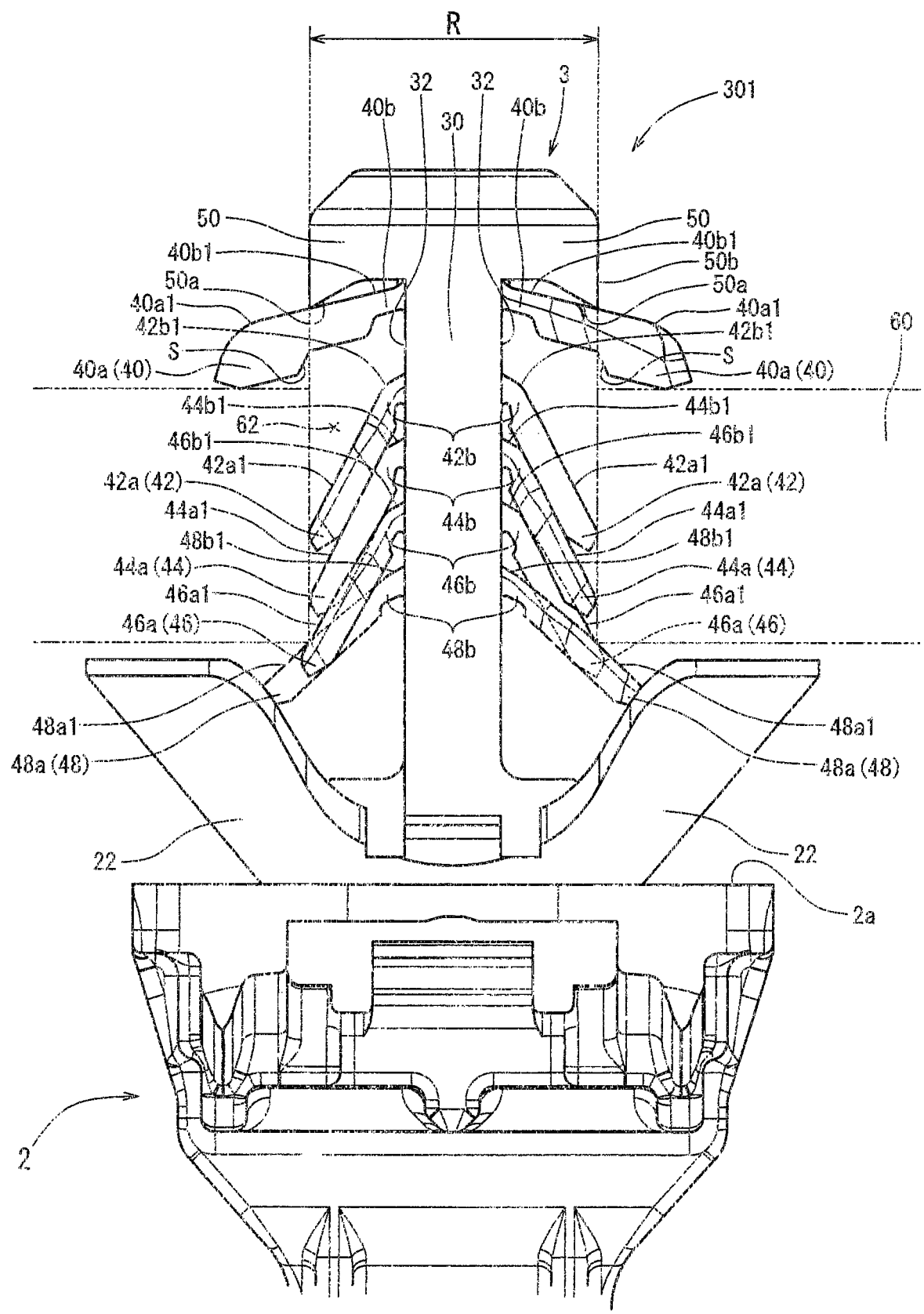
FIG. 41 is a view similar to FIG. 40, which view illustrates a condition in which an extraction load is applied to the clip.

Further, in the attached condition of the clip 301, i.e., in a condition in which the clip 301 is attached to the first panel member 60 (FIG. 40), when a removal or extraction load (a large pullout load) is applied to the anchor 3 (the clip 301) via the base 2, such an extraction load can be applied to the first engagement strips 40 through the periphery of the attaching hole 62. As a result, each of the first engagement strips 40 can be folded back (upward and outward) about the flexible portion 40b (FIG. 41). However, as previously described, the anchor 3 may have the blocks 50 that are positioned over and adjacent to the first engagement strips 40. Therefore, when each of the first engagement strips 40 are folded back, the surface 40a1 of the strip body 40a may contact the stopper surface 50a of each of the blocks 50 (FIG. 41). As a result, the first engagement strips 40 can be prevented from being excessively folded back.

Thus, the first engagement strips 40 can be prevented from being disengaged from the periphery of the attaching hole 62, so that the clip 301 attached to the first panel member 60 can be prevented from being removed from the first panel member 60. As a result, the attaching member attached to the first panel member 60 via the clip 301 may be prevented from being removed from the first panel member 60.

Further, when the surface 40a1 of the strip body 40a of each of the first engagement strips 40 contacts the stopper surface 50a of each of the blocks 50 due to the extraction load, the strip body 40a of each of the first engagement strips 40 may be subjected to a shearing force. Therefore, the clip 301 can be retained in the attaching hole 62 with a desired retention force that is capable of resisting the extraction load applied thereto.

Figure 42:
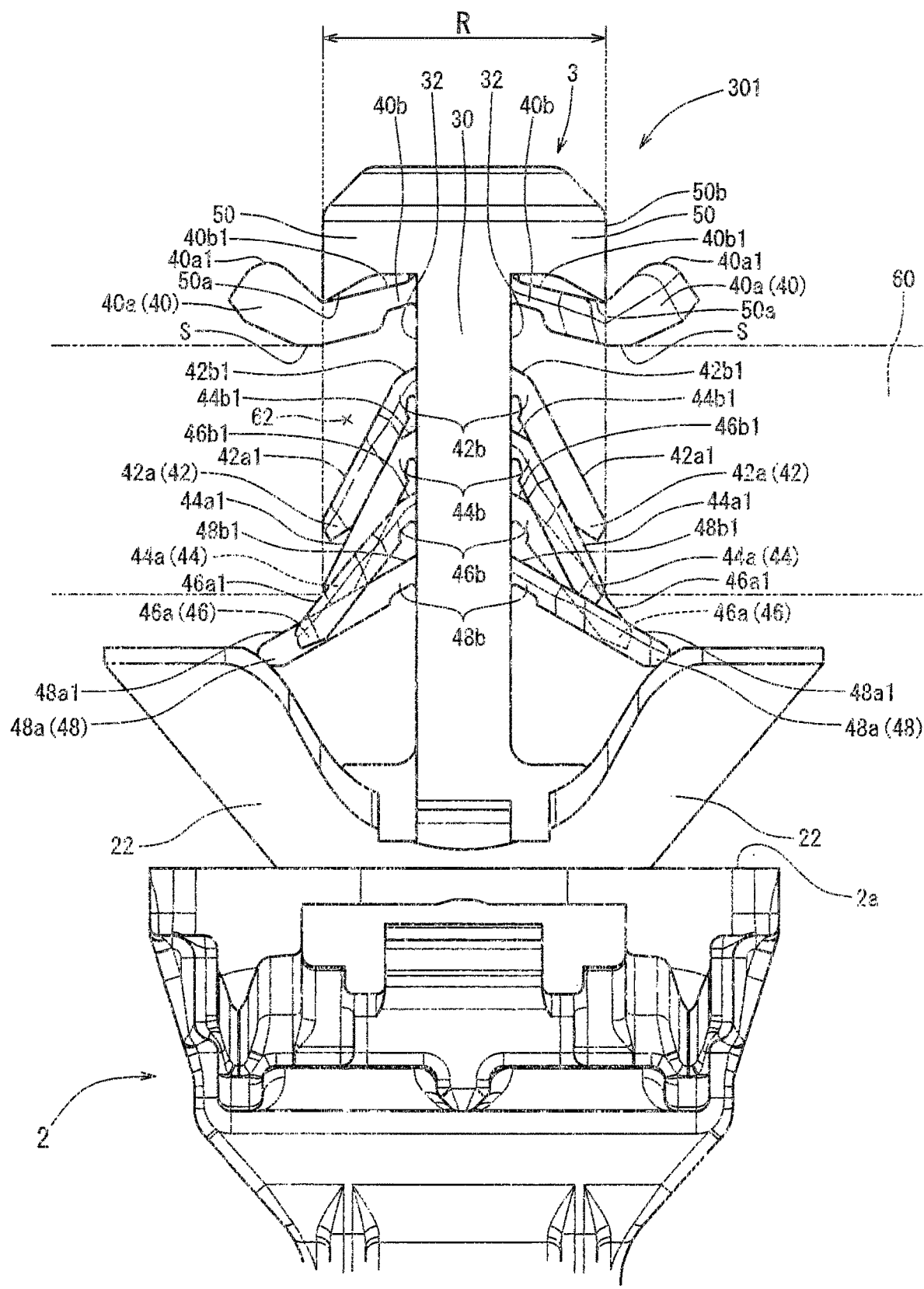
FIG. 42 is a view similar to FIG. 41, which view illustrates a condition in which a pullout load, i.e., a split-up load, greater than the extraction load is applied to the clip.
Figure 43:
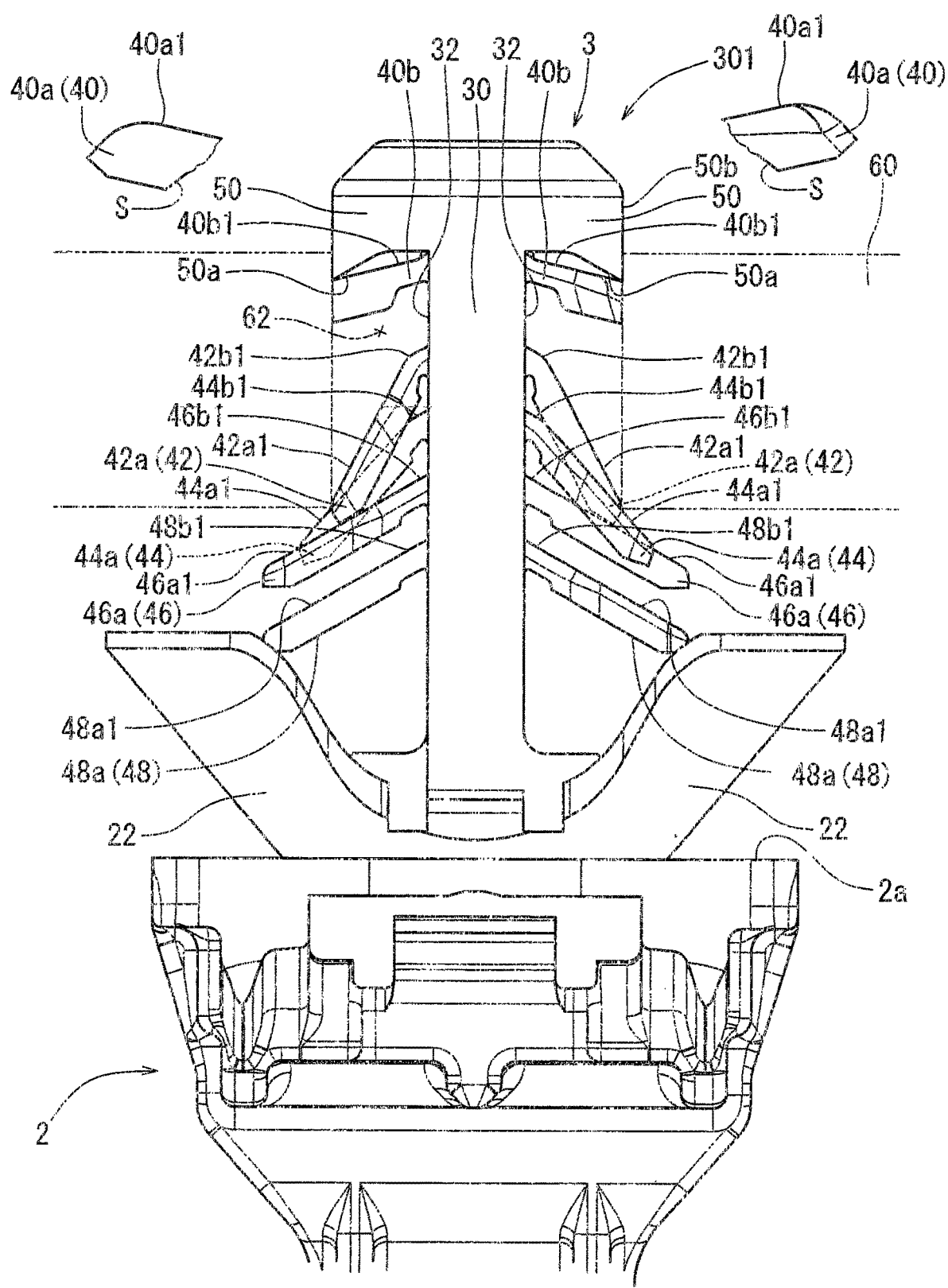
FIG. 43 is a view similar to FIG. 41, which view illustrates a condition in which the split-up load greater than the extraction load is continuously applied to the clip.

Further, in a condition shown in FIG. 41, when a breaking load (a pullout load greater than the extraction load) is applied to the anchor 3 (the clip 301) via the base 2 in order to remove the anchor 3 from the attaching hole 62, such a breaking load can be applied to the first engagement strips 40 through the periphery of the attaching hole 62. As a result, each of the first engagement strips 40 can be bent up about the shoulder portion S formed therein (FIG. 42). When the breaking load is continuously applied to the first engagement strips 40, each of the first engagement strips 40 can be greatly bent up, so as to be broken or sheared along the shoulder portion S due to engagement of each of the blocks 50 and the periphery of the attaching hole 62 (FIG. 43). Thus, the anchor 3 can be removed from the attaching hole 62 with the relatively small breaking load.

Next, in order to attach the attaching member (not shown) to the third panel member 260 (the subject member) having the attaching hole 262 of which the inner diameter R1 is greater than the diameter R of the attaching hole 62 of the first panel 60 (R1>R), after the base (buckle) 2 of the clip 301 is connected to the attaching member using the belt 2b, the anchor 3 (the pillar 30) of the clip 301 may be pressed against and inserted into the attaching hole 262 formed in the third panel member 260. Upon insertion of the anchor 3, each of the first engagement strips 40 (the strip body 40a) formed in the pillar 30 may contact an inner surface 262a of the attaching hole 262. As a result, the anchor 3 may be introduced into the attaching hole 262 while each of the first engagement strips 40 is folded downward (inward) about the flexible portion 40b.

Figure 44:
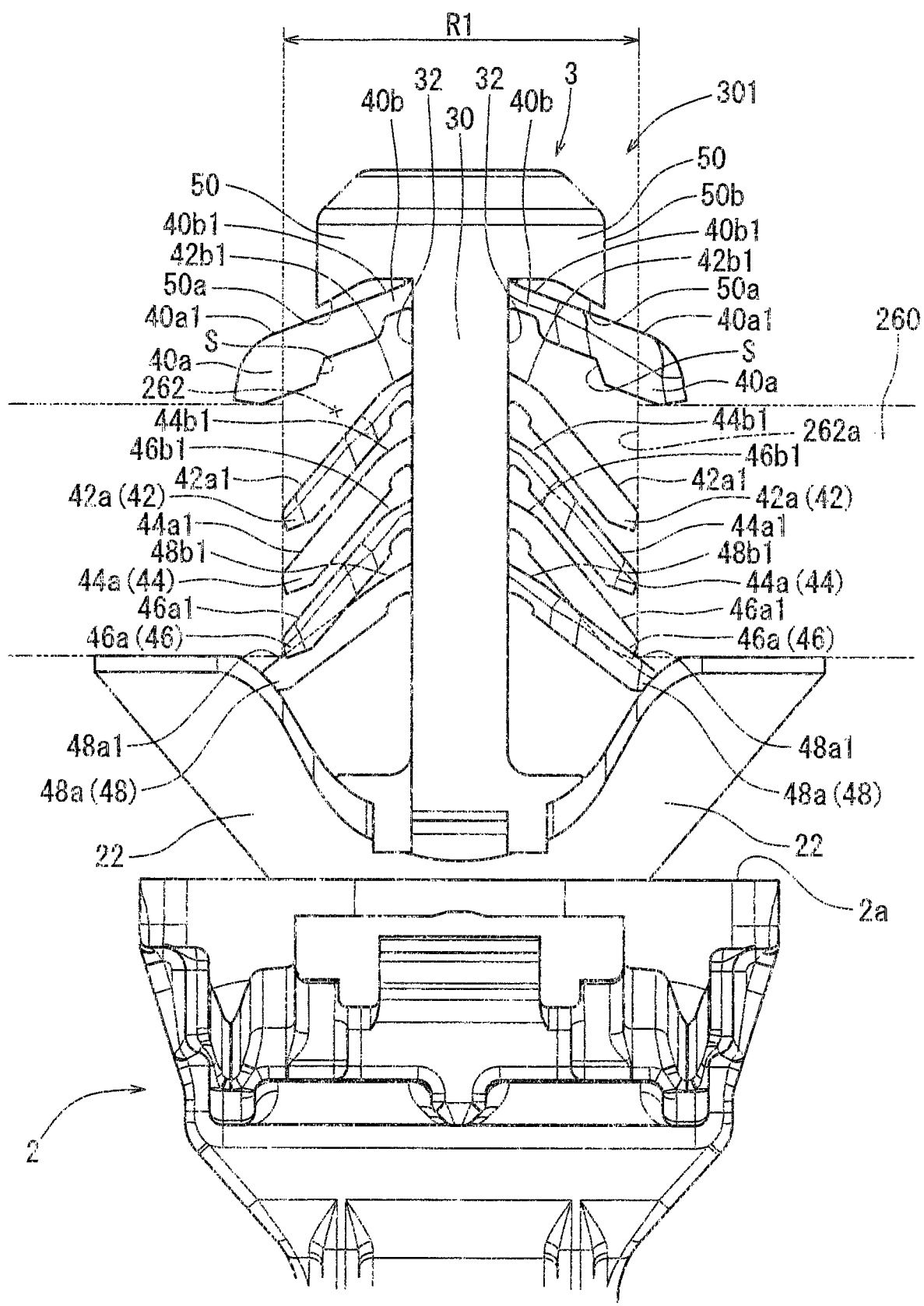
FIG. 44 is a partially enlarged elevational view of the clip, which view illustrates a condition in which the anchor of the clip is completely inserted into an insertion hole of a third panel member, so that the clip is attached to the third panel member.

When the anchor 3 of the clip 301 is further inserted into the attaching hole 262 of the third panel member 260, each of the second engagement strips 42, each of the third engagement strips 44, each of the fourth engagement strips 46 and each of the fifth engagement strips 48 are respectively sequentially started to be folded downward (inward) about the flexible portion 42b, the flexible portion 44b, the flexible portion 46b and the flexible portion 48b in this order. Subsequently, when the anchor 3 is completely inserted into the attaching hole 262, the first engagement strips 40 may pass through the attaching hole 262. As a result, the first engagement strips 40 may respectively be restored outward and be released from the attaching hole 262. Thus, each of the first engagement strips 40 (the strip body 40a) can be elastically restored, so as to elastically engage a periphery of the attaching hole 262 (FIG. 44). At this time, the second engagement strips 42, the third engagement strips 44, the fourth engagement strips 46 and the fifth engagement strips 48 may respectively remain folded inward. Further, the stabilizers 22 may elastically contact a surface of the third panel member 260 so as to stabilize the clip 301. Thus, the anchor 3 (the clip 301) can be attached to the third panel member 260 with a desired retention force (which may be referred to as an attached condition of the clip 301). As a result, the attaching member can be attached to the third panel member 260 via the clip 301.

According to the embodiment, the clip 301 can be easily attached to the third panel member 260. Therefore, the attaching member can be easily attached to the third panel member 260 via the clip 301. Further, when the anchor 3 of the clip 301 is inserted into the attaching hole 262, the first to fifth engagement strips 40, 42, 44, 46 and 48 can be freely folded inward. Therefore, the anchor 3 can be inserted into the attaching hole 262 with a reduced insertion load.

Figure 45:
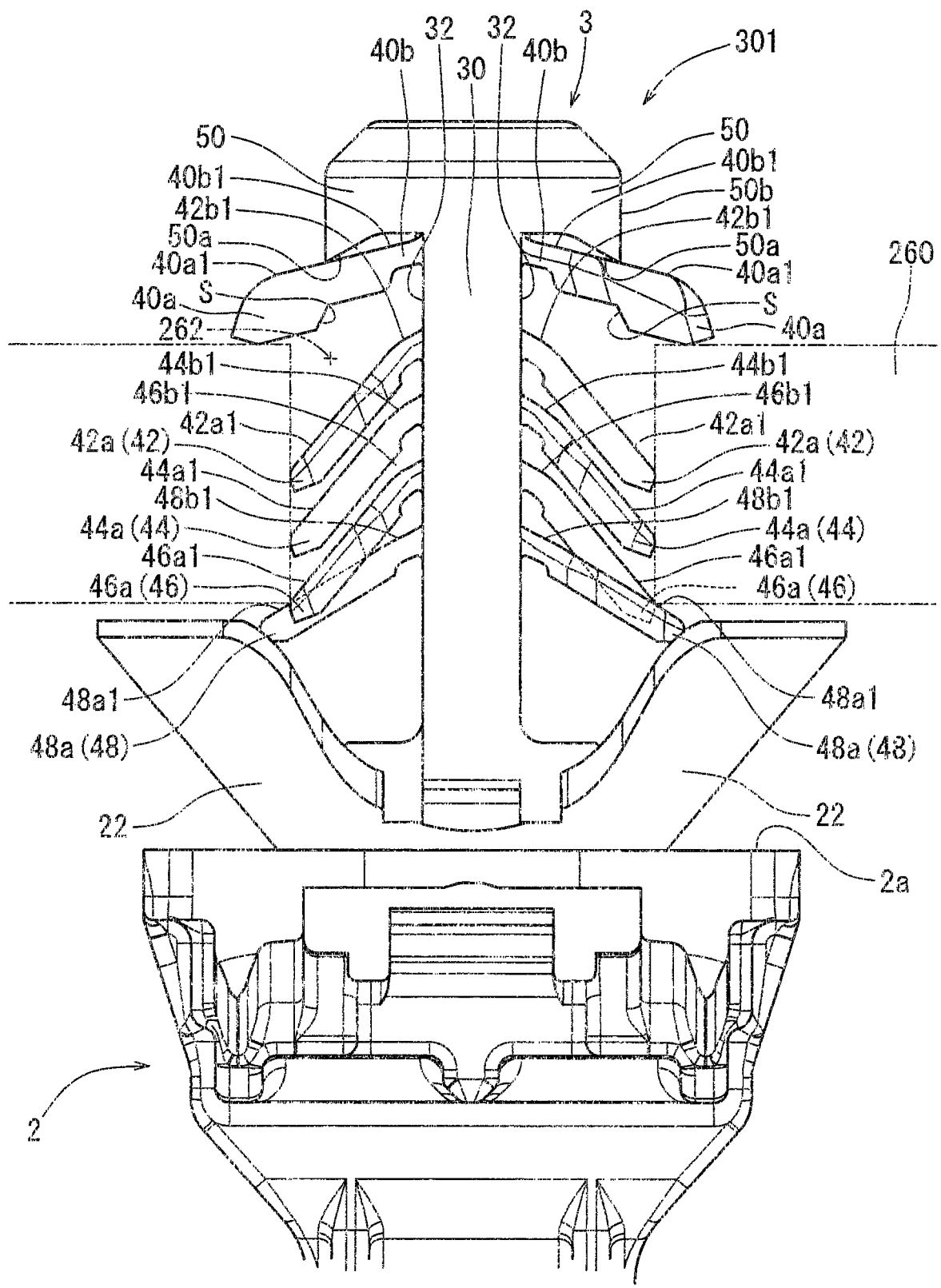
FIG. 45 is a view similar to FIG. 44, which view illustrates a condition in which an extraction load is applied to the clip.

Further, in the attached condition of the clip 301, i.e., in a condition in which the clip 301 is attached to the third panel member 260 (FIG. 44), when a removal or extraction load (a large pullout load) is applied to the anchor 3 (the clip 301) via the base 2, such an extraction load can be applied to the first engagement strips 40 through the periphery of the attaching hole 262. As a result, each of the first engagement strips 40 can be folded back (upward and outward) about the flexible portion 40b (FIG. 45). However, as previously described, the anchor 3 may have the blocks 50 that are positioned over and adjacent to the first engagement strips 40. Therefore, when each of the first engagement strips 40 are folded back, the surface 40a1 of the strip body 40a may contact the stopper surface 50a of each of the blocks 50 (FIG. 45). As a result, the first engagement strips 40 can be prevented from being excessively folded back.

Thus, the first engagement strips 40 can be prevented from being disengaged from the periphery of the attaching hole 262, so that the clip 301 attached to the third panel member 260 can be prevented from being removed from the third panel member 260. As a result, the attaching member attached to the third panel member 260 via the clip 301 may be prevented from being removed from the third panel member 260.

Further, when the surface 40a1 of the strip body 40a of each of the first engagement strips 40 contacts the stopper surface 50a of each of the blocks 50 due to the extraction load, the strip body 40a of each of the first engagement strips 40 may be subjected to a shearing force. Therefore, the clip 301 can be retained in the attaching hole 262 with a desired retention force that is capable of resisting the extraction load applied thereto.

Figure 46:
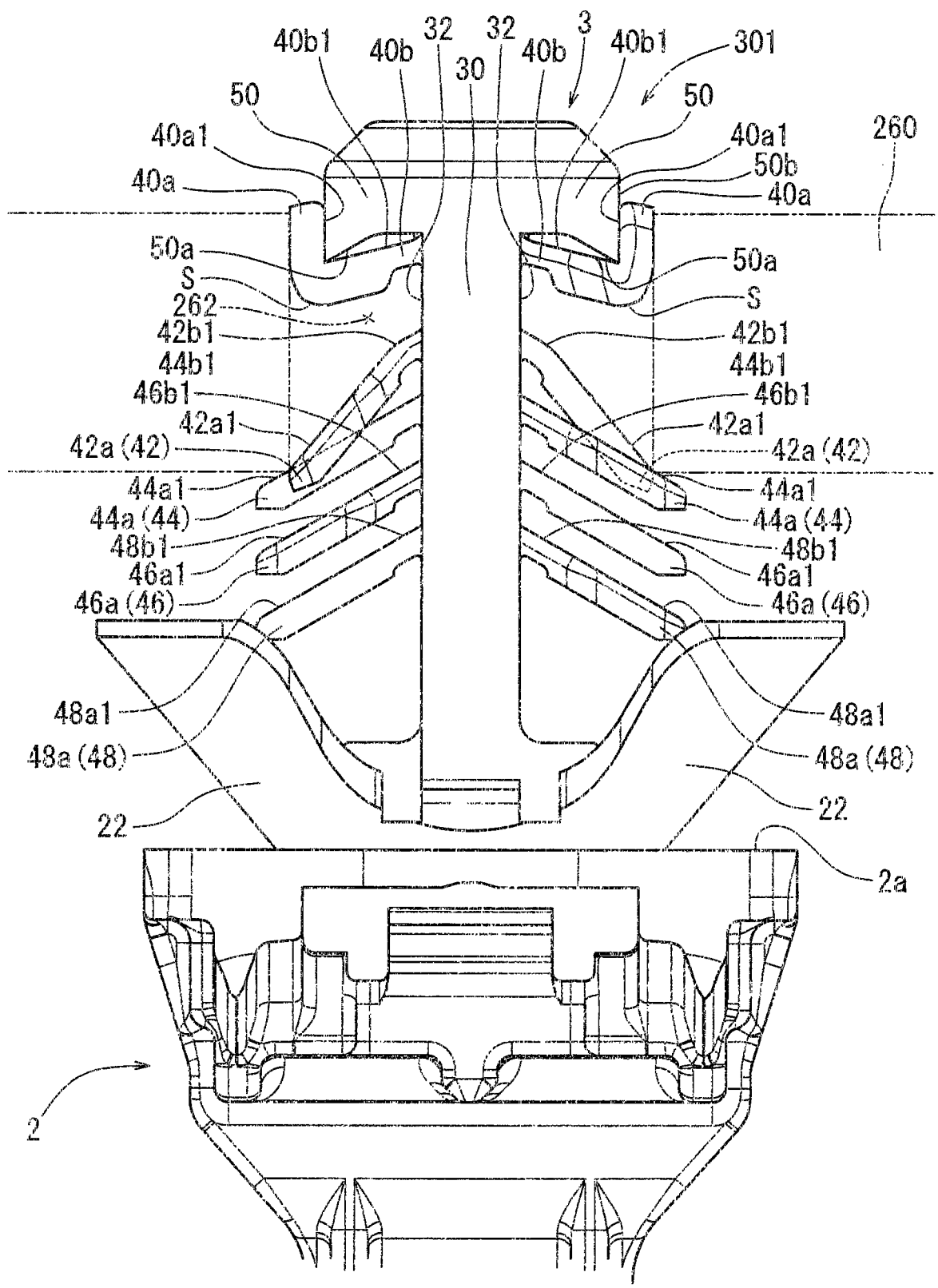
FIG. 46 is a view similar to FIG. 44, which view illustrates a condition in which a pullout load, i.e., a split-up load, greater than the extraction load is applied to the clip.

Further, in a condition shown in FIG. 45, when a breaking load (a pullout load greater than the extraction load) is applied to the anchor 3 (the clip 301) via the base 2 in order to remove the anchor 3 from the attaching hole 262, such a breaking load can be applied to the first engagement strips 40 through the periphery of the attaching hole 262. As a result, each of the first engagement strips 40 can be bent up about the shoulder portion S formed therein (FIG. 46). When the breaking load is continuously applied to the first engagement strips 40, each of the first engagement strips 40 can be introduced into a space formed between the outer surface 50b of each of the blocks 50 and the inner surface 262a of the attaching hole 262 (FIG. 46). Thus, the anchor 3 can be removed from the attaching hole 262 with the relatively small breaking load.

Representative examples have been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detail description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:
1. A clip comprising a base to which an attaching member is connected, and an anchor configured to be attached to a plate-shaped subject member and having a pillar, at least one pair of flexible engagement strips and a pair of blocks,
   wherein the pillar is configured to be inserted into an attaching hole formed in the subject member, wherein each of the at least one pair of engagement strips is configured to engage a periphery of the attaching hole when the pillar is inserted into the attaching hole, and wherein each of the pair of blocks has a stopper surface that contacts one of the at least one pair of engagement strips so as to restrict the at least one pair of engagement strips from being folded back when an extraction load is applied to the anchor in a condition in which the anchor is attached to the subject member.

2. The clip of claim 1, wherein the pillar includes a top portion and a bottom portion connected to the base, and wherein the at least one pair of engagement strips are respectively inclined toward the bottom portion of the pillar relative to a central axis of the pillar.

3. The clip of claim 1, wherein the stopper surface of each of the pair of blocks extends in parallel to each of the at least one pair of engagement strips.

4. The clip of claim 1, wherein a distance between outer circumferences of the pair of blocks is slightly smaller than an inner diameter of the attaching hole of the subject member.

5. The clip of claim 1, wherein the pillar includes a top portion and a bottom portion connected to the base, wherein the at least one pair of engagement strips comprise a plurality of pairs of engagement strips, and wherein the plurality of pairs of engagement strips are configured to be folded back in the order from a bottom-side pair of engagement strips engaging the periphery of the attaching hole to a top-side pair of engagement strips when the extraction load is applied to the anchor in the condition in which the anchor is attached to the subject member.

6. The clip of claim 5, wherein each of the bottom-side pair of engagement strips is configured to be greater than each of remaining pairs of engagement strips.

7. The clip of claim 5, wherein the stopper surface of each of the pair of blocks extends in parallel to each of the plurality of pairs of engagement strips.

8. The clip of claim 1, wherein the pillar includes a top portion and a bottom portion connected to the base, wherein the at least one pair of engagement strips comprises a plurality of pairs of engagement strips, wherein the pair of blocks comprises a single pair of blocks, and wherein a top-side pair of engagement strips engaging the periphery of the attaching hole are configured to be folded back when the extraction load is applied to the anchor in the condition in which the anchor is attached to the subject member.

9. The clip of claim 8, wherein each of the top-side pair of engagement strips has a shoulder portion that is aligned with an outer surface of each of the single pair of blocks in a longitudinal direction of the pillar.

10. A clip comprising a base to which an attaching member is connected, and an anchor configured to be attached to a plate-shaped subject member and having a pillar, at least one pair of flexible engagement strips and a pair of blocks, wherein the pillar includes a top portion and a bottom portion connected to the base and includes opposite surfaces extending from the top portion to the bottom portion, wherein the at least one pair of engagement strips are respectively formed in the opposite surfaces of the pillar, wherein the pair of blocks is respectively formed in the opposite surfaces of the pillar, wherein the pair of blocks is respectively positioned over the at least one pair of engagement strips at intervals in a longitudinal direction of the pillar, wherein each of the at least one pair of engagement strips is protruded beyond a circumferential periphery of each of the pair of blocks, so as to have a protrusion region having a desired length, and wherein each of the pair of blocks contacts one of the at least one pair of engagement strips so as to restrict the at least one pair of engagement strips from being folded back when the at least one pair of engagement strips are folded back toward the pair of blocks.

11. The clip of claim 10, wherein the at least one pair of engagement strips comprise a plurality of pairs of engagement strips, wherein the engagement strips formed in each opposite surface of the pillar are arranged in a zig-zag manner along a central axis of the pillar, and wherein the pair of blocks comprise a plurality of pairs of blocks that are respectively positioned adjacent to the plurality of pairs of engagement.

12. The clip of claim 11, wherein each pair of engagement strips are arranged in a two-fold rotationally symmetrical fashion about the central axis of the pillar.

13. The clip of claim 10, wherein the at least one pair of engagement strips comprise a plurality of pairs of engagement strips, wherein the engagement strips formed in each opposite surface of the pillar are arranged in a linear arrangement along the central axis of the pillar, and wherein the pair of blocks are respectively positioned adjacent to a top-side pair of engagement strips.

14. The clip of claim 13, wherein each pair of engagement strips are arranged in a 2-fold rotationally symmetrical fashion about the central axis of the pillar.

15. The clip of claim 10, wherein the at least one pair of engagement strips comprise a plurality of pairs of engagement strips, wherein the engagement strips formed in each opposite surface of the pillar are arranged in a zig-zag manner along a central axis of the pillar, and wherein the pair of blocks comprise a single pair of blocks that are respectively positioned adjacent to a top-side pair of engagement strips.

16. The clip of claim 15, wherein each pair of engagement strips are arranged in two-fold rotationally symmetrical fashion about the central axis of the pillar.

* * * * *